United States Patent
Hahn et al.

(10) Patent No.: US 10,496,953 B1
(45) Date of Patent: Dec. 3, 2019

(54) SYSTEM TO DETERMINE USER GROUPINGS IN A FACILITY

(71) Applicant: AMAZON TECHNOLOGIES, INC., Seattle, WA (US)

(72) Inventors: Camerin Cole Hahn, Redmond, WA (US); Nikolai Orlov, Toronto (CA)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 15/271,141

(22) Filed: Sep. 20, 2016

(51) Int. Cl.
*G06Q 10/08* (2012.01)
*H04L 29/08* (2006.01)

(52) U.S. Cl.
CPC ........... *G06Q 10/087* (2013.01); *H04L 67/22* (2013.01); *H04L 67/306* (2013.01)

(58) Field of Classification Search
None
See application file for complete search history.

(56) References Cited

U.S. PATENT DOCUMENTS

| | | | |
|---|---|---|---|
| 5,914,701 A | 6/1999 | Gersheneld et al. | |
| 6,357,554 B1 | 3/2002 | Valk et al. | |
| 6,909,373 B2 | 6/2005 | Power et al. | |
| 7,225,980 B2 | 6/2007 | Ku et al. | |
| 7,949,568 B2 | 5/2011 | Fano et al. | |
| 8,009,864 B2 | 8/2011 | Linaker et al. | |
| 8,189,855 B2 | 5/2012 | Opalach et al. | |
| 8,630,924 B2 | 1/2014 | Groenevelt et al. | |
| 9,235,928 B2 | 1/2016 | Medioni et al. | |
| 9,843,286 B2 | 12/2017 | Sills et al. | |
| 2006/0071674 A1 | 4/2006 | Jean | |
| 2006/0077172 A1* | 4/2006 | Fukumoto et al. | H04B 13/00 345/156 |
| 2006/0153109 A1* | 7/2006 | Fukumoto et al. | H04B 13/00 370/310 |
| 2006/0202832 A1* | 9/2006 | Reznik et al. | G06K 7/10346 340/572.7 |
| 2007/0069021 A1* | 3/2007 | Elrod et al. | G06K 17/00 235/451 |
| 2007/0088498 A1* | 4/2007 | Pazos et al. | G06K 7/10396 340/944 |

(Continued)

OTHER PUBLICATIONS

Asthana, et al., "An indoor wireless system for personalized shopping assistance", CiteSeerX, In Proceedings of IEEE Workshop on Mobile Computing Systems and Applications, 1994; [retrieved on Jun. 30, 2013]. Retrieved from the Internet: <URL:http://citeseerx.ist.psu.edu/viewdoc/summary?doi =10.1.1.127.3033>.

(Continued)

*Primary Examiner* — Craig A. Renner
(74) *Attorney, Agent, or Firm* — Lindauer Law, PLLC

(57) ABSTRACT

Tracking data of users or other objects within a facility may be obtained using a plurality of smart floor tiles. Determining group data indicative of which users are in a common group is useful to associate interactions of those users with a particular account, such as a billing account. A radio signal may be transferred from one user to others via proximity or physical contact. The radio signal conveys designation data. Smart floor tiles at different locations receive the radio signal conveying the same designation data. The users present at those different locations are then associated with a common group.

16 Claims, 19 Drawing Sheets

(56) References Cited

U.S. PATENT DOCUMENTS

| | | |
|---|---|---|
| 2007/0162185 A1 | 7/2007 | McFarland |
| 2009/0227277 A1 | 9/2009 | Gupta et al. |
| 2011/0001489 A1 | 1/2011 | Rimminen |
| 2011/0011936 A1 | 1/2011 | Morandi et al. |
| 2012/0284132 A1 | 11/2012 | Kim et al. |
| 2012/0309531 A1* | 12/2012 | Gong et al. .......... H03K 17/955 463/36 |
| 2012/0310570 A1 | 12/2012 | Pyne et al. |
| 2013/0156080 A1 | 6/2013 | Cheng et al. |
| 2013/0193988 A1 | 8/2013 | Benkley, III |
| 2013/0284806 A1 | 10/2013 | Margalit |
| 2014/0307118 A1* | 10/2014 | MacKinnon et al. . A61B 5/112 348/222.1 |
| 2015/0022221 A1 | 1/2015 | Hsu |
| 2015/0025690 A1 | 1/2015 | Abuelsaad et al. |
| 2015/0086107 A1 | 3/2015 | Dedeoglu et al. |
| 2015/0282766 A1* | 10/2015 | Cole et al. ............ A61B 5/112 702/139 |
| 2016/0191205 A1 | 6/2016 | Hamada et al. |
| 2016/0217664 A1* | 7/2016 | Bradford .................. H04Q 9/00 |
| 2017/0354350 A1 | 12/2017 | Croce et al. |

OTHER PUBLICATIONS

Hasegawa, et al., "Human Body Equivalent Phantom for Analyzing of Surface and Space Propagation in MHz-Band Signal Transmission", Department of Electronics, Kyoto Institute of Technology. Retrievable from Internet: <<http://ieeexplore.ieee.org/document/7481823/>>, Apr. 2016.

Kalnikaite, et al., "How to Nudge In Situ: Designing Lambent Devices to Deliver Information Salience in Supermarkets", ACM, In proceeding of: UbiComp 2011: Ubiquitous Computing, 13th International Conference, UbiComp 2011, Beijing, China, Sep. 17-21, 2011. Retrieved from Internet: <URL:http://www.researchgate.net/publication/221568350_How_to_nudge_in_Situ_designing_lambent_devices_to_deliver_salient_information_in_supermarkets>.

Pop, Cristian, "Introduction to the BodyCom Technology", AN1391, DS01391A, Microchip Technology, Inc., May 2, 2011.

Valtonen, Miika, "Technologies for Smart Environments: Capacitive User Tracking and Proactive Fuzzy Control", Tampere University of Technology. Publication 1044. 2012. Retrieved from Internet: <<http://dspace.cc.tut.fi/dpub/bitstream/handle/123456789/21002/valtonen.pdf?sequence=3&isAllowed=y>>.

Vu, et al., "Distinguishing Users with Capacitive Touch Communication", WINLAB, Rutgers University, In proceedings of: The 18th Annual International Conference on Mobile Computing and Networking ("MobiCom'12"), Aug. 22-26, 2012, Istanbul, Turkey.

Haider, Fawaad, "Non-final Office Action dated Feb. 26, 2019", U.S. Appl. No. 15/271,207, The United States Patent and Trademark Office, Feb. 26, 2019.

Natalini, Jeff William, "Non-final Office Action dated Jun. 22, 2018", U.S. Appl. No. 15/195,989, The United States Patent and Trademark Office, Jun. 22, 2018.

Natalini, Jeff William, "Final Office Action dated Feb. 26, 2019", U.S. Appl. No. 15/195,930, The United States Patent and Trademark Office, Feb. 26, 2019.

Natalini, Jeff William, "Final Office Action dated Nov. 5, 2018", U.S. Appl. No. 15/195,989, The United States Patent and Trademark Office, Nov. 5, 2018.

Natalini, Jeff William, "Non-final Office Action dated Sep. 18, 2018", U.S. Patent Application No. 15/195,930, the United States Patent and Trademark Office Sep. 18, 2018.

\* cited by examiner

SYSTEM TO DETERMINE USER GROUPINGS IN A FACILITY

BACKGROUND

Retailers, wholesalers, and other product distributors typically maintain an inventory of various items that may be ordered, purchased, leased, borrowed, rented, viewed, and so forth, by clients or customers. For example, an e-commerce website may maintain inventory in a fulfillment center. When a customer orders an item, the item is picked from inventory, routed to a packing station, packed, and shipped to the customer. Likewise, physical stores maintain inventory in customer accessible areas, such as in a shopping area, and customers can pick items from inventory and take them to a cashier for purchase, rental, and so forth.

Many physical stores also maintain inventory in a storage area, fulfillment center, or other facility that can be used to replenish inventory located in the shopping areas or to satisfy orders for items that are placed through other channels (e.g., e-commerce). Other examples of entities that maintain facilities holding inventory include libraries, museums, rental centers, and so forth. In each instance, for an item to be moved from one location to another, it is picked from its current location and transitioned to a new location. It is often desirable to monitor quantity or movement of users, inventory, or other objects within the facility.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
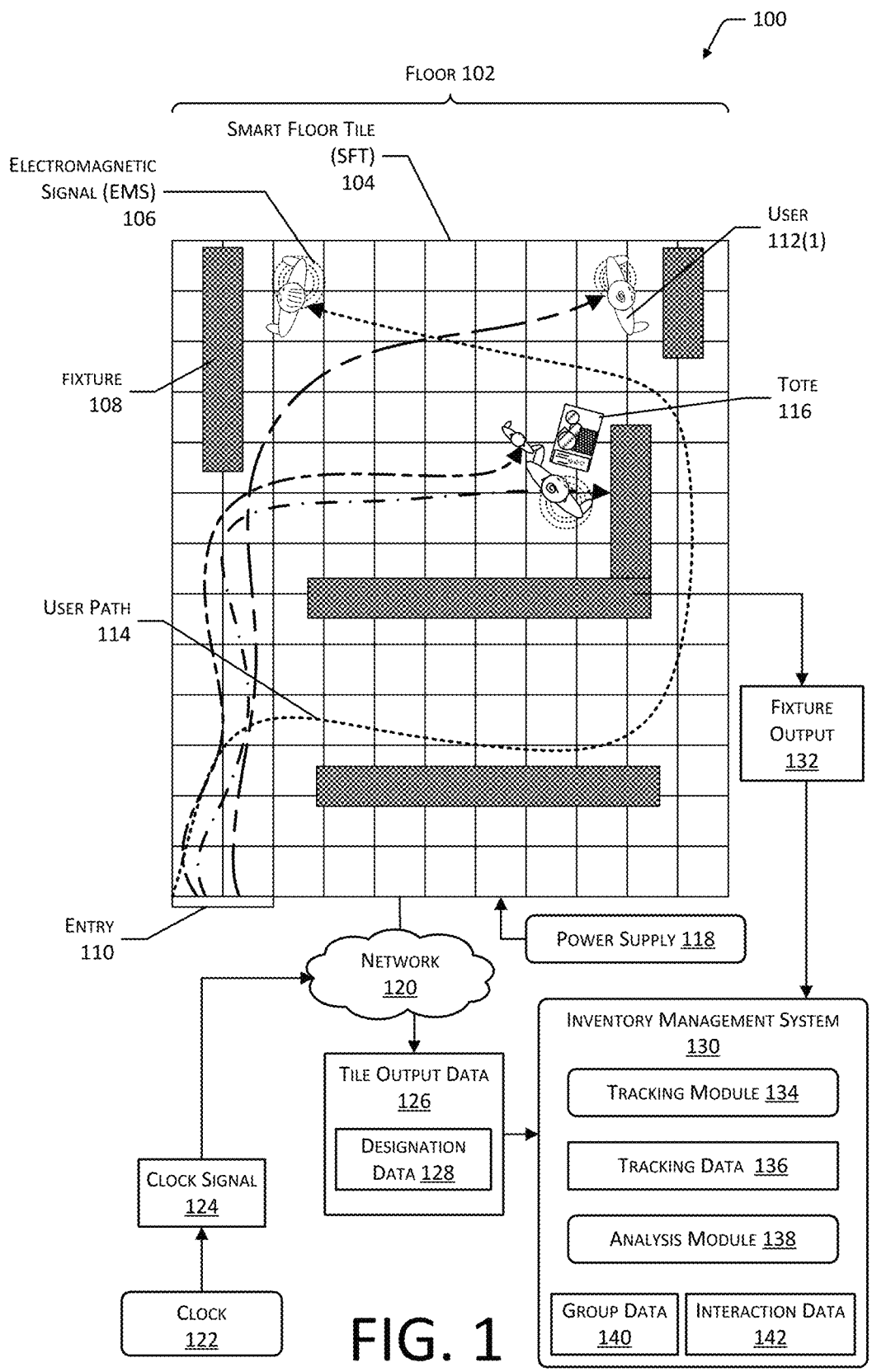
FIG. 1 illustrates a system using smart floor tiles to generate tracking data about movement of users within a facility, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean "including, but not limited to".

DETAILED DESCRIPTION

Described in this disclosure are systems and techniques for generating interaction data in a materials handling facility (facility). The facility may include, or have access to, an inventory management system. The inventory management system may be configured to maintain information about items, users, condition of the facility, and so forth. For example, the inventory management system may maintain data indicative of a number of items at a particular fixture, what items a particular user is ordered to pick, how many items have been picked or placed at the fixture, requests for assistance, environmental status of the facility, and so forth.

Operation of the facility may be facilitated by using one or more sensors to acquire information about interactions in the facility. The inventory management system may process the sensor data from the one or more sensors to determine interaction data. The interaction data is indicative of an action such as picking or placing an item at a particular location on the fixture, touching an item at a particular location on the fixture, presence of the user at the fixture without touching the item, and so forth. For example, the inventory management system may use the sensor data to generate interaction data that determines a type of item a user picked from a particular fixture.

A fixture may include one or more item stowage areas such as shelves, hangers, bins, and so forth, that hold or otherwise support a type of item. The fixture may be arranged into sections, such as lanes on a shelf. For example, a shelf may have three lanes, with each lane holding a different type of item. Items may be added to (placed) or removed (picked) from the fixture, moved from one fixture to another, and so forth.

The floor of the facility may comprise a plurality of smart floor tiles. The smart floor tiles may include a transmitter and receiver that generate and detect an electromagnetic signal. For example, the carrier of this signal may be less than or equal to 30 MHz. The smart floor tiles may also include sensors such as touch or pressure sensors that provide object data indicative of an object such as a foot or wheel that is in contact with the smart floor tile.

During operation, the first smart floor tile may determine the presence of a foot (or shoe) and begin transmitting a first electromagnetic signal that encodes designation data. This first electromagnetic signal is coupled to the body of the user. As the user steps from the first smart floor tile to a second smart floor tile, the body of the user provides a pathway through which the first electromagnetic signal is transferred. The second smart floor tile receives the first electromagnetic signal, determines the designation data, and begins to retransmit the designation data as a second electromagnetic signal. The first smart floor tile ceases transmission of the first electromagnetic signal. In this fashion, while standing or walking, the body of the user acts as a bridge that momentarily links one smart floor tile to another and serves as a pathway to transfer the designation data. As the user moves throughout the facility, the designation data moves along with them.

In some implementations, a smart floor tile may use information obtained from one or more of the receiver or the transmitter to determine the presence of an object. For example, the amount of current consumed by the transmitter may vary based upon whether an object is present near an antenna that is coupled to the transmitter.

The smart floor tile may use other onboard sensors to determine object data. For example, an array of capacitive sensors may be used to determine the shape of the foot (or footwear) of the user. In one implementation, upon determining the presence of an object having a shape consistent with a foot, a smart floor tile may activate the receiver. In another implementation, upon determining the absence of an object having a shape consistent with a foot, the smart floor tile may deactivate the transmitter and cease transmitting the electromagnetic signal.

In some situations, designation data may not be transferred from one smart floor tile to another. For example, the electromagnetic signal may be interfered with or lost. In these situations, one or more attributes of the first user may be used to reestablish identification at a second smart floor tile. For example, the shape of the footprint, characteristics of the gait of the user such as how the foot lands and moves on a smart floor tile, trajectory of the user, image acquired from cameras elsewhere within the facility, and so forth, may be used to establish continuity of user identification.

During installation of smart floor tiles, one or more techniques may be used to determine a relative arrangement of the smart floor tiles with respect to one another. For example, the smart floor tiles may be configured such that they are installable only with a particular orientation. Based on knowledge of this implementation and information about the relative position of adjacent smart floor tiles, the overall arrangement of smart floor tiles may be determined. In another implementation, the relative arrangement of smart floor tiles with respect one another may be determined based on information obtained from those smart floor tiles that are adjacent to one another. In some implementations, information may be transferred using transmitters and receivers of smart floor tiles. For example, an antenna proximate to a first side of a smart floor tile may be used to transmit a particular electromagnetic signal. The other smart floor tiles may have the receivers activated and, based on the relative signal strengths or other characteristics of the transmitted signal, may determine which antenna and corresponding receiver are closest to the antenna of the transmitter. Based on this information, and by iterating through the different sides of smart floor tiles and the smart floor tiles themselves, arrangement data indicative of a relative arrangement of smart floor tiles within the facility may be determined. In other implementations, other techniques may be used.

Once the arrangement data indicative of relative arrangement of the smart floor tiles has been determined, predetermined physical dimension data that describes the physical dimensions of the smart floor tiles may be applied to generate a map of the smart floor tiles. Given a known position of a particular smart floor tile or portion thereof with respect to a reference point within the facility, offset data may be determined. Based on the offset data, a particular smart floor tile or portion thereof may be associated with a particular location in space within the facility. By using offset data, tracking data indicative of a particular smart floor tile may thus be resolved to a particular set of coordinates within the facility, such as 4.75 meters East and 13.15 meters North of the reference point. By using this information, the inventory management system may be able to track users and other objects as they move within the facility. By utilizing the tracking data, interaction data may also be determined. For example, by knowing where the user is standing within the facility, it may be determined that they are interacting with a particular item.

In some implementations, smart floor tiles may operate in a receive mode. A portable transmitter may be worn or carried by the user or other object that is to be tracked in the facility. The portable transmitter may transmit an electromagnetic signal that is representative of the designation data for that object. In some implementations, tools within the facility such as totes, carts, pallet jacks, and so forth, may be equipped with mobile transmitters and receivers. The receiver onboard the tool may be used to detect the electromagnetic signal that is being conducted by the user, such as from the transmitter within a smart floor tile or from a portable transmitter. The identification information received by way of the user may be used to associate a particular tote to that particular user. The inventory management system may use this information to track items, tools, or other objects within the facility.

The smart floor tile system may also be used to determine when users are affiliated with groups. For example, a group may be determined based on the same designation data being received at a plurality of smart floor tiles. Continuing the example, when the users in the group are holding hands, an electromagnetic signal carrying the designation data may pass from one user to the next. As a result of this transfer, the same electromagnetic signal carrying the same designation data is received at a plurality of smart floor tiles. The users standing on the smart floor tiles and conveying the same designation data may thus be associated with one another.

Based on this information, the inventory management system may associate subsequent interaction data with a particular account identifier or group of accounts. For example, the interaction data may be associated with a particular billing account.

The electromagnetic signal provided by the portable transmitter may be used to determine the relative position of the user's hand with respect to the fixture, to determine an item interacting with a location, and so forth. For example, a smart floor tile may transmit an electromagnetic signal that is conducted through the user and detected by antennas and receivers located at a shelf. Based on the relative signal strength, a position of the user's hand may be determined. When the user touches an item stored on the shelf, the electromagnetic signal transfers from the user to the item and from there transfers onto the shelf. For example, the amplitude of the electromagnetic signal received at an antenna that is located beneath the item that is being touched may increase significantly relative to the level obtained when there is no contact. As a result of this increase, the user may be deemed to have had contact with the item stored at that location on the shelf. Because the electromagnetic signal conveys designation data, the inventory management system is able to determine which user touched that item.

By using the techniques described herein, operation of the facility may be improved. Details about interactions between users and items in the facility may be quickly and accurately determined. For example, as items are picked, placed, and so forth, information such as inventory levels based on changes in the count of items at the fixtures may be readily and more accurately determined. As a result, the inventory management system may be able to quickly track what item a user has interacted with, maintain up-to-date inventory information, and so forth.

The smart floor tiles provide various technical advantages including, but not limited to, reductions in bandwidth compared to other sensor methodologies, improved tracking of individual users in congested environments, detection of potential hazards, detection of user incapacity, and so forth. The smart floor tiles are mechanically robust and provide high resolution tracking data for users as well as providing the ability to identify who is interacting with a particular fixture, item, and so forth. The system described herein also allows for reduced capital expenditures as well as reduced operating expenditures relative to other sensor methodologies. For example, compared to vision tracking systems, installation of smart floor tiles is less expensive, and during operation is less prone to failure or environmental interference. The smart floor tiles and the information obtained thereby may also be used in conjunction with other systems, such as vision tracking systems, tag tracking systems, and so forth.

Illustrative System

FIG. 1 illustrates a system 100 using a variety of sensors to generate tracking data and other information within a facility, according to some implementations. The facility includes a floor 102. The floor 102 may comprise a plurality of smart floor tiles (SFTs) 104. Each of the SFTs 104 may include various components such as antennas, receivers, hardware processors, sensors, and so forth. The SFT 104 may be configured to transmit and receive an electromagnetic signal (EMS) 106. For example, the EMS 106 may comprise a radio frequency signal. The SFT 104 is discussed in more detail below with regard to FIG. 2.

Within the facility may be one or more fixtures 108. The fixture 108 may include stowage areas such as shelves, hangers, bins, and so forth, that hold or otherwise support a type of item. The fixture 108 may be arranged into sections, such as lanes on a shelf. For example, a shelf may have three lanes, with each lane holding a different type of item. Items may be added to (placed) or removed (picked) from the fixture 108, moved from one fixture 108 to another, and so forth. In some implementations, the SFTs 104 may be installed and the fixtures 108 and other objects may then be installed on the SFTs 104. In other implementations, the fixtures 108 may be installed and then the SFTs 104 may be installed around the fixtures 108. Some portions of the floor 102 may omit SFTs 104. For example, SFTs 104 may be omitted from around the perimeter of a room, immediately adjacent to a wall, underneath a fixture 108, and so forth.

An entry 110 provides access for a user 112 to the facility. For example, the entry 110 may comprise a foyer, door, gated entry area, and so forth. The user 112 may move throughout the facility, with movement depicted in this illustration as a user path 114 across the floor 102. The user 112 may use various tools while in the facility, such as a tote 116, pallet jack, and so forth. The tote 116 may include a basket, cart, bin, bag, and so forth. During operation of the facility, users 112 thus move around, picking, placing, or otherwise interacting with items at the fixtures 108.

The SFTs 104 may obtain electrical power from a power supply 118. For example, the power supply 118 may provide 24 volts direct current (VDC) to one or more of the SFTs 104. The power supply 118 may be configured to obtain power from building mains and then provide conditioned power for use. The SFTs 104 are connected to a network 120. The network 120 allows for communication between SFTs 104 and other devices, such as described below.

A clock 122 may provide a clock signal 124 or other clock data that is transmitted to the SFTs 104 using the network 120. In some implementations, the clock signal 124 may be distributed via another mechanism, such as by the power supply 118 by way of a power distribution network. For example, the clock signal 124 may be overlaid as an alternating current signal along one or more of the electrical conductors used to supply direct current power to the SFTs 104.

One or more processors of the SFTs 104 may generate tile output data 126. The tile output data 126 may include designation data 128. Designation data 128 may comprise a value that is associated with an object or group of objects. For example, the designation data 128 may represent a particular user 112 or group of users 112. The designation data 128 may comprise a value expressed using 9 or more bits. For example, the designation data 128 may comprise a 16 bit value. The EMS 106 is modulated to convey the designation data 128. For example, the modulation may comprise binary phase shift keying (BPSK). In other implementations, other modulation techniques may be used. For example, other types of phase modulation, amplitude modulation, frequency modulation, and so forth, may be used. Continuing the example, orthogonal frequency division multiplexing with code division multiple access (OFDM/CDMA) may be used.

The designation data 128 need not be permanently associated with a particular user 112. For example, each time the user 112 enters the facility they may be assigned designation data 128 that is different from their prior visits. In some implementations, the designation data 128 may change during a single visit. For example, for a first part of the user path 114, the user 112 may be associated with the designation data 128 value of "7531", while for a second part of the user path 114, the user 112 may be associated with the designation data 128 value of "9711".

During operation, while a first foot of the user 112 is in contact with a first SFT 104(1), the first SFT 104(1) may transmit a first EMS 106(1) that conveys designation data 128 associated with that user 112. The first EMS 106(1) is transferred via the body of the user 112, such as by a capacitive coupling, from the first foot to the second foot of the user 112. As the second foot comes into contact with a second SFT 104(2), the body of the user 112 conveys the first EMS 106(1) to the second SFT 104(2). At the second SFT 104(2), a receiver detects and demodulates the first EMS 106(1), recovering the designation data 128. The second SFT 104(2) then transitions to begin transmitting the designation data 128 as a second EMS 106(2). The transmitter of the SFT 104 modulates the EMS 106 to convey the designation data 128. Likewise, the receiver of the SFT 104 demodulates the EMS 106 to recover designation data 128.

As the user 112 walks across the floor 102, they act as a bridge between successive SFTs 104, with each SFT 104 first receiving the EMS 106 with the designation data 128 and then retransmitting the EMS 106 with the designation data 128. In some implementations, the EMS 106 may be used to convey other information as well. For example, the EMS 106 may also be used to convey a tile identifier indicative of a particular SFT 104. With this information, the receiving SFT 104 may have at least some information that may be used to determine a trajectory of the user 112.

The tile output data 126 may be transferred from the SFT 104 in the floor 102 to an inventory management system 130 via the network 120. Other information, such as the fixture output 132, may also be provided to the inventory management system 130.

The inventory management system 130 may include a tracking module 134. The tracking module 134 may use the tile output data 126 to generate tracking data 136. The tracking data 136 may include one or more of information indicative of the user path 114 within the facility, current location, location at a particular time, and so forth. In some implementations, the tracking module 134 may be executed as a tracking system, such as provided by one or more computing devices. The tile output data 126 may include the designation data 128 and object data. In some implementations, the tracking module 134 may use the object data to further distinguish between users 112. For example, the shape of the feet of the users 112, the distribution of signal amplitude with respect to those feet (such as greater signal strength at the toe than the heel), changes in frequency of the EMS 106 that differ between users 112, and so forth, may be used to develop signature data that is associated with a particular user 112 or other object to be tracked. This signature data may be used instead of, or in conjunction with, the designation data 128 to generate the tracking data 136.

An analysis module 138 may use the tracking data 136 to generate group data 140. The group data 140 may comprise information that associates a plurality of users 112 as belonging to a common group or having a common affiliation. For example, members of a family within the facility may be deemed to be a group, members of the same picking crew may be members of a group, and so forth. In some implementations, the tile output data 126 may be processed to determine the group data 140. For example, several users 112 may be holding hands or otherwise in physical contact with one another. As a result of this contact, the EMS 106 from a first SFT 104(1) may be transferred through those users 112 to the receivers of the SFTs 104 beneath each of them. By determining the presence of a plurality of users 112, such as by multiple footprints detected by the sensors within the SFTs 104 that share a common EMS 106 encoding of the same designation data 128, group data 140 may be determined.

The analysis module 138 may also generate interaction data 142. The interaction data 142 is indicative of an action such as picking or placing an item at a particular fixture 108, approaching but not touching an item stowed at the fixture 108, presence of the user 112 at the fixture 108, and so forth. For example, the analysis module 138 may use tracking data 136 to determine that a particular user 112 was in front of a particular fixture 108 at a time when that fixture 108 experienced a change in quantity of items stowed therein. Based on this correspondence, a particular user 112 may be associated with that change in quantity, and interaction data 142 indicative of this may be generated.

The analysis module 138 may also use the fixture output 132 or other data obtained from one or more sensors or other devices located at or near the fixture 108 to generate the interaction data 142. In one implementation, the fixture 108 may include one or more receivers that are able to receive the EMS 106. As the user 112 comes into contact with the item stowed at the fixture 108, their body and the item itself provide a pathway for the EMS 106 to be transferred to an antenna located at the fixture 108. As a result, use of the SFT 104 and the EMS 106 provides the additional benefit of unambiguously identifying an item that the user 112 interacted with. The analysis module 138 is configured to generate the interaction data 142 based on inputs including, but not limited to, the tile output data 126, the fixture 108, and so forth.

While FIG. 1 depicts the floor 102 as being completely covered with SFTs 104, in some implementations, only a portion of the floor 102 may include SFTs 104. For example, SFTs 104 may be placed down an aisle and not underneath fixed fixtures 108. In another example, the SFTs 104 may be deployed in front of the fixtures 108.

The inventory management system 130 may access data from other sensors within the facility. For example, image data may be obtained from a plurality of cameras located within the facility. Various image processing techniques may be used, such as object recognition, blob tracking, and so forth, to generate information from this image data. In some implementations, the image data may be processed by human operators. For example, a human operator may be presented with images as well as tracking data 136 to resolve an ambiguity or loss of tracking.

Figure 2:
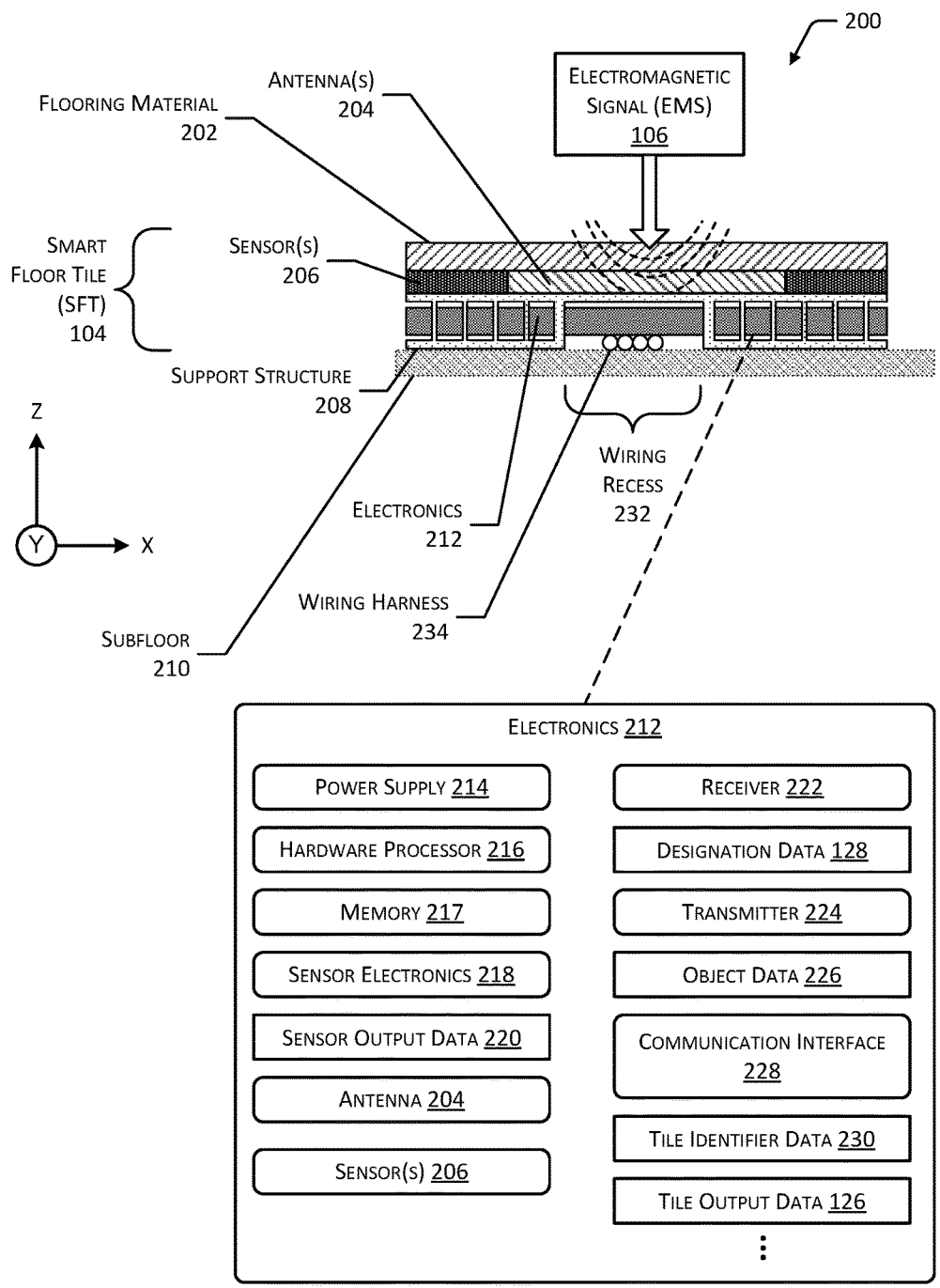
FIG. 2 illustrates the arrangement of components included in a smart floor tile, according to some implementations.

FIG. 2 illustrates the arrangement 200 of components included in a SFT 104, according to some implementations. A side view of a portion of the SFT 104 depicts a top layer comprising a protective material, such as flooring material 202. The flooring material 202 is electrically non-conductive under ordinary conditions. For example, the flooring material 202 may include plastic, ceramic, wood, textile, or other material. Beneath a layer of flooring material 202 may be one or more antennas 204 and one or more sensors 206. The antennas 204 may comprise structures designed to accept or emit radio frequency energy.

In some implementations, the SFT 104 may include a plurality of antennas 204. For example, the antennas 204 may be arranged to form an array. The SFT 104 may also include a plurality of sensors 206, and the sensors 206 may also be arranged to form an array. The sensors provide sensor output data. The arrangement of these two arrays may differ from one another. For example, the antennas 204 may be arranged in a square grid array of 5 antennas 204 to a side, 25 in all on the SFT 104. Continuing the example, the sensors 206 may be arranged at a greater density, with the same SFT 104 having a square grid array of 20 sensors to a side, 400 in all on the SFT 104. Thus, information obtained from the antennas 204 may have a lower spatial resolution than the information obtained from the sensors 206. In some implementations, the antennas 204 may have a surface area of at least 1 square inch.

As illustrated here, the antennas 204 and the sensors 206 may be located within a common plane. In other implementations, the antennas 204 may be arranged within a layer that is above the sensors 206, below the sensors 206, and so forth. A load bearing support structure 208 may be beneath the sensors 206 and the antennas 204 and provides mechanical and physical separation between the underlying subfloor 210 upon which the SFT 104 rests and the flooring material 202. The support structure 208 may comprise a series of pillars, posts, ribs, or other vertical elements. The support structure 208 may comprise a composite material, plastic, ceramic, metal, or other material. In some implementations the support structure 208 may be omitted, and the electronics 212 or structures associated with the electronics 212 may be used to support a load on the flooring material 202. For example, the electronics 212 may comprise a glass fiber circuit board that provides mechanical support while also providing a surface for mounting the electronics 212. The subfloor 210 may comprise concrete, plywood, or existing flooring materials over which the SFT 104 is installed. In some implementations, the SFT 104 may be affixed to the subfloor 210, or may be unaffixed or "floating". For example, the SFT 104 may be adhered to the subfloor 210 using a pressure sensitive adhesive.

The SFT 104 includes electronics 212. The electronics 212 may include the elements described elsewhere in more detail. In the implementation depicted here, electronics 212 are arranged within the support structure 208. In some implementations, one or more of the antennas 204 or the sensors 206 may be located within the support structure 208. The support structure 208 may operate as a heat sink to dissipate heat generated by operation of the electronics 212.

The SFT 104 may include a power supply 214. The power supply 214 may include an electric power interface that allows for coupling to the power supply 118. For example, the electrical power interface may comprise connectors, voltage converters, frequency converters, and so forth. The power supply 214 may include circuitry that is configured to provide monitoring or other information with regard to the consumption of electrical power by the other electrical power components of the SFT 104. For example, the power supply 214 may include power conditioning circuitry, DC to DC converters, current limiting devices, current measurement devices, voltage measurement devices, and so forth. In some implementations, the SFT 104 may be configured to connect to redundant power buses. For example, a first electrical distribution network such as an "A" bus and a second electrical distribution network such as a "B" bus may be provided, each of which can provide sufficient electrical power for operation. In some implementations, the SFT 104 may incorporate redundant power supplies 214.

The SFT 104 may include one or more hardware processors 216. Hardware processors 216 may include microprocessors, microcontrollers, systems on a chip, field programmable gate arrays (FPGAs), and so forth. The SFT 104 may also include one or more memories 217. The memory 217 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 217 provides storage of computer-readable instructions, data structures, program modules, and other data for the operation of the SFT 104.

The SFT 104 may include sensor electronics 218. The sensor electronics 218 may be configured to acquire information from the sensors 206. In one implementation, the sensors 206 may comprise electrodes or other electrically conductive elements that are used as part of a capacitive sensor array. In one implementation, the electrodes may be arranged in an array. Each electrode may be rectangular with a first side and a second side, with the length of the first side and the second side being between 10 millimeters and 50 millimeters. In other implementations, other shapes and sizes may be used.

The sensor electronics 218 may include capacitive measurement circuitry that generates capacitance data. The capacitance measurement circuitry may use various techniques to determine capacitance. For example, the capacitance measurement circuitry may include a source that provides a predetermined voltage, a timer, and circuitry to measure voltage of the conductive element relative to the ground. By determining an amount of time that it takes to charge the conductive element to a particular voltage, the capacitance may be calculated. The capacitance measurement circuitry may use one or more of analog or digital circuits to determine capacitance. During operation, the capacitive sensor uses a conductive element located beneath the flooring material 202 to produce capacitance data indicating capacitance values at particular times. Based on the capacitance data, information such as a presence of an object, shape of an object, and so forth, may be generated to produce sensor output data 220. The sensor electronics 218 may be configured to scan the sensors 206 and generate sensor output data 220 at least 30 times per second. The sensor output data 220 may include information about proximity of an object with respect to a particular electrode. The sensor output data 220 may be further processed to generate the object data 226.

In other implementations, the sensors 206 may comprise optical touch sensors comprising one or more illuminators and one or more photodetector elements, resistive touch sensors comprising electrically resistive material, acoustic touch sensors comprising one or more transducers, and so forth.

The hardware processor 216 may be configured to generate object data 226 at least 30 times per second. For example, the sensor electronics 218 may sample data one hundred times per second and the hardware processor 216 may generate object data 226 one hundred times per second.

The SFT 104 may include a receiver 222. The receiver 222 is configured to detect the EMS 106. The receiver 222 may be implemented as discrete circuitry, as a software defined radio (SDR), and so forth. The receiver 222 is coupled to one or more of the antennas 204. In some implementations, a single receiver 222 may be coupled to a single antenna 204. In other implementations, a single receiver 222 may be coupled to a plurality of antennas 204 by way of switching circuitry. The switching circuitry may allow the selective connection of a particular antenna 204 to the receiver 222. The receiver 222 may be configured to demodulate a phase modulated input signal.

In some implementations, elements of the sensors 206 may be combined or used in conjunction with the antennas 204. For example, electrically conductive elements may be used for both capacitive sensing by the sensor 206 and as antennas 204. This dual use may occur at the same time or may be multiplexed over time. For example, switching circuitry may, at a first time, selectively connect the sensor electronics 218 to the electrically conductive element for use as a capacitive sensor pad. The switching circuitry may then selectively connect, at a second time, the receiver 222 to the same electrically conductive element for use as an antenna 204.

The EMS 106 is acquired by the antenna 204 and then provided to the receiver 222. For example, the receiver 222 may comprise a superheterodyne receiver, with an incoming radio signal being converted to an intermediate frequency by a mixer. At the intermediate frequency stage, the downconverted signal is amplified and filtered before being fed to a demodulator. The receiver 222 demodulates the EMS 106 to determine the designation data 128. The receiver 222 or the hardware processor 216 decode, decrypt, or otherwise process the demodulated signal to determine the designation data 128. For example, the receiver 222 may provide as output the digital representation of a signal that incorporates BPSK. The hardware processor 216 may process this digital representation to recover a serial data stream that includes framing, error control data, payload, and other information. The payload may then be processed to produce the designation data 128. The error control data may include error detection data such as parity check data, parity bits, hash values, and so forth. For example, a hash function may be applied to the designation data 128 to generate hash output. A comparison of the hash output may be made to determine if an error is present.

The SFT 104 may also include a transmitter 224. For example, the transmitter 224 may comprise a voltage controlled oscillator that generates an output signal that is fed directly to a power amplifier. The transmitter 224 is configured to accept input and generate the EMS 106. For example, the input may comprise designation data 128, or a digital representation of a signal that is to be modulated by the transmitter 224. The transmitter 224 couples to an antenna 204, which then radiates the EMS 106. The transmitter 224 may be implemented as discrete circuitry, SDR, or combination thereof. The transmitter 224 may be configured to produce a phase modulated output signal. The transmitters 224 for the SFTs 104 in a given floor 102 may operate on a single frequency, or may be frequency agile and operate on a plurality of different frequencies. In some implementations, the receiver 222 and the transmitter 224 may be combined or share one or more components. For example, the receiver 222 and the transmitter 224 may share a common oscillator or frequency synthesizer.

The hardware processor 216 may acquire data from one or more of the sensors 206, the receiver 222, transmitter 224, and so forth, to generate object data 226. The object data 226 comprises information about an object that is resting on or proximate to the flooring material 202. The information may be indicative of a shape of the object. In some implementations, the object data 226 may comprise information that is representative of the contours of an object. For example, the object data 226 may comprise a bitmap representative of the output from a plurality of sensors 206 and indicative of their relative arrangement. In another example, the object data 226 may comprise a vector value that is indicative of polygons used to represent an outline of an object. In some implementations, the object data 226 may be indicative of an area of the object. For example, the object data 226 may indicate that the total area of an object is 48 square centimeters. The object data 226 may include other information such as information about amplitude of a received EMS 106 with respect to different portions of the object. For example, object data 226 may be generated that indicates the shape of the object with information about amplitude, frequency, or other details about the EMS 106 at particular points or areas within that shape.

In some implementations, one or more of the receiver 222 or the transmitter 224 may be used to generate the sensor output data 220. For example, sensor electronics 218 may communicate with power supply 214 to determine the amount of electrical current that is being drawn at a particular time by the transmitter 224. As the electrical coupling between an object above the SFT 104 and one or more of the antennas 204 changes, one or more operating characteristics of the devices in the SFT 104 may change. For example, the impedance of the antenna 204 may experience change. Changes in the impedance may result in a change in the power output of the transmitter 224 during operation. For example, the transmitter 224 may exhibit an impedance mismatch with the antenna 204 in the presence of an object, such as a foot. This impedance mismatch may result in reduced power consumption by the radio frequency amplifier of the transmitter 224. Information about changes in the operational characteristics, such as a change in current draw by the transmitter 224, may be processed to determine the presence or absence of an object with respect to the antenna 204. The operating characteristics may include, but are not limited to: received signal strength at the receiver 222, power consumption of the transmitter 224, radio frequency power output of the transmitter 224, impedance presented at an antenna 204, standing wave ratio (SWR), and so forth. For example, the impedance of the antenna 204 may be measured as a radio frequency input to the receiver 222, a radio frequency output of the transmitter 224, and so forth. In another example, the SWR presented by one or more of the antennas 204 may be similarly measured. In other implementations, other operating characteristics may be used. For example, a change in the noise detected by the receiver 222 may be used to determine presence or absence of an object. In yet another implementation, the transmitter 224 of the SFT 104 may generate a signal that is then received by the receiver 222 of the same SFT 104. A change in the received signal at a particular antenna 204 may be used to determine the presence of an object.

By combining information from a plurality of antennas 204, object data 226 may be generated. In other implementations, other characteristics of the receiver 222 or the transmitter 224 may be assessed to generate the object data 226 or other information indicative of proximity of an object to the antenna 204. For example, the change in impedance may be measured, a change in background noise level may be measured, and so forth. In some implementations, radio ranging may be utilized in which the transmitter 224 emits a pulse and the receiver 222 listens for a return or echo of that pulse. Data indicative of proximity from several antennas 204 may then be processed to generate the object data 226. In another implementation, a distance between the object and the antenna 204 may be determined using the amplitude of the received EMS 106. For example, a lookup table may be used that associates a particular received signal strength with a particular distance from the antenna 204.

The communication interface 228 connects the SFT 104 to the network 120. For example, the communication interface 228 may be able to connect to one or more of a Controller Area Network (CAN bus), Inter-Integrated Circuit (I2C), Serial Peripheral Interface bus (SPI), 1-Wire bus, Universal Serial Bus (USB) as promulgated by the USB Implementers Forum, RS-232, Ethernet, Wi-Fi, Bluetooth, and so forth. The communication may be facilitated by data connectors, such as optical connectors, electrical connectors, and so forth. The data connectors provide a pathway for signals to be exchanged between the communication interface 228 and the network 120.

The SFT 104 may include non-transitory computer readable media that is used to store instructions, data, and so forth. Tile identifier data 230 comprises information indicative of a particular SFT 104. The tile identifier data 230 may be unique within the particular network 120, the facility, unique across the production of all SFTs 104 manufactured, and so forth. In some implementations, a media access control (MAC) address, network address, bus address, and so forth, that is associated with the communication interface 228 may be used as tile identifier data 230.

During operation, the hardware processor 216 may generate tile output data 126. As described above, the tile output data 126 may include the designation data 128. In some implementations, the tile output data 126 may indicate the designation data 128 was received, and the designation data 128 that has been transmitted. The tile output data 126 may also include the tile identifier data 230, timestamp data, and so forth. For example, the timestamp data included in the tile output data 126 may indicate when the designation data 128 was received by the receiver 222.

The electronics 212 of the SFT 104 may include multiple hardware processors 216 with different capabilities. For example, individual segments of the sensors 206 may utilize dedicated state machines to perform simple processing functions. These dedicated state machines may then send output data to a microcontroller that provides additional processing to generate sensor output data 220. In one implementation, the dedicated state machine may comprise a complex programmable logic device (CPLD). Continuing the example, a dedicated state machine may provide a 4 bit value indicative of the capacitance measured by a capacitive sensor 206 at a particular segment. The microcontroller may have information that describes a relative arrangement of the sensors 206, and may use this information in conjunction with the dedicated state machine output to generate a bitmap.

Various techniques may be used to increase the overall uptime of an individual SFT 104, and functionality of the floor 102 as a whole. In one implementation, the SFT 104 may include additional components to provide for failover redundancy. For example, the SFT 104 may include at least two hardware processors 216, each of which is able to generate object data 226, generate tile output data 126, and so forth. In another example, the SFT 104 may include two power supplies 214, each connected to a different bus or power supply 118.

To provide additional redundancy, adjacent SFTs 104 may be connected to different networks 120. For example, an SFT 104 may be connected to a first network 120(1) while the SFT 104 immediately to the right may be connected to a second network 120(2).

The SFT 104 may be configured to perform diagnostics of onboard components, adjacent SFTs 104, and so forth. For example, the SFT 104 may be configured to test the receiver 222 and the transmitter 224 by transmitting a signal from the first antenna 204(1) and listening with the receiver 222 with a second antenna 204(2) that is adjacent to the first antenna 204(1). In some implementations, the SFT 104 may be configured to send diagnostic data using the network 120. For example, diagnostic data may be sent to the inventory management system 130 indicating that a particular SFT 104 has a fault and requires repair or replacement. The SFT 104 may be designed in a modular fashion to allow for repair or replacement without affecting adjacent SFTs 104.

The SFT 104 may include one or more other sensors, such as described below. For example, a magnetometer may be included that provides information about local magnetic fields.

The SFT 104 may incorporate a wiring recess 232 on an underside of the SFT 104. For example, the support structure 208 and the electronics 212 may be formed or arranged to provide a pathway for a wiring harness 234 to pass beneath at least a portion of the SFT 104. The wiring recess 232 may extend from one edge of the SFT 104 to another, may extend in different directions, and so forth. For example, the wiring recess 232 may be arranged in a "+" or cross shape, allowing for wiring harnesses 234 to pass along the X or Y axes as depicted here.

The wiring harness 234 may provide a coupling to one or more of the power supply 118, the network 120, and so forth. For example, the wiring harness 234 may include conductors that allow for the SFT 104 to receive electrical power from an electrical distribution network, allow for connection to the CAN bus network that services a cluster of SFTs 104, and so forth. The wiring harness 234 may include electrical conductors, electromagnetic waveguides, fiber optics, and so forth. In some implementations, a plurality of wiring harnesses 234 may be used. For example, a first wiring harness 234(1) may provide electrical power while a second wiring harness 234(2) provides network connectivity. In some implementations, such as described below with regard to FIG. 7B, the wiring harness 234 may be used to provide information used to determine a relative arrangement of SFTs 104.

Figure 3:
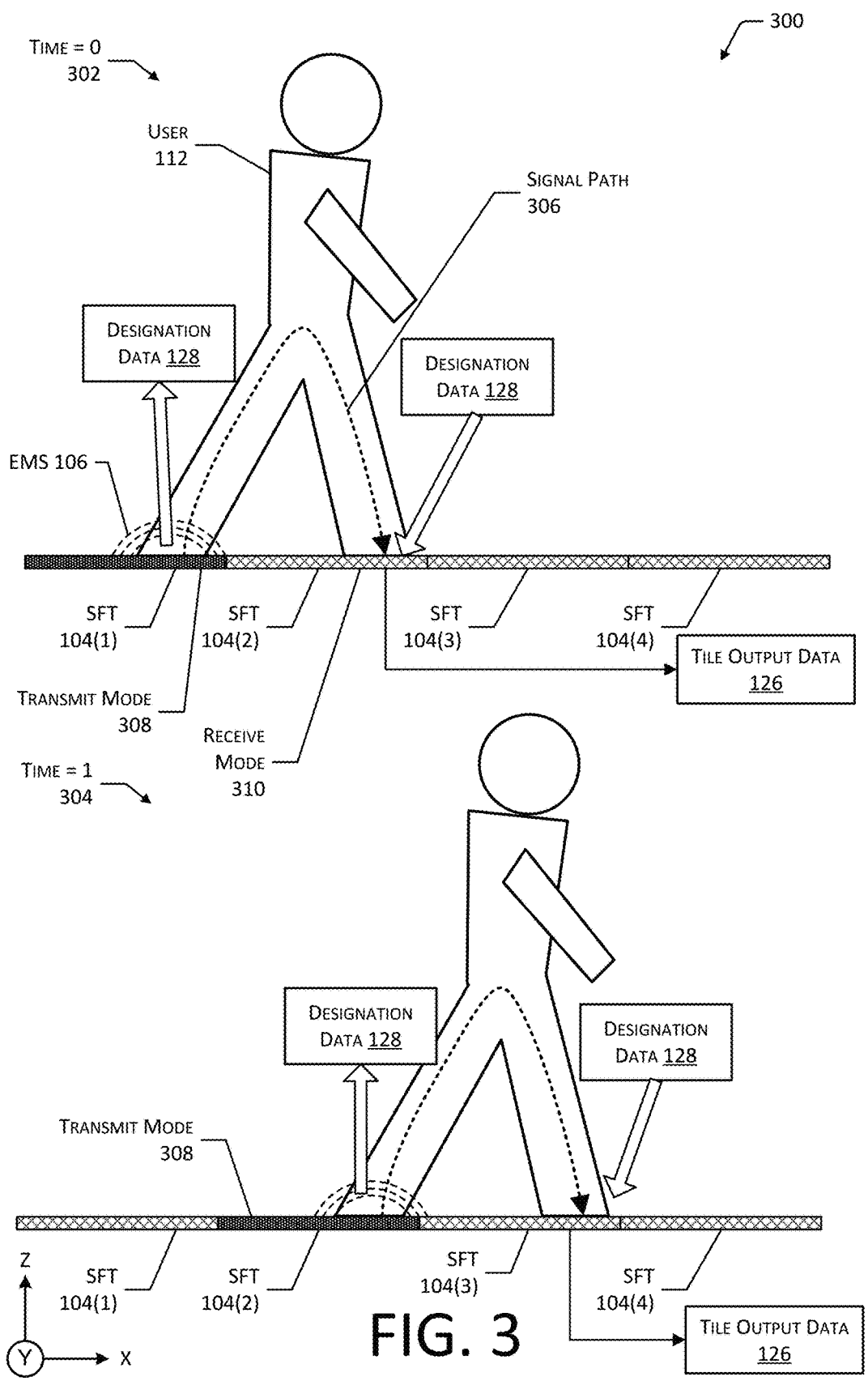
FIG. 3 illustrates dynamic signal transfer tracking using an electromagnetic signal transferred from one smart floor tile to another using the body of a user, according to some implementations.

FIG. 3 is an illustration 300 of dynamic signal transfer tracking using an EMS 106 transferred from one SFT 104 to another using the body of a user 112, according to some implementations.

In this illustration, two different times are depicted. Time=0 is depicted at 302 and time=1 is depicted at 304. At 302, the user 112 has a first foot located on a first SFT 104(1), and a second foot located on a second SFT 104(2). The body of the user 112 provides a signal path 306 between the first SFT 104(1) and the second SFT 104(2) for EMSs 106 to propagate. The body of the user 112, or another object proximate to the antenna 204, may electromagnetically couple to the antenna 204. This electromagnetic coupling may include, but is not limited to, capacitive coupling, electrostatic coupling, inductive coupling, and so forth. In other implementations, other types of coupling may take place.

At 302, the first SFT 104(1) is in a transmit mode 308 in which the first transmitter 224(1) is active and emitting, via a first antenna 204(1), a first EMS 106(1) that conveys designation data 128. For example, the EMS 106 may be modulated using BPSK to convey a 16 bit identification value. The first EMS 106(1) follows the signal path 306 from the first foot of the user 112 to the second foot of the user 112 which is placed at the second SFT 104(2). The second SFT 104(2) is in a receive mode 310. A receiver 222 at the second SFT 104(2) detects the first EMS 106(1) and the second SFT 104(2) subsequently recovers the designation data 128 from the first EMS 106(1).

At 304, time has progressed, and the user 112 has stepped forward placing their first foot on a third SFT 104(3) while the second foot remains of the second SFT 104(2). The first SFT 104(1) is no longer in the transmit mode 308. The second SFT 104(2) is in a transmit mode 308, transmitting a second EMS 106(2) that conveys the same designation data 128. The designation data 128 is thus transferred from the first SFT 104(1), to the second SFT 104(2), to the third SFT 104(3), and so on, as the user 112 walks.

As the user 112 moves throughout the facility, the designation data 128 travels with the user 112. If the user 112 alights on a SFT 104 without designation data 128, the SFT 104 may be configured to generate the designation data 128. For example, as a user 112 enters the facility through the entry 110, the user 112 presents no EMS 106 to the entryway SFT 104. As a result, the SFTs 104 within the entryway may generate or assign the designation data 128 that is then transmitted using an EMS 106.

The SFT 104 may then generate tile output data 126 that is sent via the network 120. For example, the tile output data 126 including designation data 128, tile identifier data 230, and other information may be sent to the inventory management system 130. The tracking module 134 may then generate tracking data 136 from the tile output data 126.

In some implementations, the entry 110 may include authentication stations, gates, or other devices to acquire information from the user 112 upon entry or to control entry to the facility. For example, the user 112 may present a smartphone or other device that has displayed onscreen a barcode that, when scanned, permits entry to the facility. The SFT 104 associated with a foot of the user 112 that is closest to the authentication station may be configured to transmit the EMS 106. In another example, a transmit-only version of the SFT 104 may be installed proximate to the authentication station. As the user 112 transitions from the transmit-only SFTs 104 at the authentication station to the remaining SFTs 104 in the facility, the designation data 128 may then be transferred as described above.

Figure 4:
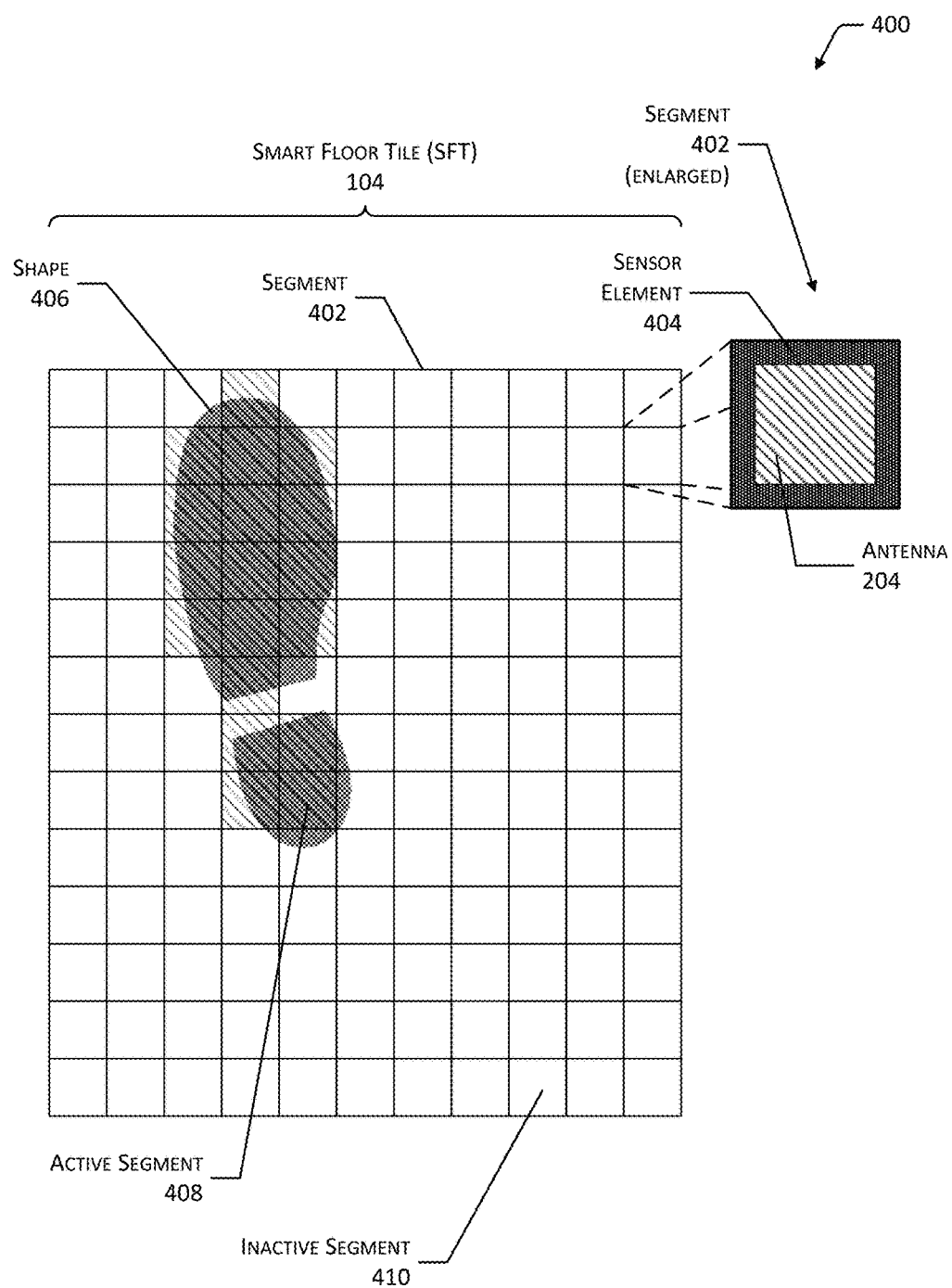
FIG. 4 illustrates an overhead view of the smart floor tile including sensors to generate object data indicative of a shape of the user's foot on the smart floor, according to some implementations.
Figure 4:
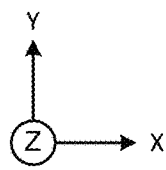

FIG. 4 illustrates an overhead 400 view of the SFT 104 including sensors 206 to generate object data 226. As described above, the object data 226 may be indicative of a shape of the user's 112 feet on the floor, according to some implementations.

The SFT 104 may comprise a plurality of segments 402. In this illustration, an enlargement of the segment 402 is depicted. In this illustration, the antenna 204 and the sensor element 404 are arranged in the same layer or plane. In one implementation, such as depicted here, each segment 402 may comprise an antenna 204 and a sensor element 404. In another implementation, each segment 402 may comprise sensor elements 404, and the antenna 204 may be separate and not part of the segment 402. The antenna 204 may be configured to connect to one or more of the receiver 222 or the transmitter 224. The sensor element 404 may be connected to sensor electronics 218, such as a CPLD. For example, each segment 402 may have a discrete CPLD acting as a dedicated state machine. The CPLD may communicate with one or more hardware processors 216.

The density, size, and placement of the antennas 204 and the sensors 206 of the SFT 104 may vary. For example, the SFT 104 may include an array of individual antennas 204, with each individual antenna 204 having an area that is larger than a sensor element 404. Continuing the example, the antennas 204 may be square measuring 120 mm on a side while the sensor elements 404 are square measuring 40 mm on a side.

By using the sensor output data 220, the hardware processor 216 of the SFT 104 generates object data 226. The object data 226 may be representative of one or more of an outline or area of a shape 406. For example, the object data 226 may be indicative of an area covered by the foot of the user 112.

In one implementation, the object data 226 may be expressed as a bitmap. Each element or pixel in the bitmap may comprise a value representative of the capacitance measured at a particular segment 402. In other implementations, the elements of the bitmap may comprise a value representative of other characteristics, such as amplitude of a received signal, frequency of a received signal, and so forth. The sensor electronics 218 may generate object data 226 at different points in time. Object data 226 acquired at different times may be combined to provide information, such as a video of the shape 406 as it changes over time. For example, the object data 226 obtained at several successive intervals provides information about the gait of the user 112.

In some implementations, operation of segments 402 may be responsive to presence or absence of an object. For example, segments 402 that are proximate to or underneath the object forming the shape 406 may be deemed active segments 408. Antennas 204 associated with these active segments 408 may be used transmit or receive the EMS 106. Inactive segments 410 comprise segments 402 that are not underneath or proximate to the shape 406. The determination of whether a segment 402 is active or not may be based at least in part on output from the sensor elements 404, antennas 204, or other sensors. For example, a segment 402 may be deemed to be an active segment 408 when the associated sensor element 404 exhibits a capacitance value that exceeds a threshold level.

During operation, the determination of which segments 402 are active may be used to determine which antennas 204 are used to one or more of transmit or receive the EMS 106. For example, the antennas 204 beneath inactive segments 410 may be disconnected from receivers 222, or the receivers 222 associated with those antennas 204 may be placed in a low power mode or turned off. As an object is detected by the sensor element 404 as driven using the sensor electronics 218, a particular segment 402 may be designated as an active segment 408. In this illustration, the active segments 408 are represented with a crosshatch pattern. The antenna 204 and associated radio frequency elements such as the receiver 222 and the transmitter 224 associated with that antenna 204 may be transitioned to an operational mode. Continuing the example, the receiver 222 may begin listening for an EMS 106. Once the EMS 106 had been successfully received, a second EMS 106 may be transmitted, as described above with regard to FIG. 3.

As described above, the SFT 104, or portions thereof such as segments 402, may transition from a receive mode 310 to a transmit mode 308 or vice versa. This transition may be responsive to the detection of an object by the sensor 206. For example, the presence of an object followed by the absence of the object may result in the SFT 104 transitioning from the transmit mode 308 to the receive mode 310.

By selectively transmitting the EMS 106 using antennas 204 that are within a threshold distance of the shape 406 as determined by the sensors 206, performance of the system may be improved. For example, power consumption may be reduced by transmitting using only those antennas 204 that are proximate to the object producing the shape 406.

In some implementations, some of the active segments 408 may be in transmit mode 308 while other active segments 408 are in receive mode 310. For example, the active segments 408 at the front of the foot (under the ball of the foot) may be in transmit mode 308 while the remaining active segments 408 for that foot (under the heel) are in receive mode 310.

The sensors 206 in the SFT 104 may be used to determine the presence of hazardous conditions at the SFT 104. For example, the sensors 206 may be able to detect a liquid that is present on the flooring material 202 that may comprise a slipping hazard. Continuing the example, a puddle of water on the flooring material 202 may be detected. Information indicative of the puddle may be provided to the inventory management system 130 for mitigation, such as clean up. In another example, the sensors 206 may be able to detect a user 112 lying on the flooring material 202. Upon such detection, an attendant of the facility may be alerted to provide assistance to the user 112. With this example, the floor 102 provides information to the operators the facility that may be used to improve the safety of the facility for the users 112.

Figure 5:
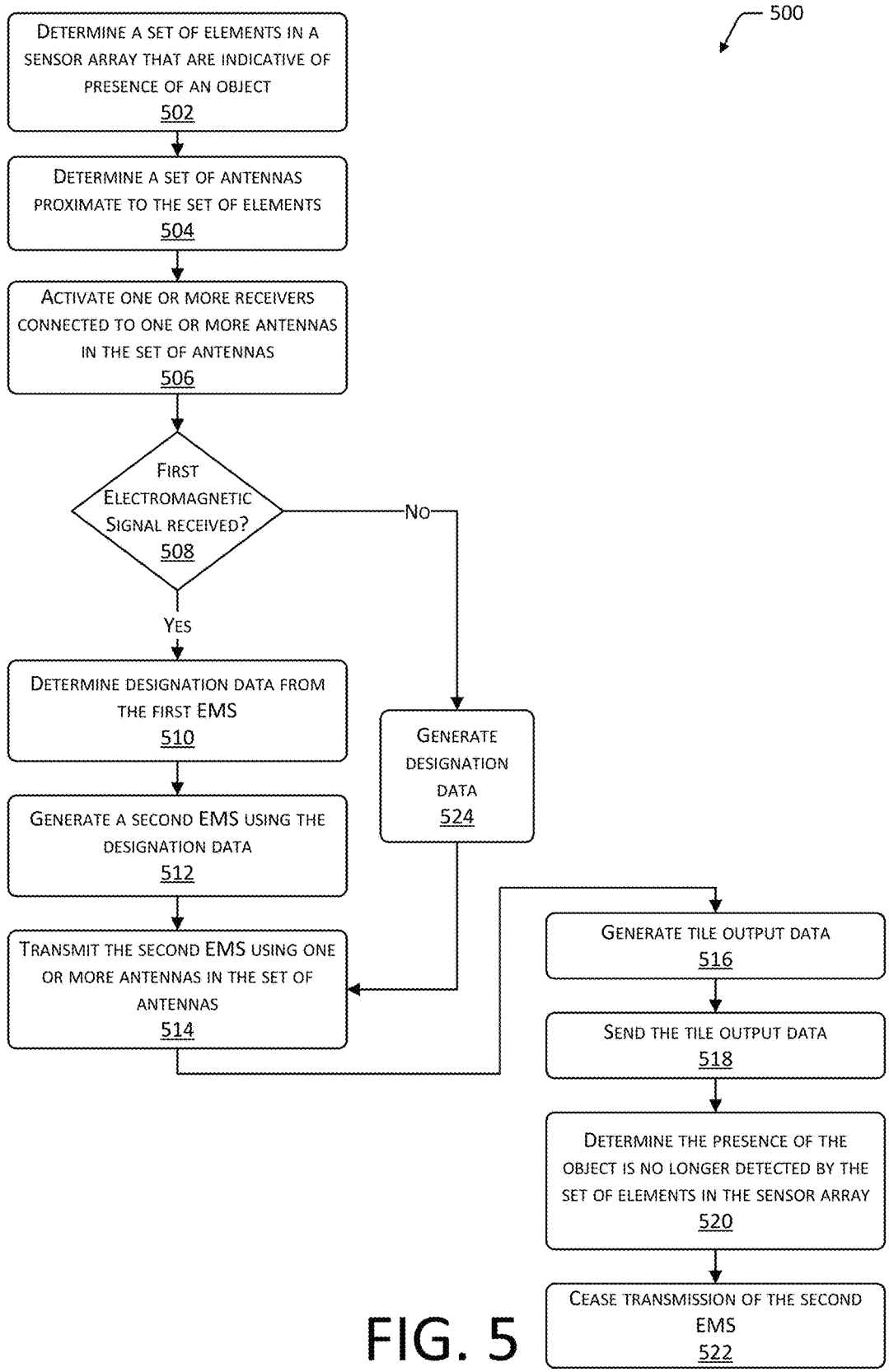
FIG. 5 depicts a flow diagram of a process of dynamic signal transfer tracking, according to some implementations.

FIG. 5 depicts a flow diagram 500 of a process of dynamic signal transfer tracking, according to some implementations. The process may be implemented at least in part by one or more of the SFT 104, the inventory management system 130, or another device.

At 502, a set of elements in a sensor array are determined that are indicative of presence of an object. For example, the sensor electronics 218 may generate sensor output data 220 indicative of presence of an object at particular segments 402 of the SFT 104.

In some implementations, the object data 226 may be used. Instead of determining the presence of an object, the presence of a particularly shaped object may be used to initiate the remainder of the process. For example, a handheld tote 116 that has been placed on the floor 102 may result in no further action while an object shaped like a foot may result in the initiation of the remainder of the process.

Various shape recognition techniques may be used to determine if the object represented in the object data 226 corresponds to another shape, or is to be classified as a particular kind of shape. For example, a set of cascade classifiers may be trained to recognize the difference between feet and totes 116.

At 504, a set of antennas 204 that are proximate to the set of elements are determined. For example, the antennas 204 within each of the segments 402 may be determined. In another example, where the antennas 204 and the sensor elements 404 encompass different areas, the antennas 204 that are within a threshold distance of the set of elements indicative of presence of an object may be determined by using a look up table or other data structure that associates particular antennas 204 with particular segments 402. In implementations where the receivers 222 have fixed connections to particular antennas 204, the system may determine particular receivers 222 that are connected to antennas 204 which are proximate to the set of elements that are indicative of presence of an object. Other aspects of operation may also be considered by the determination of the set of antennas 204 that are proximate to the set of elements. For example, effects from adjacent elements such as other antennas 204, sensor elements, and so forth, may be considered.

At 506, one or more receivers 222 are activated that are connected to one or more antennas 204 in the set of antennas 204. For example, the receivers 222 that are connected to one or more antennas 204 that are under or near to the foot of the user 112 may be transitioned from a standby mode to an operational mode that is ready to receive data.

At 508, a determination is made as to whether a first EMS 106(1) has been received by the receiver 222. If the first EMS 106(1) has been received, the process continues to 510. As described above, the EMS 106 is propagated at least in part by a body of the user 112 or another proximate object. The body of the user may be coupled electromagnetically to the antenna 204 of the SFT 104. For example, the foot of the user 112 may be capacitively coupled to the antenna 204 in the SFT 104.

At 510, designation data 128 is determined from the first EMS 106(1). For example, the first EMS 106(1) may be demodulated to recover designation data 128 conveyed thereby.

At 512, a second EMS 106(2) is generated using the designation data 128. In some implementations, this generation may include modulating a carrier using a representation of the designation data 128.

At 514, the second EMS 106(2) is transmitted using one or more antennas 204 in the set of antennas 204. Continuing the example above, the antennas 204 that are beneath or near to the foot of the user 112 are used to radiate the second EMS 106(2) produced by the transmitter 224. For example, a location of the object such as the foot may be determined relative to the device. As described above with respect to 502 and 504, the antennas 204 that correspond to the location of the object may be determined. In another implementation, the set of antennas 204 used to radiate the second EMS 106(2) may be different from that used to receive the first EMS 106(1). The transmission of the second EMS 106(2) may be based on the receipt of the first EMS 106(1).

The duration of the EMS 106 may be such that it is sufficient to allow for transmission along the signal path 306 while it is established. For example, during a normal walking gait, both feet of the user 112 may be in contact with the floor 102 for at least 40 ms. The transmission of the EMS 106 may be configured such that transmission of the designation data 128 is complete in less than 40 ms.

The EMS 106 may include multiple copies or repetitions of the same designation data 128. For example, the EMS 106 may repeat the designation data 128 multiple times. In this implementation, the transmission time of the designation data 128 may be shorter, such as being configured to complete in less than 10 ms, such that multiple iterations of the designation data 128 may be transmitted in the 40 ms window permitted by the gait of the user 112. In some implementations, the designation data 128 may include error detection or correction data. For example, the designation data 128 may include a checksum value, parity bit, and so forth. Continuing the example, a cyclic redundancy check may be used to detect errors in the designation data 128.

The received designation data 128 or other information transmitted by the EMS 106 may be stored in memory and then subsequently processed to determine the presence of one or more errors. Various techniques to detect or mitigate transmission errors may also be used, either alone or in combination. For example, a hash function may be applied to the designation data 128, and hash output that results from that hash function may be included with the designation data 128.

In some implementations, the integrity of the designation data 128 that has been received may be checked. The integrity may be assessed by determining a number of errors in the designation data 128, or whether the designation data 128 was transmitted without error. For example, if a number of errors in the data received is less than a threshold number of errors, the transmission may be deemed successful and that designation data 128 may be re-transmitted. Many techniques may be used to determine errors present in the designation data 128 transmitted using the EMS 106. For example, multiple versions of the designation data 128 that have been received may be compared to determine if there are any discrepancies between them. A histogram may be generated that indicates the number of copies of particular designation data 128 received. The value of the designation data 128 that was received the greatest number of times may be deemed to be the correct version. In another example, a checksum may be used to determine if the designation data 128 was garbled during transmission. In some implementations, the transmission of the second EMS 106(2) may be based at least in part on the determining the number of errors is less than the error threshold value. Continuing the example, the error threshold value may be zero, such that the designation data 128 must be received with no detected errors before re-transmittal.

The EMS 106 may transfer the designation data 128 without the use of a preamble. The preamble may also be known as a sync sequence and is used to provide synchronization between the transmitter 224 and the receiver 222 of a wireless communication. By omitting the preamble, overall transmission time of the designation data 128 may be reduced. In some implementations, the preamble may be omitted when the SFTs 104 that are involved in transmission and reception of the EMS 106 are within a threshold phase value of one another with regard to the clock signal 124. For example, the first SFT 104(1) and the second SFT 104(2) may both receive the clock signal 124 from the clock 122. With the onboard clocks 122 of the respective receivers 222 being coordinated or synchronized to within a threshold phase value, the information within the EMS 106 may be recovered without the use of a preamble. In comparison, if each of the SFTs 104 utilize a free running clock 122, the preamble may be utilized to provide timing and synchronization data to allow for recovery of the designation data 128.

Error correction and detection of the designation data 128 may also utilize the network 120. Tile output data 126 may be exchanged between at least adjacent SFTs 104. The tile output data 126 may then be used to compare with the designation data 128 received via the EMS 106. For example, the first SFT 104(1) may transmit the EMS 106 conveying a designation data 128 value of "49131" and also transmit tile output data 126 on the network 120 with this information. The second SFT 104(2) may receive the EMS 106 but, due to transmission difficulty, determines a designation data 128 value of "4913?" with the last digit being lost. The second SFT 104(2) also receives the tile output data 126 from the network 120. The second SFT 104(2) may use the tile output data 126 received from the network 120 to determine that the EMS 106 as received was intended to be "49131", and that value is used going forward as the designation data 128.

In some implementations, the transition from receiving to transmitting may involve a delay. This delay may reduce the amount of time spent transmitting by avoiding transmission during the time when the leg of the user 112 is still being brought forward. A transmit delay interval indicative of a length of time may be accessed. A timer may then be started after receiving the first EMS 106(1). The timer generates a timer output value indicative of elapsed time. In other implementations, the timer may count down to similar effect. The transmission of the second EMS 106(2) may be based at least in part on determining that the timer output value is greater than or equal to the transmit delay interval.

At 516, tile output data 126 is generated. For example, the hardware processor 216 may generate tile output data 126 that includes a timestamp, designation data 128, and tile identifier data 230.

At 518, the tile output data 126 is sent. For example, the communication interface 228 of the SFT 104 may be used to transmit the tile output data 126 to the inventory management system 130 using the network 120.

At 520, the presence of the object is determined to be no longer detected by the set of elements of the sensor array. For example, sensor output data 220 provided by the sensor electronics 218 may indicate that an object is no longer present proximate to the flooring material 202 of the SFT 104.

In some implementations, the operation of 520 may be omitted. For example, the second EMS 106(2) may be transmitted for a predetermined period of time, after which transmission ceases.

At 522, transmission of the second EMS 106(2) ceases. For example, responsive to the foot of the user 112 now being removed from the SFT 104, transmission of the EMS 106 stops.

Returning to 508, if the determination is that the first EMS 106(1) has not been received or the transmission was otherwise unsuccessful, the process may proceed to 524. Transmission may be unsuccessful due to interference, loss of data, and so forth. In some implementations, a predetermined time window may be specified after the determination of the presence of an object by the sensors 206 within which the first EMS 106(1) may be detected. For example, a failure to receive the first EMS 106(1) within 20 ms of the detection of an object may result in the process proceeding to 524.

At 524, designation data 128 is generated or accessed. For example, the SFT 104 may generate designation data 128. In another example, the SFT 104 may request from the inventory management system 130 or another device on the network 120 one or more values to be used as designation data 128. In some implementations, the designation data 128 may be based at least in part on a randomly (or pseudo-randomly) generated number, tile identifier data 230, previously assigned values, and so forth. For example, the inventory management system 130 may provide the SFT 104 with a set of values that may be used as designation data 128. The values in each set may be distinct from values in other sets, such that there are no duplicates among the sets of values. In one implementation, the designation data may be based on the tile identifier and the previously assigned value. For example, the tile identifier and the previously assigned value may be concatenated with one another. After 524, the process may proceed to 514 as described above.

In some implementations, the operations of 502 and 504 may be omitted. For example, the receivers 222 may be configured to listen for the first EMS 106(1). Continuing the example, the receivers 222 may operate at a reduced duty cycle to conserve power or other resources. For example, a first half of the receivers 222 within a particular SFT 104 may be in a standby mode while a second half of the receivers 222 listen for the first EMS 106(1).

Figure 6:
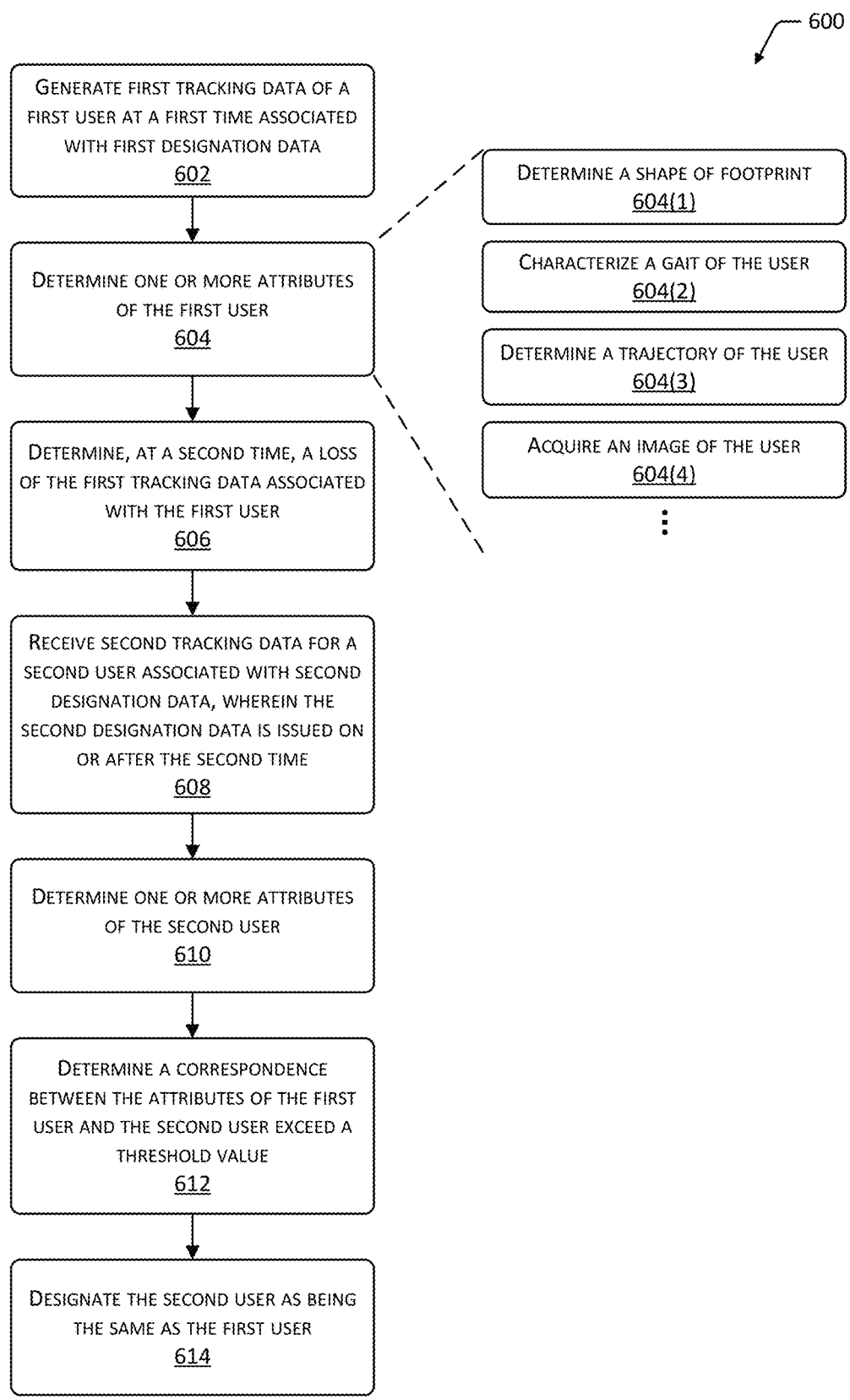
FIG. 6 depicts a flow diagram for recovering from a loss of dynamic signal transfer tracking, according to some implementations.

FIG. 6 depicts a flow diagram 600 for recovering from a loss of dynamic signal tracking, according to some implementations. In some situations, the transfer of designation data 128 from one SFT 104 to another may fail. For example, the user 112 may run or jump, resulting in neither foot being in contact with (or sufficiently proximate to) the floor 102 to provide a signal path 306. The following process may be implemented at least in part by one or more of the SFTs 104, the inventory management system 130, or other devices.

At 602, first tracking data 136(1) of a first user 112(1) at a first time is generated and associated with first designation data 128(1). For example, as the first user 112(1) passes through the entry 110 in the facility, the first user 112(1) may be associated with designation data 128 having a value of "51800" and the subsequent user path 114 obtained using the tile output data 126 received from the SFTs 104 as the first user 112(1) progresses through the facility.

At 604, one or more attributes of the first user 112(1) are determined. These attributes may include, but are not limited to, determining a shape of the footprint 604(1), characterizing a gait of the user 604(2), determining a trajectory of the user 604(3), acquiring an image of the user 604(4), and so forth. For example, the shape of the footprint 604(1) may be determined based on the object data 226 obtained from one or more of the SFTs 104. The gait of the user 604(2) may be characterized by analyzing the object data 226 over time, based on the tile output data 126 obtained from a plurality of SFTs 104, and so forth. For example, characterization of the gait 604(2) may include characterization of the foot strike. Continuing the example, by analyzing object data 226 obtained from a single SFT 104, it may be possible to determine if a particular user 112 presents a forefoot strike, midfoot strike, heel strike, and so forth. In another example, characterization the gait 604(2) may comprise information obtained from a plurality of SFTs 104, such as a walking cadence, rhythm, and so forth, as the user 112 moves across the floor 102. The trajectory of the user 604(3) may be determined using information such as the tile identifier data 230 received from a previous SFT 104. For example, the trajectory of the user 604(3) may indicate that they are moving East. Images of the user 112 may be acquired 604(4) using cameras or other sensors 206 in the facility. For example, overhead cameras may be used to acquire images of the user 604(4).

At 606, a loss of the first tracking data 136(1) associated with first user 112(1) is determined at a second time. For example, the first user 112(1) may have sprinted for a moment along their user path 114.

At 608, second tracking data 136(2) for a second user 112(2) associated with second designation data 128(2) is received. The second designation data 128(2) is issued on or after the second time. Continuing the example, after the first user 112(1) sprinted, the subsequent SFT 104 that does not receive the EMS 106 generates new designation data 128 having a value of "38131" as described above with regard to 524. As a result, the same user 112 has been associated with two different values of designation data 128, "51800" and "38131".

At 610, one or more attributes of the second user 112(2) are determined. For example, the inventory management system 130 may process the tile output data 126 obtained after the second time that is associated with the second user 112(2).

At 612, a correspondence between the attributes of the first user 112(1) and the second user 112(2) are determined to exceed a threshold value. For example, the shape of the footprint 604(1) for the first user 112(1) and the second user 112(2) may be within a threshold tolerance of one another. In another example, the cadence and the rhythm of the gait of the first user 112(1) and the second user 112(2) may be within a threshold tolerance of one another. In another example, the trajectory of the first user 112(1) may be compared to the location of the appearance of the second user 112(2). Where the trajectory and location of appearance correspond within a threshold distance of one another, the correspondence may be asserted.

In some implementations, a plurality of the attributes may be assessed and compared to determine the correspondence between the users 112. For example, a weighted average of the correspondence between particular attributes may be calculated and used to determine an overall correspondence.

At 614, the second user 112(2) is designated as being the same as the first user 112(1). For example, the tracking module 134 may merge the first tracking data 136(1) and the second tracking data 136(2). Determinations such as those made at 614 may be performed asynchronously to the actual motion of the user 112. For example, the tracking module 134 may retroactively merge tracking data 136.

In some implementations, the automated systems may not be able to resolve ambiguities in the tracking with sufficient confidence. A human operator may be presented with tracking data 136 or other sensor data to provide input that is used to resolve an ambiguity.

Figure 7A:
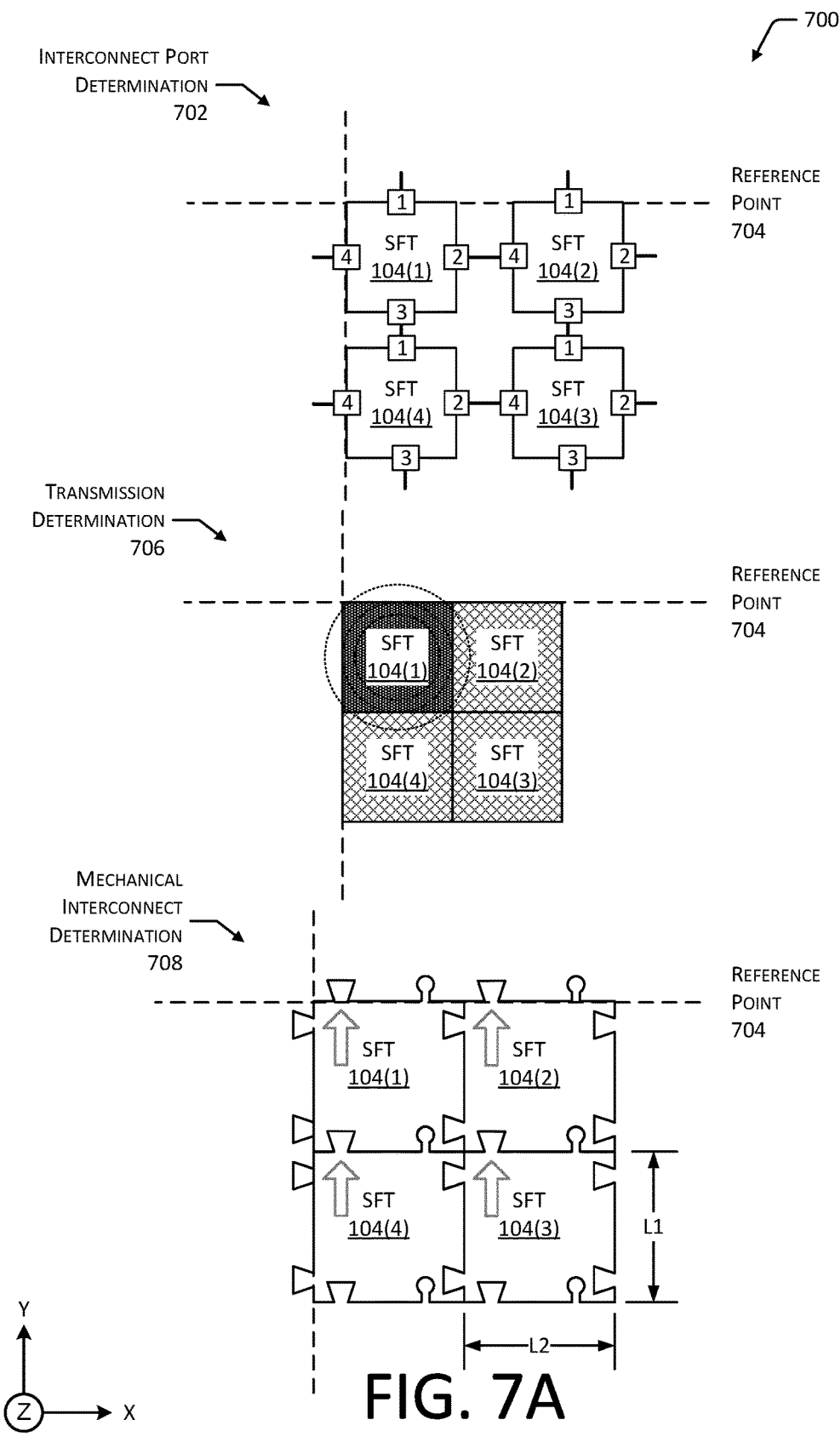
FIGS. 7A and 7B illustrate several implementations for determining the relative arrangement of smart floor tiles in a facility, according to some implementations.
Figure 7B:
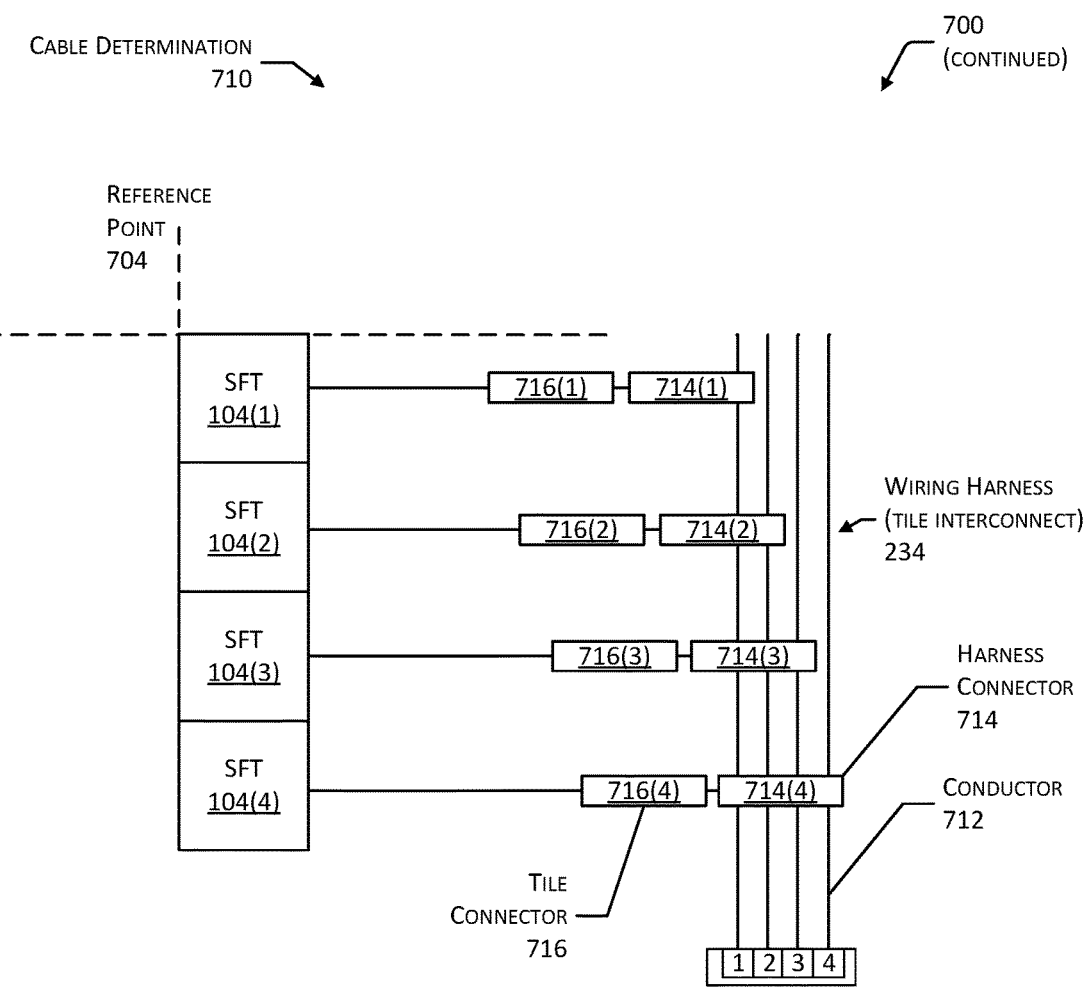

FIGS. 7A and 7B illustrate several implementations 700 for determining arrangement data indicative of the relative arrangement of SFTs 104 in a facility, according to some implementations. Information about the relative arrangement of SFTs 104 may then be used to determine a correspondence between tracking data 136 and the physical location of objects within the facility.

A first implementation depicts interconnect port determination 702. In some implementations, a SFT 104 may include data connectors that allow for data communication between adjacent SFTs 104. For example, the edge of a SFT 104 may include electrical contacts that are configured to come in contact with corresponding contacts on an adjacent SFT 104. In another example, the edge may include optical ports to convey optical signals such as infrared, visible light, and so forth. In still another example, the edge may include radio frequency, magnetic, or other devices that use electromagnetic signals to convey information to the adjacent SFT 104, or read information presented on the edge of the adjacent SFT 104.

Upon installation of the SFT 104 and the floor 102, the SFT 104 may thus be in communication with an adjacent SFT 104. For example, the contacts may allow for I2C connection, 1-Wire communication bus connection, and so forth. Each side of the SFT 104 may have a particular port attached to the communication interface 228. Given the known physical configuration of the ports with respect to the structure of the SFT 104, and based on an exchange of the tile identifier data 230 between the adjacent SFTs 104, arrangement data indicative of a relative arrangement of the SFTs 104 on the floor 102 may be determined.

Once the arrangement data that is indicative of a relative arrangement of the SFTs 104 has been determined, offset data may associate a particular reference point 704 of the facility with a particular point on a particular SFT 104. For example, the Northwest corner of SFT 104(1) may be associated with a particular location within the facility. Given the known dimensions of the SFT 104 that are obtained from physical dimension data and the relative arrangement for each of the SFTs 104, the physical location within the facility of a given SFT 104 or portion thereof may be calculated. The floor 102 may include SFTs 104 of different sizes and shapes. For example, some SFTs 104 may have an "L" shape suitable for being placed around an obstruction such as a post in the facility. The physical dimension data that indicates known dimensions of a particular SFT 104, model or type of SFT 104, and so forth may be stored in a data store and subsequently used. For example, a first table may store information indicating that an SFT 104 tile identifier of "19960720" is a "13" type tile. A second table may provide information about types of tiles, such as the "13" type tile is rectangular and has a length of 12 inches and width of 18 inches. By accessing the physical dimension data and the relative arrangement, the physical location of a given SFT 104 may be determined.

In another implementation, no offset data may be utilized. For example, a particular point in the relative arrangement of the SFTs 104 may be designated as the reference point 704 and there may be no offset data. In other implementations, other techniques may be used to reconcile the differences between the relative arrangement and an external coordinate system.

The arrangement data provides information indicative of a position of one SFT 104 with respect to another or a designated origin. The arrangement data may be stored in a data structure, such as a table, graph, tree, and so forth, that associates a particular SFT 104 with a particular set of coordinates, set of neighboring SFTs 104, and so forth. For example, a set of coordinates may be relative to the arrangement of the SFTs 104 in the floor 102. Continuing the example, the set of coordinates may indicate that SFT 104(16) is 4 tiles to the right and 4 tiles down, relative to an SFT 104 designated as an origin. In another example, the set of coordinates may be relative to an origin such as the reference point 704. Continuing this example, the coordinates may indicate that SFT 104(16) is located at +2 meters along an East-West axis and −2 meters along a North-South axis, relative to the reference point 704. In yet another example, the coordinates may be referenced to an external reference system, such as latitude and longitude or distance with respect to the reference point 704.

In another implementation, the inter-SFT 104 communication by way of electrical contacts may be omitted and a transmission determination 706 technique may be used. In this implementation, a given SFT 104 uses particular antennas 204 to radiate a specific EMS 106. During transmission, other SFTs 104 may be instructed to listen for the specific EMS 106. By iterating through different antennas 204 and SFTs 104 transmitting the specific EMS 106, and by determining the relative signal strength of the specific EMS 106 received by different antennas 204 within the antenna array of another SFT 104, a relative arrangement of SFTs 104 may be determined. For example, the antennas 204 along the East edge of the first SFT 104(1) may be used to transmit the specific EMS 106. The receiver 222 as connected to the antennas 204 of the adjacent second SFT 104(2) located along the West edge result in data indicative of a signal strength of −73 dbm of the specific EMS 106. In comparison, the antennas 204 of the adjacent second SFT 104(2) located along the East edge generate a signal strength of −100 dbm. Based on this information, it may be inferred that second SFC 104(2) is located to the right of first SFT 104(1).

Also depicted is an implementation using mechanical interconnect determination 708. In this implementation, the SFTs 104 are "keyed" or configured such that they are able to be installed only in a single orientation relative to one another. As depicted here (exaggerated for illustrative purposes) each of the SFTs 104 may include various mechanical interconnection features such as tabs, slots, receptacles, notches, protuberances, and so forth, to allow for mechanical engagement between adjacent SFTs 104. By constraining the relative orientation of each SFT 104 to a single direction with respect to an adjacent SFT 104, analysis of information such as obtained from the interconnect port determination 702 and the transmission determination 706 may be further simplified.

In another implementation, the mechanical interconnection features may be configured to engage another device, such as an intersection piece. For example, the intersection piece may have an overall shape of a "+". The arms of the intersection piece may include corresponding mechanical interconnection features that allow for mechanical engagement between a portion of the intersection piece and the SFT 104. The intersection piece may then be used to mechanically join the SFTs 104. In some implementations, the intersection piece may include electrical conductors, waveguides, fiber optic paths, and so forth. The intersection piece may include electronics, such as a computing device, a communication interface, and so forth. The intersection piece may communicate to the inventory management system 130 information indicative of the relative position of a particular SFT 104 with respect to the intersection piece and an intersection piece identifier indicative of the particular intersection piece. Based on this information, the relative arrangement of the SFTs 104 may be determined.

FIG. 7B depicts a cable determination 710 implementation. In this implementation, the wiring harness 234 may provide information about relative placement. The wiring harness 234 may include one or more conductors 712. The wiring harness 234 may comprise a flexible printed circuit (FPC), ribbon cable, individual insulated wires, and so forth. At each designated position along the wiring harness 234, a harness connector 714 is coupled to one or more of the conductors 712. Each SFT 104 may have a tile connector 716 that is configured to make an electrical connection with the complementary harness connector 714. The wiring harness 234 may be physically configured as a line, string, ribbon, or may be configured as a plane, mesh, and so forth. For example, the wiring harness 234 may be a ribbon cable having a particular length and harness connectors 714 at various points along that length. In another example, the wiring harness 234 may comprise a mesh or backplane, upon which harness connectors 714 are located at different points within a plane.

Each harness connector 714 may exhibit a different characteristic that may be used by the SFT 104 to determine where on the wiring harness 234 that SFT 104 is located. In one implementation, the relative position of the harness connector 714 may be designed by pattern of electrical connectivity. For example, a first harness connector 714(1) may be electrically connected only to the first conductor 712(1). Continuing the example, a second harness connector 714(2) may be electrically connected to the first conductor 712(1) and the second conductor 712(2), and so on. The SFT 104 may determine which conductors 712 that a particular harness connector 714 is connected to. Based on this information, the placement along the wiring harness 234 may be determined. Continuing the example above, the first SFT 104(1) may be determined to be at the first harness connector 714(1) on the wiring harness 234 that corresponds to +4 foot away from the beginning of the wiring harness 234 based on a connection to only the first conductor 712(1).

Other electrical characteristics may be used to encode or represent and determine a position. For example, each harness connector's 714 relative position on the wiring harness 234 may be represented by one or more of a particular electrical resistance, impedance, capacitance, and so forth.

In other implementations, other techniques may be used to designate relative position. For example, the harness connectors 714 may include electronics to generate data that identifies them at least within the context of the wiring harness 234. For example, circuitry may generate a particular pulse pattern that encodes a number. The SFT 104 may include electronics to detect this pulse pattern and determine a relative position along the wiring harness 234. For example, the wiring harness 234 may comprise two conductors 712 configured as an I2C bus.

The position of a particular wiring harness 234 in the facility may be manually entered. For example, an installer may designate where a particular wiring harness 234 is installed. In other situations, automated techniques such as those described herein may be used to determine the position of the wiring harness 234 with respect to other devices such as previously installed SFTs 104, wiring harnesses 234, and so forth. For example, the wiring harness 234 may be installed and an EMS 106 may be emitted using the conductors 712 as antennas. Previously installed SFTs 104 may detect the designation data 128 emitted, and the inventory management system 130 may determine the wiring harness 234 is proximate to the previously installed SFTs 104.

The relative arrangement may be determined by one or more of the individual SFTs 104, the inventory management system 130, or another device. In one implementation, a first SFT 104(1) may receive information from an adjacent second SFT 104(2) about the second SFT 104(2). Given that the first SFT 104(1) is able to determine that the second SFT 104(2) is to the left (using one or more of the techniques described above), the first SFT 104(1) is able to determine its position on the floor 102 by adding information about its own dimensions. Said another way, if the first SFT 104(1) is a square tile that is 12 inches on a side, it can determine that its rightmost edge is 12 inches away from the rightmost edge of the second SFT 104(2).

In another implementation, the inventory management system 130 may receive data from the SFTs 104 or other devices connected to those SFTs 104, and process the information to generate the relative arrangement. For example, the inventory management system 130 may receive data indicating which wire in a particular wiring harness 234 a particular SFT 104 is connected to. Given information about the construction of the wiring harness 234, the relative arrangement of the SFT 104 along the cluster of SFTs 104 may be determined based on this data.

In other implementations, other techniques may be used. For example, during installation, a worker may place a piece of conductive material (such as a metal bar) from one edge of a first SFT 104(1) to another adjacent second SFT 104(2), to establish a signal path 306 between the two SFTs 104. Given a known placement of this conductive material at a particular time, and the transfer of an EMS 106 from one SFT 104 to another by way of the signal path 306, the relative arrangement of SFTs 104 in the floor 102 may be determined.

In these illustrations, the SFTs 104 are square, such that the length L1 and length L2 are equal. In other implementations, the SFTs 104 may come in other shapes, such as triangles, rectangles, and so forth. In some implementations, SFTs 104 of different sizes and shapes may be used within the same floor 102.

In some implementations, other sensors in the SFT 104 may be used to determine relative location, orientation, and so forth. For example, the SFT 104 may incorporate a magnetometer that is used as a compass to determine the orientation of the SFT 104.

The various techniques and devices described above may be used in various combinations. For example, the transmission determination 706 and the mechanical interconnect determination 708 techniques and structures may be used in conjunction with one another.

In other implementations, the relative arrangement may be determined manually. For example, installation personnel may use a portable computing device to read a barcode affixed to a particular SFT 104 and indicate a relative position to other SFTs 104. In another example, the installation personnel may install particular units in a particular order, such as a predetermined arrangement.

The SFTs 104 in the floor 102 may be configured to operate in a hierarchical arrangement. For example, one-hundred and twenty (120) of the SFTs 104 may be connected to a CAN bus controller to form a cluster. A group of several clusters may be aggregated and then sent to the inventory management system 130 by way of an Ethernet network 120. To further scale, portions of the floor 102 may be arranged into subnetworks on the Ethernet network 120. The granularity of the hierarchical arrangement may be varied to suit the size of the facility. For example, a small facility of 100 square feet may have a single cluster, while a large facility of 100,000 square feet may include many SFT networks, subnetworks, groups, and clusters.

In one implementation, the relative arrangement of the SFTs 104 may be determined by sequentially interrogating the SFTs 104. For example, the cluster of SFTs 104 may utilize a communication technology for which each connector is associated with a particular physical location on the bus and has a particular designator, such as described above at 710 with regard to cable determination. The inventory management system 130 may interrogate the SFTs 104 within each cluster to determine their tile identifier and information indicative of the particular harness connector 714. Based on this information, the arrangement data of the SFTs 104 may be determined.

In another implementation, other techniques such as time domain reflectometry (TDR) may be used to determine the physical location of the SFT 104 within the cluster. For example, the SFT 104 or harness connector 714 may include circuitry to enable placement of a known resistance or impedance on a communication bus. By triggering this circuitry and then sending an interrogation pulse on the communication bus, the approximate distance from the TDR equipment to the SFT 104 may be determined. Based on this distance, the arrangement data may be generated.

Figure 8:
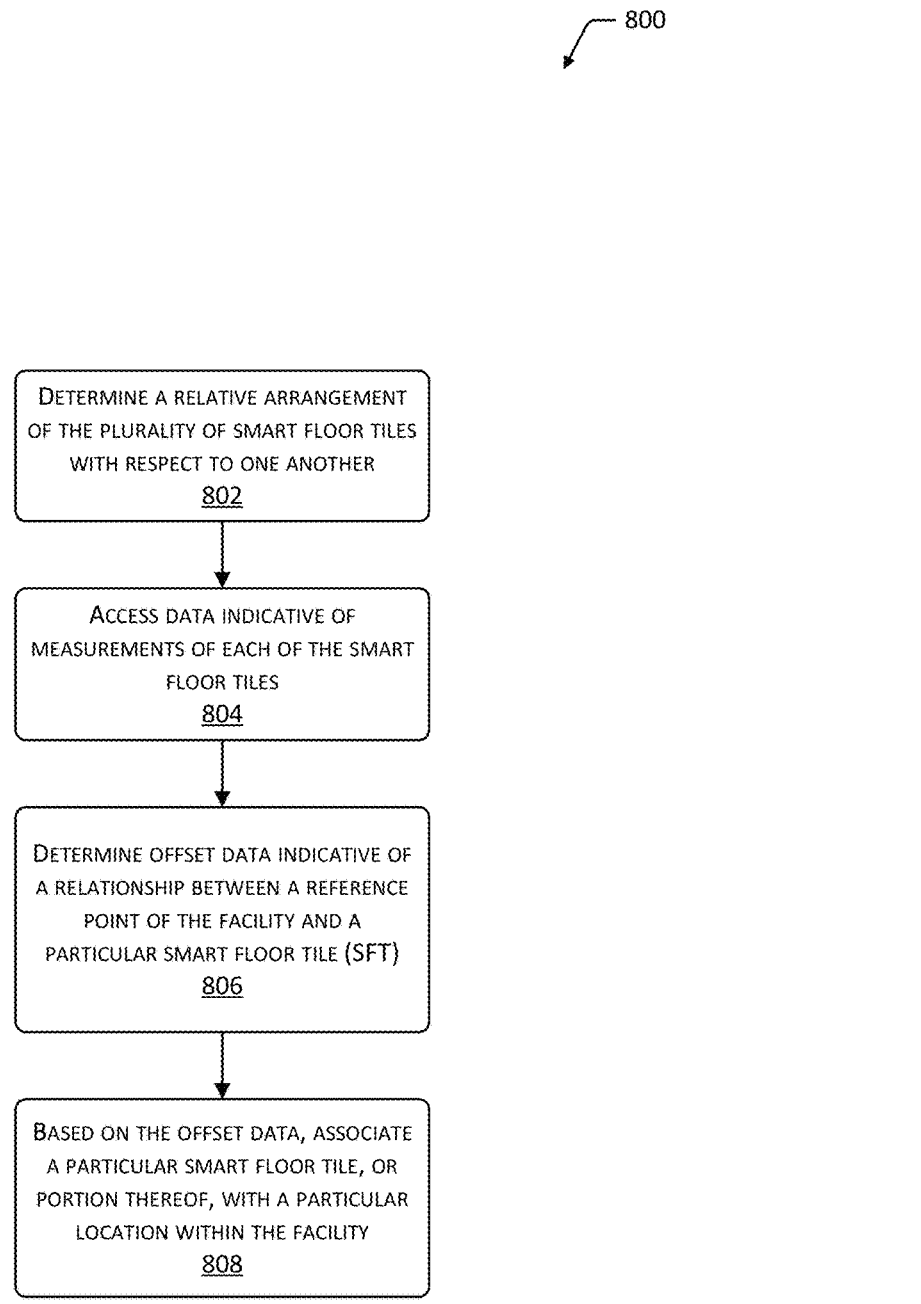
FIG. 8 depicts a flow diagram of a process of determining the relative arrangement of smart floor tiles in a facility, according to some implementations.

FIG. 8 depicts a flow diagram 800 of a process of determining the relative arrangement of SFTs 104 in a facility, according to some implementations. The process may be implemented at least in part by one or more of the SFT 104, the inventory management system 130, or another device.

At 802, arrangement data indicative of a relative arrangement of the plurality of SFTs 104 is determined. For example, as described above with regard to FIGS. 7A and 7B, the relative arrangement may be determined using data transferred via communication ports on the edges of the SFT 104, using a specific EMS 106, and so forth.

The arrangement data provides information that designates a spatial relationship between one SFT 104 and one or more other SFTs 104. For example, a single row of SFTs 104 may be expressed as a list in which the order of the list indicates relative placement along the single row. Continuing the example, the list may be "104(1), 104(2), 104(3), . . . " with the convention being that the list corresponds to a left-to-right arrangement in the physical world. Thus, SFT 104(1) is in the leftmost position, while SFT 104(2) is to the right of SFT 104(1) as well as to the left of SFT 104(3).

A variety of techniques may be used to determine the arrangement data. For example, the tile output data 126 may be processed to determine the relative arrangement by determining two SFTs 104 are adjacent based on each of the two SFTs 104 referring to the tile identifier of the other SFT 104. This provides an indication of which SFTs 104 are adjacent to one another. The physical orientation of the two SFTs 104 with respect to one another may be determined based on the position of the adjacent SFT 104 indicated in the tile output data 126. For example, if the tile output data 126 from SFT 104(1) indicates that the SFT 104(2) is connected on port 2, then SFT 104(2) is located to the right of SFT 104(1). With the adjacency determined and the relative position, the relative arrangement of the two SFTs 104 is known. This process may be iterated through the tile output data 126 to generate a relative arrangement of the SFTs 104 in the floor 102.

In one implementation, the arrangement data may be represented as a two-dimensional matrix, with a first dimension indicating a position in a grid along an X axis and a second dimension orthogonal to the first that indicates a position in the grid along a Y axis. Each SFT 104 is thus represented by its coordinates within the matrix, such as being in a cell of the matrix that is located at coordinates x=3 and y=7. In some implementations, the tile identifier data 230 for a specific SFT 104 may be stored in the cell specified by a particular set of coordinates. Continuing the example above, the cell located at coordinates (3, 7) in the matrix may store the tile identifier data 230 of "5468184" that is associated with SFT 104(97).

In some implementations, the matrix may be three-dimensional, with a third dimension that indicates the type of tile or includes other information indicative of the physical dimensions of each tile.

In still other implementations, the arrangement data for each SFT 104 may be stored individually, relating that particular SFT 104 with respect to only adjacent tiles. For example, assume each side of a square SFT 104 is numbered starting with 1 at the 12 o'clock position, 2 at the 3 o'clock position, 3 at the 6 o'clock position, and 4 at the 9 o'clock position. (This is depicted in FIG. 7A with respect to the interconnect port determination 702.) The arrangement data may store information such as "104(1):null, 104(2), 104(4), null; 104(2):null, null, 104(3), 104(1); 104(3):104(2), null, null, 104(4); 104(4):104(1), 104(3), null, null". In this illustration, the arrangement data includes information about the neighbors of a particular SFT 104 and where those neighbors are in relation to that particular SFT 104.

The determination of the relative arrangement of the SFTs 104 may be performed by the hardware processor 216 of the SFT 104, by the inventory management system 130, or a combination thereof. In one implementation, a first SFT 104(1) may be designated as the reference point 704. The other SFTs 104 may receive the tile output data 126 and generate the arrangement data and their respective relative arrangement with respect to the first SFT 104(1). The SFTs 104 may store in their memory 217 the physical dimension data that is indicative of the physical dimensions of the types of SFTs 104. Based on this information, the SFT 104 may calculate its physical location with respect to the reference point 704.

At 804, data indicative of measurements of each of the SFTs 104 is accessed. For example, the data store may be accessed that contains the tile identifier data 230 for each SFT 104 and the associated length and width for that particular SFT 104. In other implementations, the data indicative of measurements may be associated with a particular type of SFT 104. For example, the tile identifier data 230 may include information indicative of a type or model of the SFT 104 as well as an identifier for that particular SFT 104.

At 806, offset data is determined that is indicative of a relationship between a reference point 704 of the facility and a particular SFT 104 or point on the particular SFT 104. For example, the facility may have an internal Cartesian coordinate system with an origin point, and a worker or robot may measure that a particular corner of a particular SFT 104 is located 3.2 meters along an X axis and −0.75 meters along a Y axis relative to this origin point. Offset data may also include information indicative of an orientation of the SFT 104 relative to the coordinate system. In other implementations, other techniques may be used to determine the relationship between the reference point 704 and one or more points on the floor 102.

At 808, based on the offset data, a particular SFT 104 or portion thereof is associated with a particular location within the facility. The particular location may be a particular point or an area. Given information known about the construction of the SFT 104, it is then possible to associate a particular segment 402 with a particular set of location coordinates that describe a physical location on the floor 102 within the facility. For example, the particular physical location may specify an area in front of a specific fixture 108, such as a rack of shelves.

In some implementations, instead of a physical mapping described above, a logical mapping of the SFTs 104 may be generated and used. The logical mapping may associate a particular SFT 104 with a particular fixture 108, or portion thereof. For example, the logical mapping may indicate that a first SFT 104(1) is associated with a left side of the fixture 108 while a second SFT 104(2) is associated with a right side of the same fixture 108.

Figure 9:
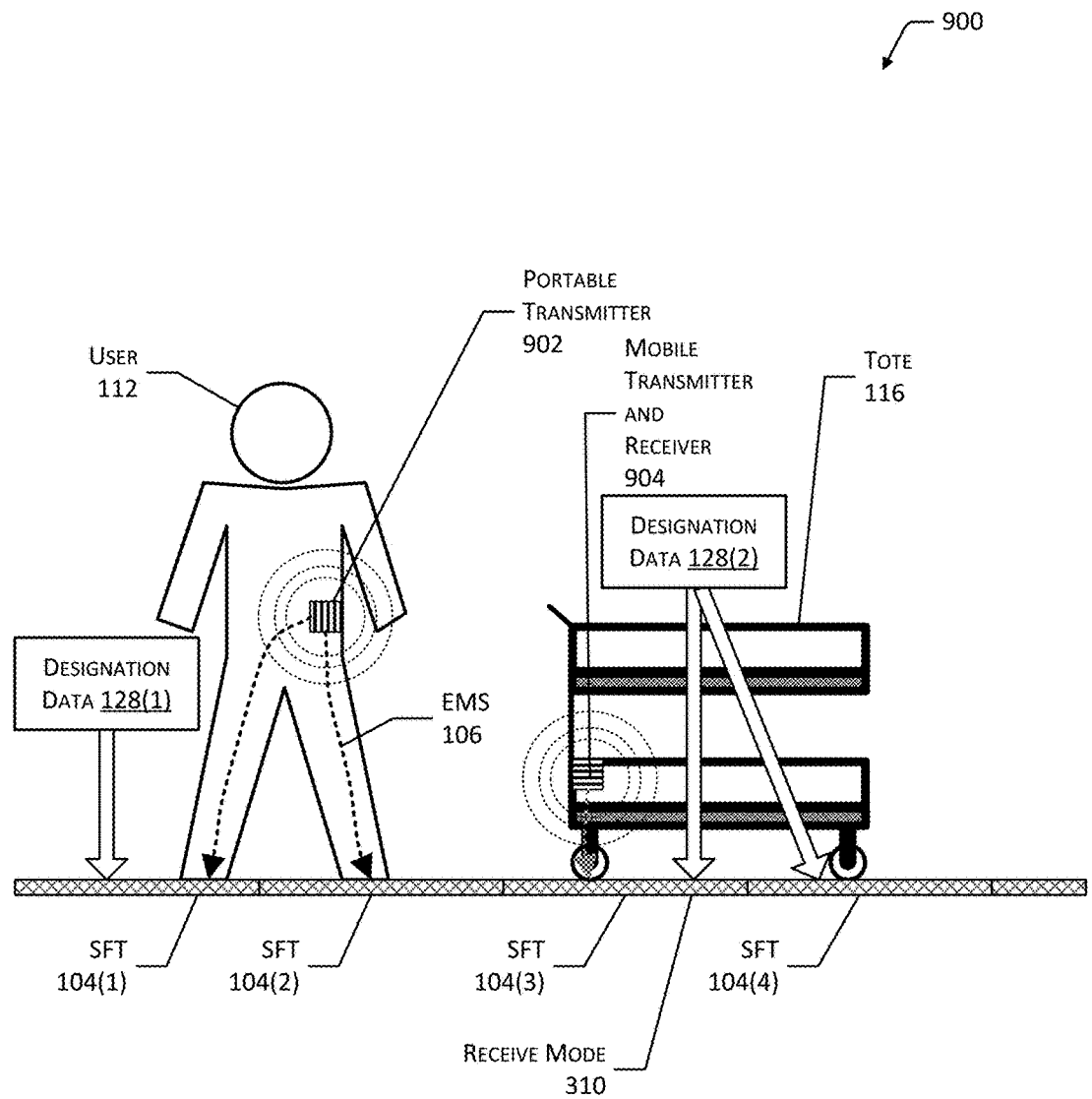
FIG. 9 illustrates the use of a portable transmitter to emit an electromagnetic signal for detection by a receiver in the smart floor tile, according to some implementations.
Figure 9:
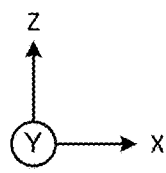

FIG. 9 illustrates a view 900 of the use of a portable transmitter 902 to emit an EMS 106 for detection by a receiver 222 in the SFT 104, according to some implementations. In some implementations, it may be advantageous to provide a particular user 112 or object (such as a tote 116) with a portable transmitter 902. The portable transmitter 902 may be configured to transmit an EMS 106 that conveys the designation data 128 associated with that particular object. In this implementation, the SFT 104 utilizes the receiver 222 to detect the EMS 106 produced by the portable transmitter 902 to generate the tile output data 126.

The portable transmitter 902 may be provided in a variety of different form factors. For example, the portable transmitter 902 may comprise a device that may be mounted on the belt, worn as a wristband, a necklace, or a headband, attached to safety equipment worn by the user 112, and so forth. In some implementations, the portable transmitter 902 may be incorporated into another device, such as a smart phone, point-of-sale terminal, and so forth.

In some implementations, the tote 116 or other objects may be equipped with one or more of a transmitter 224 or receiver 222. For example, the tote 116 depicted here includes a mobile transmitter and receiver 904. A receiver 222 onboard the tote 116 may be used to receive the EMS 106 emitted by the portable transmitter 902 worn by the user 112. For example, as the user 112 grasps the handle on the tote 116, the EMS 106 is transferred and received by the mobile transmitter and receiver 904. Electronics onboard the tote 116 may provide data that identifies the particular tote 116 as well as the designation data 128. This allows the inventory management system 130 to gather information about which tote 116 or other object the user 112 is using.

Similarly, the mobile transmitter and receiver 904 may be used to transmit an EMS 106 that conveys designation data 128 indicative of the particular tote 116. The SFT 104 may receive the designation data 128 provided by the mobile transmitter and receiver 904, and thus may generate tracking data 136 associated with the tote 116.

Use of the SFTs 104 is described above with regard to FIG. 3 and may be combined with the use of the portable transmitters 902, mobile transmitter and receivers 904, and so forth. For example, tracking data 136 for users 112 may be obtained using the techniques described above with regard to FIG. 3 in which SFTs 104 transmit and receive EMS 106, while tracking data 136 for totes 116 is obtained from the second designation data 128(2) transmitted by a mobile transmitter and receiver 904 onboard the tote 116. In another example, employees of the facility may wear a portable transmitter 902 that assists in identifying them as employees, while guests of the facility are tracked as described above with regard to FIG. 3.

Other information may be gathered with this configuration, or in the earlier configurations without the portable transmitter 902 or mobile transmitter and receiver 904. For example, it may be determined which user 112 is in contact with a particular tote 116.

In some implementations, the portable transmitter 902, the mobile transmitter and receiver 904, and so forth, may be in communication with the inventory management system 130. For example, these devices may communicate using Wi-Fi with an access point. In another example, data may be transferred using the SFTs 104. Continuing this example, a signal may be transferred that encodes data which is then received by the receiver 222 in the floor. Likewise, the transmitter 224 in the SFT 104 may send data to a receiver onboard the tote 116 or other device.

In other implementations, a portable receiver (not shown) may be carried by the user 112, mounted to an object such as the tote 116, and so forth. The portable receiver may include a communication interface. During operation, the portable receiver may receive the EMS 106, and send the designation data 128 using the communication interface, such as Wi-Fi, to the inventory management system 130. This information may be used to maintain consistency of identity of the user 112 when the designation data 128 of that user 112 changes. For example, if the EMS 106 is not propagated from one SFT 104 to another, and the user 112 is assigned new designation data 128, the information provided by the portable receiver may be used to associate the new designation data 128 with that particular user 112.

Figure 10:
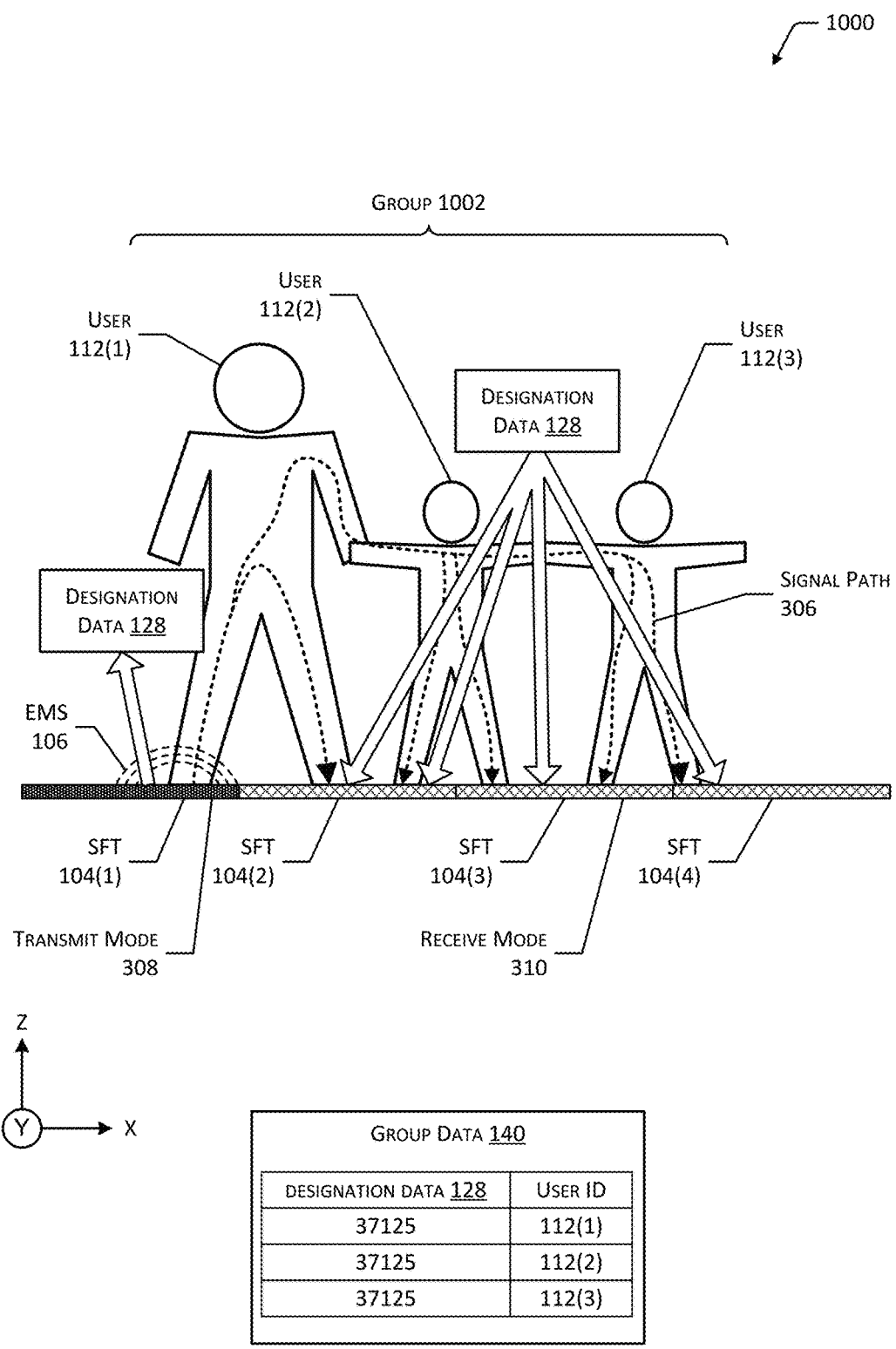
FIG. 10 illustrates the use of the electromagnetic signal propagated by physical contact to determine members of a group, according to some implementations.

FIG. 10 illustrates a view 1000 of the use of the EMS 106 propagated through contact to determine members of a group, according to some implementations.

In some situations, it may be advantageous to determine if individual users 112 are members of a group 1002. Members of the group 1002 may have responsibility for charges associated with their actions within the facility. For example, a parent may be responsible for the charges of items picked by their children.

Various social gestures are used to express group affiliation. For example, members of a family may hold hands. In another example, members of a workgroup may pat one another on the shoulder or back. These social gestures may result in electromagnetic coupling between the users 112. For example, users 112 may hold hands providing galvanic contact, a first user 112(1) may rest a hand on the shoulder of a second 112(2) that produces capacitive coupling through the clothing of the second user 112(2). In yet another example, instead of touching one another, members of a group may touch an electrically conductive object such as a railing, wire, cable, and so forth.

When physical contact is made between two or more users 112, or when two or more users 112 are in close proximity to one another or bridged using a conductor, the signal path 306 is formed allowing for propagation of the EMS 106 throughout the members of the group 1002. For example, as depicted in FIG. 10, a first user 112(1) is holding hands with a second user 112(2), who is also holding hands with a third user 112(3). As a result of this physical contact, the EMS 106 travels along a signal path 306 that begins at one leg of the first user 112(1) and ultimately is presented to SFTs 104 beneath the feet of the group 1002.

In another implementation, if the users 112 are in contact with a common electrical conductor, such as touching a railing, wire, cable, and so forth, each user 112 in the group 1002 provides a signal path 306 for the EMS 106 to the SFTs 104 beneath their feet. In this implementation, the EMS 106 that is in transmit mode 308 may provide the EMS 106 via a signal path 306 that travels from the user 112(1) to the electrical conductor, and then to the other users 112(2), 112(3), and so forth.

Membership in the group 1002 may then be determined based on the reception of the same designation data 128 at a plurality of locations on the floor 102. If the users 112 in the group 1002 subsequently stop holding hands, the system as described above will continue to provide tracking data 136 as each user 112 moves about in the facility. The tracking data 136 will be reflective of the fact that there are three different users 112 that have the same designation data 128.

In some implementations, data may be prepended or appended to each of the users 112 to allow for a distinction between users 112 while retaining information about membership in the group 1002.

The object data 226 may also be used to distinguish the members of a group 1002. Continuing the example above, the object data 226 associated with the first user 112(1) is different from that of the second user 112(2) and the third user 112(3). As a result, individual members of the group 1002 may be distinguished from one another. Other attributes may also be used to identify a particular user 112. For example, as described above, the gait of the user 112 may be characterized, trajectory of the user 112 may be considered, images of the user 112 may be used, and so forth.

In some implementations, the EMS 106 may be generated by the portable transmitter 902, by a transmitter that uses the electrical conductor as an antenna, and so forth. For example, the EMS 106 may be transmitted to an electrically conductive railing that the users 112 may be in contact with at the same time or at different times. By touching the railing, the users 112 may then be associated with a particular group 1002.

To facilitate designation of the group 1002 and generation of group data 140, portions of the facility may be designated for group association. For example, grouping areas just inside the entry 110 may be portions of the floor 102 that provide gathering areas for members of groups 1002. Visual indicia such as different colored flooring, lines, and so forth, may be provided to indicate the grouping areas. In another implementation, furniture such as railings, walls, decorations, and so forth, may be used to designate grouping areas. In some implementations, if the user 112 entering the grouping area has previously been assigned designation data 128, that data may be replaced or merged with data indicative of the group 1002. For example, the user 112 may have designation data 128 with a value of "020904" before entering the grouping area. All users 112 entering the facility may be assigned designation data 128, such as described above. After entering the grouping area, the designation data 128 with a value of "020904" may be replaced with the designation data 128 with a value of "37125" that indicates membership in the group 1002. In one implementation, all previous designation data 128 values for individual users 112 may be discarded and replaced with another value of designation data 128 when present in the grouping area.

Also illustrated is an example of group data 140. For example, members of the same group 1002 share common designation data 128 values. For example, users 112(1), 112(2), and 112(3) all are associated with designation data 128 having a value of "37125".

Designation of a group 1002 may be in response to one or more factors. One factor may include duration of contact. For example, the duration of contact between users 112 may be used to determine groupings. A contact time threshold may specify a minimum amount of time at which contact is deemed to be sufficient to indicate membership in a group 1002. For example, the contact time threshold may be 1 second. If the EMS 106 carrying the same designation data 128 is received at a plurality of SFTs 104 for at least 1 second, then the users 112 at those SFTs 104 may be deemed to be members of the same group 1002. Use of the contact time threshold mitigates the potential for inadvertent contact, such as jostling in a crowded environment or bumping into another user 112, from creating an erroneous grouping between the users 112 who came in contact with one another.

Another factor that may be used to designate which users 112 are members of the group 1002 is amplitude of the received EMS 106. A received signal strength of the EMS 106 as received by the SFT 104 may be compared to a received signal strength threshold. EMSs 106 that are below the threshold may be disregarded for consideration in determining membership in the group 1002. For example, the designation data 128 of an EMS 106 that has a received signal strength below the threshold may be omitted for consideration as joining the group 1002.

Other factors may be used to designate the group 1002 such as signal-to-noise (SNR) ratio of the received EMS 106, phase of the EMS 106, number of errors in the EMS 106, total duration of contact, and so forth. By using one or more of these factors, the system may be configured to generate groups 1002 that are representative of the intent of the users 112 while avoiding false groupings from casual contact.

In some situations, a user 112 with no previous designation data 128 assigned may merge and join a group 1002 that includes another user 112. For example, an adult user 112(1) who is associated with designation data 128 may set down a previously unassociated child user 112(2) that was being carried. The child user 112(2) may now be assigned the same designation data 128. The ability to add or remove users 112 to a group 1002 may be limited to particular areas in the facility, such as the designated grouping areas. In some implementations, the addition or removal of users 112 may be based on user input (such as to smartphone), sensor data from other sensors in the facility, and so forth.

Figure 11:
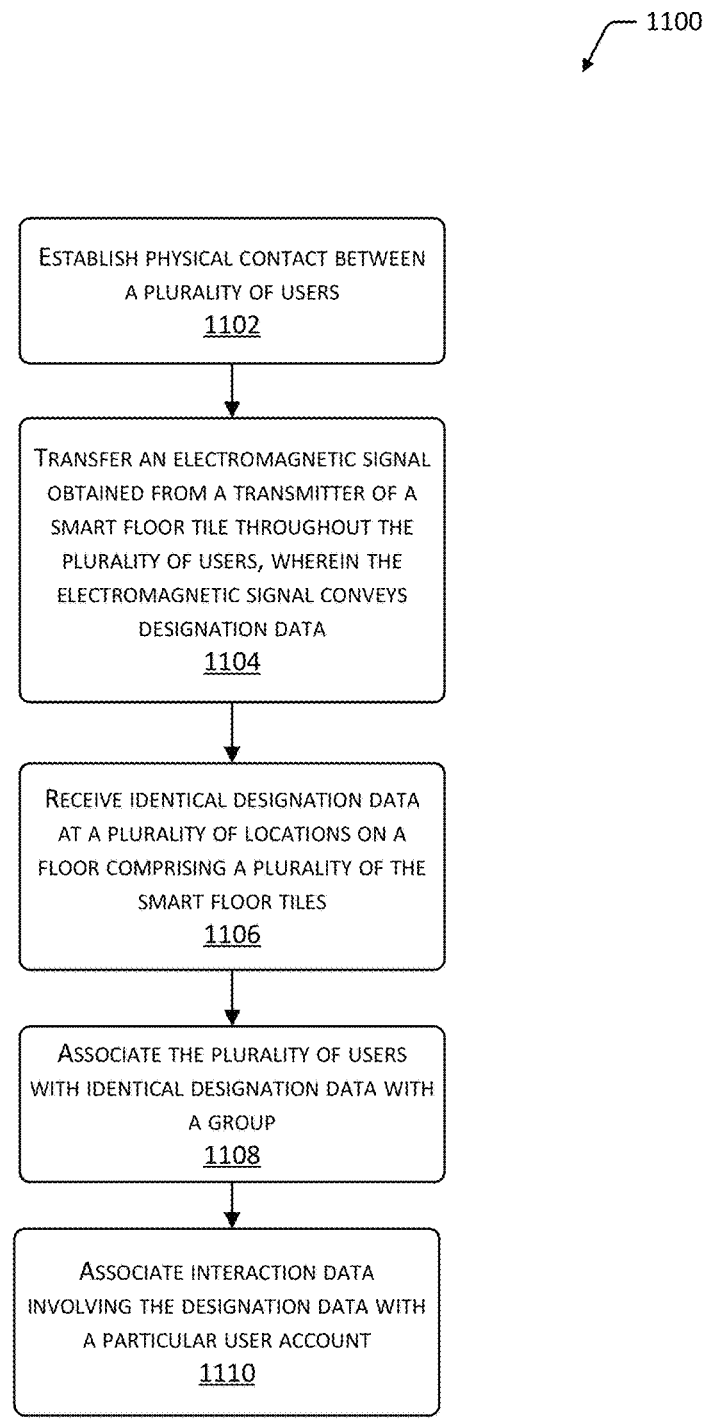
FIG. 11 depicts a flow diagram of a process of determining members of a group using an electromagnetic signal propagated by physical contact, according to some implementations.

FIG. 11 depicts a flow diagram 1100 of a process of determining members of a group 1002 using an EMS 106 propagated by physical contact, according to some implementations. The process may be implemented at least in part by one or more of the SFT 104, the inventory management system 130, or another device.

At 1102, physical contact is established between a plurality of users 112. In some implementations, close proximity may be sufficient to establish a signal path 306.

At 1104, an EMS 106 that is obtained from a transmitter 224 is transferred throughout the plurality of users 112. As described above, the EMS 106 conveys designation data 128. In some implementations, the EMS 106 may be obtained from a transmitter 224 within a SFT 104. In other implementations, the EMS 106 may be obtained from a portable transmitter 902.

At 1106, identical designation data 128 is received at a plurality of locations on the floor 102 that comprises a plurality of SFTs 104.

At 1108, the plurality of users 112 with identical designation data 128 are associated as being a group 1002. In some implementations, the group 1002 may be assigned a group identifier.

At 1110, the interaction data 142 involving the designation data 128 is associated with a particular user account. For example, a pick or place made by the second user 112(2) may be attributed to the account associated with the first user 112(1).

In some implementations, the ability to determine a group 1002 may be limited to particular portions of the facility, such as the grouping areas described above.

Data from other sensors may be used to determine which users 112 are in a group 1002, to add or remove members from a group 1002, and so forth. For example, image data obtained from image sensors such as cameras may be processed and used to determine if a first user 112(1) is standing next to a second user 112(2). Continuing the example, if the two users 112 are determined to not be standing next to one another, they may be disassociated from a common group 1002.

The sensor data may also be processed to determine information about the users 112. For example, data from depth sensors mounted overhead may be used to determine the height of the respective users 112. Based at least in part on the height and the area of the shape 406 of their feet, the age or other demographic data of the user 112 may be estimated. In another example, data from the image sensors may be used to distinguish one user 112 from another or identify who the particular users 112 are.

Figure 12:
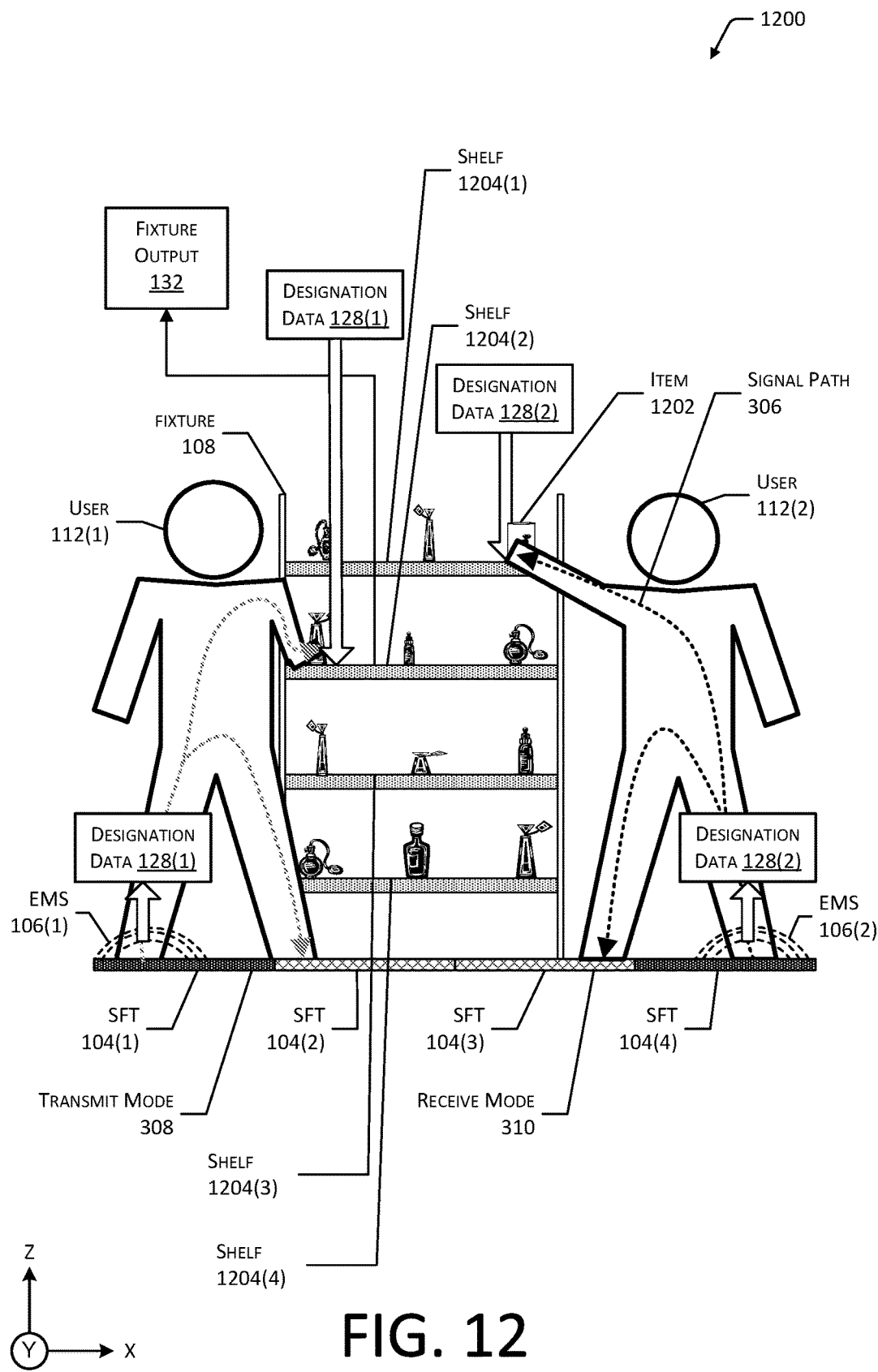
FIG. 12 illustrates the use of an electromagnetic signal to determine a particular user is interacting with a particular portion of a fixture, according to some implementations.

FIG. 12 is an illustration 1200 of the use of EMS 106 to determine a particular user 112 is interacting with a particular portion of fixture 108, according to some implementations.

As described above, the fixtures 108 may be used to store one or more items 1202. As illustrated here, the fixture 108 has stowage areas that include four shelves 120. In other implementations, the stowage areas of the fixture 108 may comprise racks, bins, hangers, and so forth.

As depicted here, a first SFT 104(1) transmits a first EMS 106(1) along a signal path 306 of the body of the first user 112(1), while a second SFT 104(4) transmits a second EMS 106(2) along a signal path 306 of the body of the second user 112(2). The first EMS 106(1) conveys first designation data 128(1), while the second EMS 106(2) conveys second designation data 128(2). As respective users 112 pick or place items 1202 on the one or more the shelves 1204, their respective EMSs 106 are propagated along their respective bodies. The shelves 1204 are equipped with one or more antennas 204 and one or more receivers 222 (not shown). In some implementations, shields or other arrangements of antennas 204 may be present to provide directionality to the patterns of the antennas 204. The electronics of the shelves 1204 generate the fixture output 132. The fixture output 132 may comprise the designation data 128 that has been received by the shelf 1204. In some implementations, the fixture output 132 may include fixture identifier data indicative of a particular fixture 108 or portion thereof, a timestamp, and so forth.

The shelves 1204 may include an array of antennas 204, allowing for a determination of gesture data indicative of where the hand of the user 112 is relative to the fixture 108, motion of the hand, and so forth. For example, each shelf 1204 may include two antennas 204, one on the left side and one on the right side. By analyzing the relative signal strength of the EMS 106 as conveyed by a signal path 306 from the foot of the user 112 to their hand as it is near or in contact with the shelf 1204, a position of an object radiating the EMS 106, such as the hand, at a particular time may be determined.

By utilizing data from the antennas 204 and receivers 222 on different shelves 1204, information about the position of the hand in three-dimensional space may be determined. For example, antennas 204 on shelves 1204(1) and 1204(2) may be used to determine the position of the hand of the user 112 relative to those shelves 1204.

In some implementations, an antenna 204 may be located beneath the item 1202. As a result of the user 112 coming into contact with the item 1202, an increase in the amplitude of the EMS 106 as measured by the receiver 222 connected to the antenna 204 may be determined. Given predetermined information specifying that a particular type of item 1202 is stowed on the shelf 1204 proximate to the antenna 204(1), based on the fixture output 132 the inventory management system 130 is able to generate interaction data 142. For example, item 1202 of the type "pet food" is assigned for stowage on shelf 1204(1) in a lane that is above antenna 204(16). The fixture output 132 may indicate that the signal strength of second EMS 106(2) that conveyed the second designation data 128(2) exceeded a threshold value. The second designation data 128(2) is thus indicative of the user 112(2) coming into contact with the item 1202. Based on this information, and by using the second designation data 128(2) to look up a particular user account, the second user 112(2) may be assessed a charge for the pick of the can of pet food.

Other sensors 206, such as weight sensors, capacitive sensors, and so forth, may also be used. Data from these other sensors 206 may then be used in conjunction with the designation data 128 and information obtained from the receivers 222 about the EMS 106 to generate the interaction data 142. The designation data 128 transferred by way of the EMS 106 to the antenna 204 in the shelf 1204 may be used to determine who is picking what item 1202. A change in weight of the shelf 1204 as measured by one or more weight sensors 206 may be used to determine the quantity of the items 1202 that are either picked or placed. For example, the change in weight may be divided by a known weight of a sample of the item 1202. By using these techniques, the inventory management system 130 is able to quickly and inexpensively determine which user 112 interacted with a particular item 1202, the fixtures 108, or portion thereof.

In some implementations, information about how the EMS 106 is propagated may be used to distinguish between one type of item 1202 and another type of item 1202 that the user 112 may be interacting with. For example, the same antenna 204 may service two lanes on the shelf 1204. In a first lane are stowed boxes of dried pasta, while the second lane stows metal cans of tomato sauce. The metal can provides a better signal pathway 306 for the EMS 106 compared to the box of dried pasta. By analyzing the received signal strength of the EMS 106, the user 112 coming into contact with the metal can may be distinguished from the user 112 coming into contact with the box of dried pasta. For example, if the received signal strength of the EMS 106 exceeds a threshold value, the contact may be determined to be with the metal can in the second lane. Similarly, if the received signal strength of the EMS 106 is below a threshold value, the contact may be determined to be with the box of dried pasta in the first lane.

As described above with regard to FIG. 9, in some implementations, the EMS 106 may be transmitted by portable transmitter 902, mobile transmitter and receiver 904, and so forth.

Figure 13:
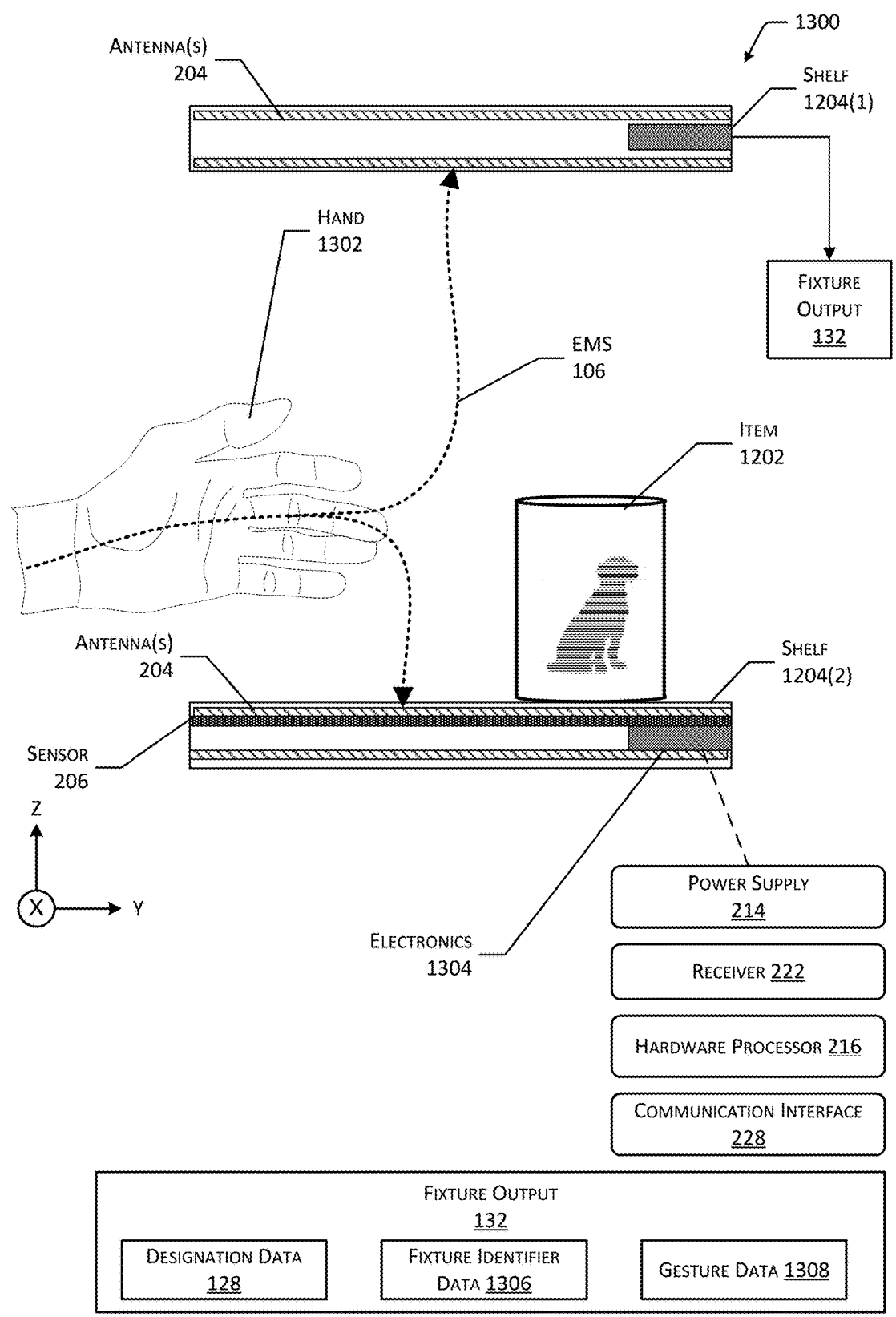
FIG. 13 illustrates an enlarged view of the use of an electromagnetic signal to generate gesture data and other information indicative of which item a user interacted with at the fixture, according to some implementations.

FIG. 13 illustrates an enlarged side view 1300 of the use of an EMS 106 to generate gesture data and other information indicative of which item 1202 a user 112 interacted with at the fixture 108, according to some implementations.

As described above, the shelves 1204 or other the fixtures 108 may incorporate one or more antennas 204 that couple to one or more receivers 222. As a hand 1302 of the user 112 approaches the fixture 108, antennas 204 may receive the EMS 106 as transmitted by a SFT 104, portable transmitter 902, and so forth. Electronics 1304 associated with the shelf 1204 recover the designation data 128 conveyed by the EMS 106. Electronics 1304 may be similar to the electronics 212 described above with regard to the SFT 104. For example, electronics 1304 may include a power supply 214, a receiver 222, a hardware processor 216, a communication interface 228, one or more antennas 204, and so forth.

The hardware processor 216 may be configured to generate the fixture output 132. The fixture output 132 may include one or more of designation data 128, fixture identifier data 1306, gesture data 1308, and so forth. As described above, the designation data 128 comprises information that is conveyed by an EMS 106. Fixture identifier data 1306 is used to identify a particular fixture 108 or portion thereof, such as a shelf 1204, lane upon the shelf 1204, and so forth. The gesture data 1308 may comprise information indicative of a location of the hand 1302 of the user 112 with respect to the fixture 108 or portion thereof, duration of contact by the hand 1302, direction of movement of the hand 1302, and so forth. The gesture data 1308 may be generated based on information about the EMS 106 obtained by one or more antennas 204. For example, based on the changes over time of an amplitude or received signal strength of the EMS 106 at a given antenna 204, a position of the hand 1302 or portion thereof may be determined.

The gesture data 1308 may include information such as a time series of position. In some implementations, the gesture data 1308 may be used to generate trajectory data indicative of a trajectory of the hand 1302. This trajectory may then be used to help determine which lane the user 112 is interacting with, disambiguate the user 112 from among several users 112 if the designation data 128 is unavailable, and so forth.

The gesture data 1308 may include information indicative of contact duration between the user 112 and the item 1202. For example, a contact threshold time may indicate a minimum amount of time that the user 112 has to be in contact with the item 1202 before a contact is deemed to occur. The comparison of the contact duration and the contact threshold time may be used to reduce false positives, minimize the impact of noise, and so forth. In some implementations the contact may also be determined at least in part by the received signal strength of the EMS 106 during contact. For example, contact may be determined when the received signal strength is above a threshold strength value. Contact may be determined when the contact duration exceeds the contact threshold time and the received signal strength is above the threshold strength value.

In some implementations, the EMS 106 may be used to determine position without recovering the designation data 128. For example, the position of the hand 1302 of the user 112 may be determined using the EMS 106 as a source, without regard to the data being conveyed by the EMS 106. In another example, the designation data 128 may be corrupt or transmission otherwise impaired. However, the EMS 106 may still be used to determine position.

The gesture data 1308 may comprise a time series of coordinates, each set of coordinates indicating a position of the hand 1302 at successive times. The gesture data 1308 may provide coordinates in one, two, or three-dimensional spaces. For example, coordinates in a one-dimensional space for the gesture data 1308 may indicate where along the shelf 1204 from left to right the hand 1302 is determined to be. In another example, coordinates in three-dimensional space for the gesture data 1308 may indicate where the hand 1302 is in terms of left to right, front to back and height above the shelf 1204.

To generate gesture data 1308, the hand 1302 of the user 112 does not necessarily need to be in contact with the portion of the fixture 108. For example, proximity of the hand 1302 may be sufficient to allow for coupling between the hand 1302 and the antenna 204 that is sufficient to transfer the EMS 106.

As described below in more detail with regard to FIG. 15, the fixture 108 may incorporate other sensors as well.

While FIGS. 12 and 13 depict the EMS 106 as originating in the SFT 104, in other implementations, the signal path 306 may be reversed. For example, a transmitter 224 may be located at the shelf 1204 that generates an EMS 106 associated with a particular type of item 1202. As the user 112 approaches and then grasps the item 1202, a signal path 306 may be provided that conveys the EMS 106 from the shelf 1204 to a receiver in the SFT 104.

Figure 14:
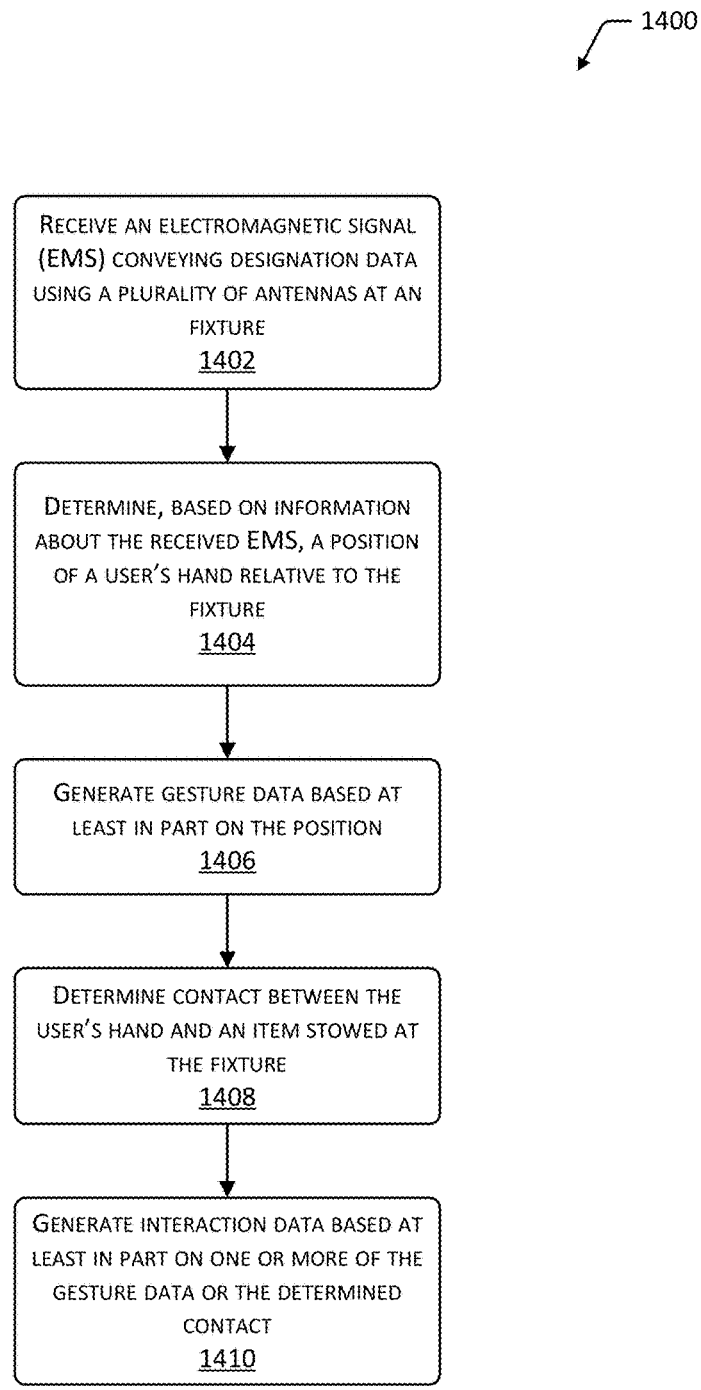
FIG. 14 depicts a flow diagram of a process of generating interaction data based on gesture data that in turn is based on the electromagnetic signals, according to some implementations.

FIG. 14 depicts a flow diagram 1400 of a process of generating interaction data 142 based on gesture data 1308 that is in turn based on the EMSs 106, according to some implementations.

At 1402, an EMS 106 is received that conveys designation data 128. The EMS 106 is received using a plurality of antennas 204 at fixture 108.

At 1404, based on information about the received EMS 106, a position of a user's 112 hand 1302 relative to the fixture 108 is determined. For example, data indicative of the received signal strength of the EMS 106 as obtained from various ones of the plurality of antennas 204 may be generated. Based on this signal strength data, and given the known locations of the antennas 204, a position of the hand 1302 of the user 112 may be determined at a particular time.

At 1406, gesture data 1308 is generated based at least in part on the position. For example, the gesture data 1308 may comprise a set of coordinates indicative of the position of the hand 1302. In some implementations, the set of coordinates may be relative to the fixture 108, or a portion thereof.

At 1408, contact between the user's 112 hand 1302 and an item 1202 stowed at the fixture 108 is determined. For example, contact between the hand 1302 and the item 1202 may produce a signal path 306 that allows for improved transfer of the EMS 106 relative to air. Continuing the example, after contact is made, the signal strength of the EMS 106, as measured by the receiver 222 coupled to the antenna 204, may increase above a threshold amount. In one implementation, the threshold amount may be expressed as a percentage change in the amplitude or received signal strength over a particular amount of time. For example, if the received signal strength increases by more than 20%, contact between the hand 1302 and the item 1202 may be deemed to occur. In some implementations, a contact duration indicative of how long the received signal strength was above a threshold duration value may be determined. If the contact duration exceeds a threshold duration value, contact may be deemed to occur.

At 1410, interaction data 142 is generated. The interaction data 142 is based at least in part on one or more of the gesture data 1308 or the determined contact. For example, the gesture data 1308 may indicate that the user's 112 hand 1302 approached a particular position relative to the fixture 108, remained there for a threshold amount of time, and then was removed. This gesture data 1308, combined with information indicative of contact between the hand 1302 of the user 112 and the item 1202, may be used to determine that the user 112 reached into the shelf 1204 and removed an item 1202. As described elsewhere, data from other sensors such as weight sensors, capacitive sensors, and so forth, may be used to determine the interaction data 142.

In some implementations, information obtained by the receiver may be used to determine the type of item 1202 the user 112 has come into contact with. One or more characteristics may be determined for the EMS 106 as received after the portion of the user 112 comes into contact with the item 1202. The one or more characteristics include one or more of received signal strength, phase, and so forth. For example, previously obtained data may indicate that a touch to a metallic item 1202 such as a can of soup exhibits a first received signal strength, while a plastic bottle of water exhibits a second received signal strength that is less than the first received signal strength. Information about these characteristics may be used to determine a type of item 1202 in contact with the user 112. Continuing the example, the can may be disambiguated from the bottle. In other implementations, the degree of signal transference due to contact may be indicative of the type of object. For example, the received signal strength before contact may be compared with the received signal strength after contact, and the degree of improved propagation of the EMS 106 as indicated by the increase in received signal strength may be used to determine the type of item 1202 that was in contact.

Figure 15:
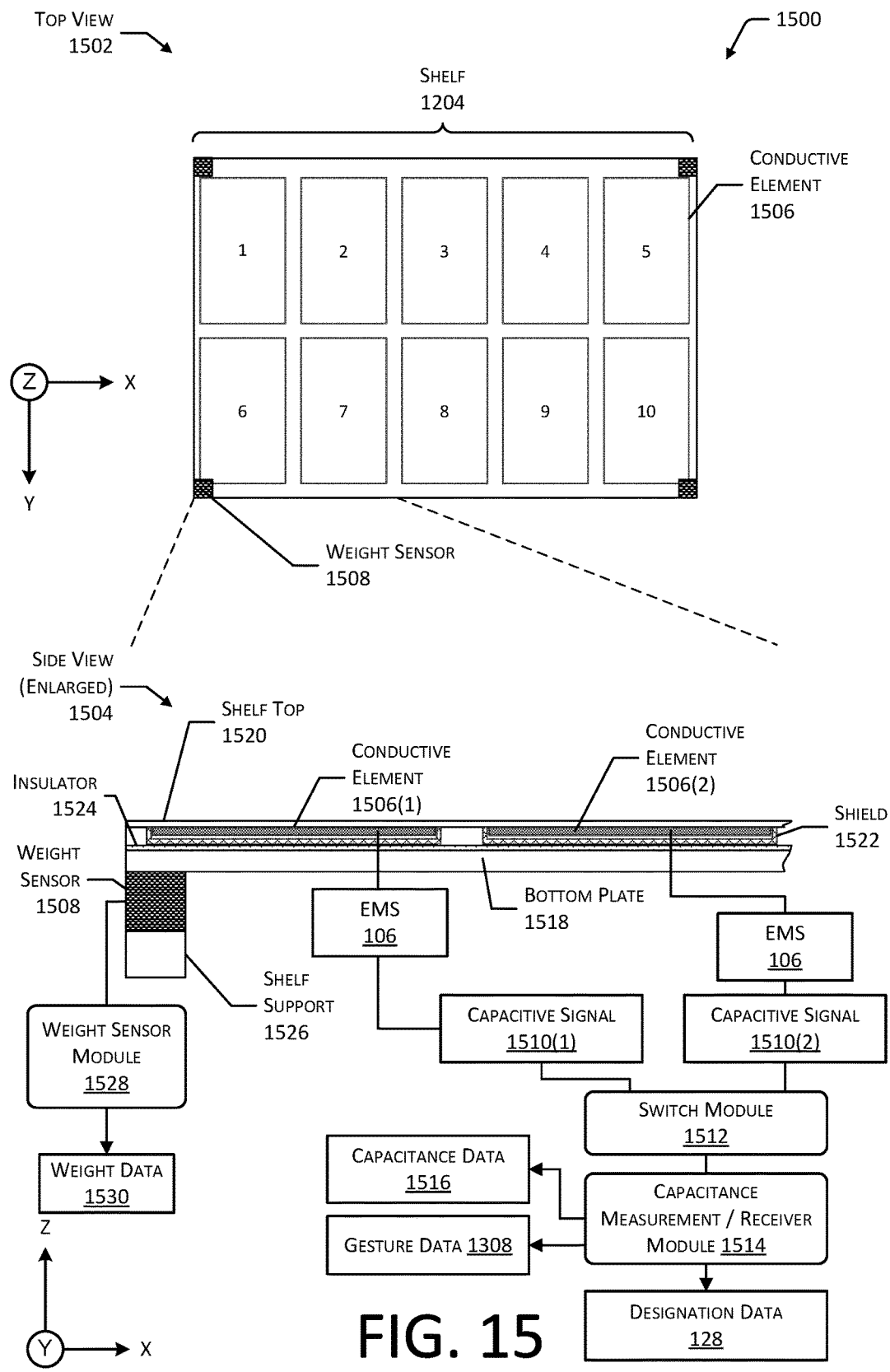
FIG. 15 depicts a block diagram of a fixture such as a shelf that is configured to generate gesture data, designation data, and so forth, according to some implementations.

FIG. 15 depicts a block diagram 1500 of a fixture 108 such as a shelf 1204 that is configured to generate gesture data 1308, designation data 128, and so forth, according to some implementations. A top view 1502 of a shelf 1204 and side view 1504 of an enlarged portion of the shelf 1204 are depicted.

As shown in the top view 1502, a plurality of conductive elements 1506 are distributed in rows and columns across the shelf 1204 to form an array. The conductive elements 1506 may be planar and formed into shapes such as rectangles (as shown here). Arranged proximate to each of the four corners of the shelf 1204 are weight sensors 1508. The conductive elements 1506 may be configured for dual use as antennas 204 and as elements of a capacitive sensor array. In other implementations, other shapes and arrangements of the conductive elements 1506 may be used.

As shown in the side view 1504, the conductive elements 1506 may be connected by wire or other electrical conductor. The wire transfers a capacitive signal 1510 between the conductive element 1506 and other circuitry, such as a switch module 1512. The switch module 1512 may in turn connect to a capacitance measurement/receiver module 1514. For example, the capacitive signal 1510 may be used to supply a charge to the conductive element 1506. The capacitance measurement/receiver module 1514 determines a change in this charge over time and generates capacitance data 1516. The switch module 1512 may comprise switching circuitry that allows for the capacitance measurement/receiver module 1514 to be selectively connected to a particular conductive element 1506. In some implementations, a plurality of switch modules 1512 may be used to allow for different switching configurations. For example, a first switch module may have 4 outputs, each connecting to additional switch modules. Each of those switch modules may have 4 outputs in which each output is connected to additional switch modules 1512, and so forth. The switching circuitry may comprise microelectromechanical switches, relays, transistors, diodes, and so forth. Other configurations or networks of switch modules 1512 may be implemented as well.

The capacitance measurement/receiver module 1514 may be used to generate the capacitance data 1516. The capacitance data 1516 may include information such as a capacitance value, information indicative of a particular conductive element 1506, timestamp, and so forth. In some implementations, circuitry or functionality of the switch module 1512 and the capacitance measurement/receiver module 1514 may be combined. The capacitance measurement/receiver module 1514 may also include a receiver 222 to allow for the reception of the EMS 106.

A bottom plate 1518 may provide mechanical support for one or more of the conductive elements 1506. In some implementations, the bottom plate 1518 may comprise an electrical conductor that acts as a shield for an electric field present at the conductive element 1506.

A shelf top 1520 may be arranged atop one or more of the conductive elements 1506 and the bottom plate 1518. One or more items 1202 may rest on or above the shelf top 1520. For example, the shelf top 1520 may comprise a non-conductive material such as a plastic or ceramic.

The conductive element 1506 may comprise one or more electrically conductive materials. The electrically conductive elements 1506 may be formed as one or more of a coating, thin-film, paint, deposited material, foil, mesh, and so forth. For example, the conductive element 1506 may comprise an electrically conductive paint, silver paste, aluminum film, a copper sheet, and so forth. The conductive element 1506 may be deposited upon, embedded within, laminated to, or otherwise supported by the bottom plate 1518, the shelf top 1520, and so forth. These conductive elements 1506 may then be connected to the capacitance measurement circuitry in the capacitance measurement/receiver module 1514.

One or more shields 1522 may be provided. A shield 1522 may be adjacent to one or more of the conductive elements 1506. The shield 1522 comprises an electrically conductive material and is separated by an electrical insulator, such as air, plastic, ceramic, and so forth, from the conductive element 1506. A single shield 1522 may be used to provide shielding for one or more conductive elements 1506. During operation, the shield 1522 may be driven at the same voltage potential of the input of the capacitive signal 1510. In this configuration, there is no difference in electrical potential between the shield 1522 and the conductive element 1506. External interference may then couple to the shield 1522 producing little interaction with the conductive element 1506. The shield 1522 may also be used to direct the electric field produced by the conductive element 1506 during operation. For example, the electric field is directed generally away from the shield 1522. Using this technique, the capacitive sensor may detect objects on the side opposite that of the shield 1522, with the shield 1522 preventing the sensor from "seeing" or being affected by an object behind the shield 1522.

The shelf 1204 may include other layers or structures. For example, an electrical insulator 1524 such as polyethylene terephthalate may be arranged between the bottom plate 1518 and the shield 1522 (if present) or the conductive element 1506. Wires, circuit traces, or other electrically conductive pathways may conduct the capacitive signal 1510 between the capacitance measurement/receiver module 1514 and the conductive element 1506.

The bottom plate 1518 may be supported by one or more of the weight sensors 1508. In some implementations, the bottom plate 1518 may comprise an electrically conductive material and act as a ground plane, such as if connected to an earth ground. The weight sensor 1508 may in turn be supported by a shelf support 1526.

The one or more of the weight sensors 1508 may be connected to the weight sensor module 1528. The weight sensor module 1528 may comprise circuitry that is used to generate the weight data 1530. The weight data 1530 may include information such as a weight value, information indicative of a particular weight sensor 1508, timestamp, and so forth. In some implementations, circuitry or functionality of the weight sensor module 1528 and the weight sensor 1508 may be combined.

One or more image sensors (not shown) may be used to acquire image data at or near the shelf 1204 or other fixture 108. The image data may comprise one or more still images, video, or combination thereof. The image sensor may have a field of view (FOV) that includes at least a portion of the shelf 1204 or other type of fixture 108. For example, a camera may be mounted within the shelf 1204 to acquire image data of one or more lanes of items 1202 in the shelf 1204.

Figure 16:
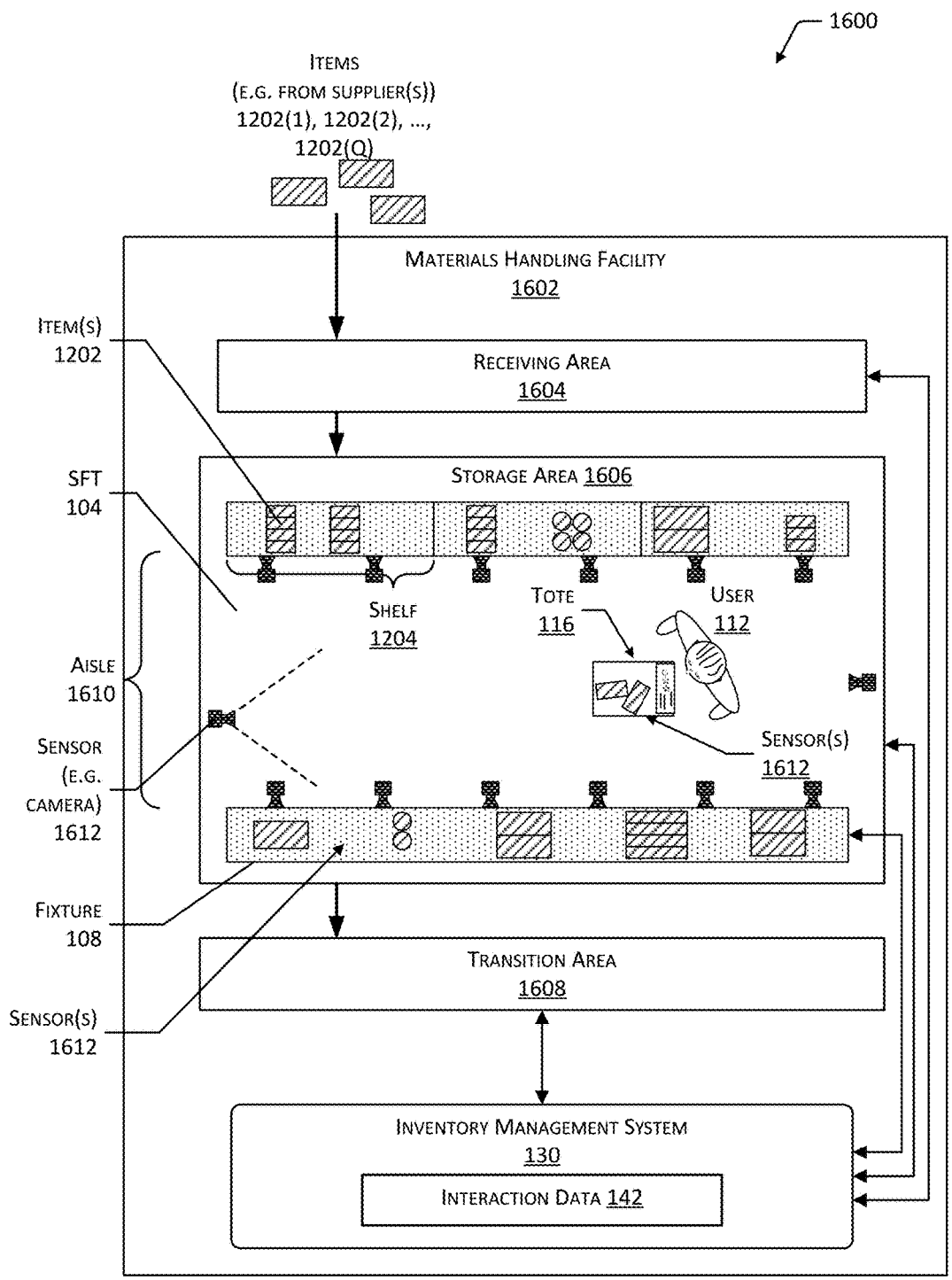
FIG. 16 is a block diagram illustrating a materials handling facility (facility) using the system, according to some implementations.

FIG. 16 is a block diagram 1600 illustrating a materials handling facility (facility) 1602 using the system 100, according to some implementations. A facility 1602 comprises one or more physical structures or areas within which one or more items 1202(1), 1202(2), ..., 1202(Q) may be held. As used in this disclosure, letters in parenthesis such as "(Q)" indicate an integer value greater than or equal to zero. The items 1202 may comprise physical goods, such as books, pharmaceuticals, repair parts, electronic gear, and so forth.

The facility 1602 may include one or more areas designated for different functions with regard to inventory handling. In this illustration, the facility 1602 includes a receiving area 1604, a storage area 1606, and a transition area 1608. Throughout the facility 1602, the plurality of SFTs 104 may be deployed as described above.

The receiving area 1604 may be configured to accept items 1202, such as from suppliers, for intake into the facility 1602. For example, the receiving area 1604 may include a loading dock at which trucks or other freight conveyances unload the items 1202. In some implementations, the items 1202 may be processed, such as at the receiving area 1604, to generate at least a portion of item data as described below. For example, an item 1202 may be tested at the receiving area 1604 to determine the attenuation of an EMS 106 passing through it, and this information stored as item data.

The storage area 1606 is configured to store the items 1202. The storage area 1606 may be arranged in various physical configurations. In one implementation, the storage area 1606 may include one or more aisles 1610. The aisle 1610 may be configured with, or defined by, the fixtures 108 on one or both sides of the aisle 1610. The fixtures 108 may include one or more of a shelf 1204, a rack, a case, a cabinet, a bin, a floor location, or other suitable storage mechanisms for holding, supporting, or storing the items 1202. For example, the fixtures 108 may comprise shelves 1204 with lanes designated therein. The fixtures 108 may be affixed to the floor 102 or another portion of the structure of the facility 1602. The fixtures 108 may also be movable such that the arrangements of aisles 1610 may be reconfigurable. In some implementations, the fixtures 108 may be configured to move independently of an outside operator. For example, the fixtures 108 may comprise a rack with a power source and a motor, operable by a computing device to allow the rack to move from one location within the facility 1602 to another.

One or more users 112 and totes 116 or other material handling apparatus may move within the facility 1602. For example, the user 112 may move about within the facility 1602 to pick or place the items 1202 in various fixtures 108, placing them on the tote 116 for ease of transport. The tote 116 is configured to carry or otherwise transport one or more items 1202. For example, the tote 116 may include a basket, cart, bag, bin, and so forth. In other implementations, other material handling apparatuses such as robots, forklifts, cranes, aerial drones, and so forth, may move about the facility 1602 picking, placing, or otherwise moving the items 1202. For example, a robot may pick an item 1202 from a first fixture 108(1) and move the item 1202 to a second fixture 108(2).

One or more sensors 1612 may be configured to acquire information in the facility 1602. The sensors 1612 may include, but are not limited to, weight sensors 1612(1), capacitive sensors 1612(2), image sensors 1612(3), depth sensors 1612(4), and so forth. The weight sensors 1612(1) may comprise the same or different hardware as the weight sensors 1508 described above. The sensors 1612 may be stationary or mobile, relative to the facility 1602. For example, the fixtures 108 may contain weight sensors 1612(1) to acquire weight sensor data of items 1202 stowed therein, image sensors 1612(3) to acquire images of picking or placement of items 1202 on shelves 1204, optical sensor arrays 1612(14) to detect shadows of the user's 112 hands 1302 at the fixtures 108, and so forth. In another example, the facility 1602 may include image sensors 1612(3) to obtain images of the user 112 or other objects in the facility 1602. The sensors 1612 are discussed in more detail below with regard to FIG. 17.

While the storage area 1606 is depicted as having one or more aisles 1610, the fixtures 108 storing the items 1202, sensors 1612, and so forth, it is understood that the receiving area 1604, the transition area 1608, or other areas of the facility 1602 may be similarly equipped. Furthermore, the arrangement of the various areas within the facility 1602 is depicted functionally rather than schematically. For example, in some implementations, multiple different receiving areas 1604, storage areas 1606, and transition areas 1608 may be interspersed rather than segregated in the facility 1602.

The facility 1602 may include, or be coupled to, the inventory management system 130. The inventory management system 130 is configured to interact with one or more of the users 112 or devices such as sensors 1612, robots, material handling equipment, computing devices, and so forth, in one or more of the receiving area 1604, the storage area 1606, or the transition area 1608.

During operation of the facility 1602, the sensors 1612 may be configured to provide sensor data, or information based on the sensor data, to the inventory management system 130. The sensor data may include the weight data 1530, the capacitance data 1516, the image data, and so forth. The sensors 1612 are described in more detail below with regard to FIG. 17.

The inventory management system 130 or other systems may use the sensor data to track the location of objects within the facility 1602, movement of the objects, or provide other functionality. Objects may include, but are not limited to, items 1202, users 112, totes 116, and so forth. For example, a series of images acquired by the image sensor 1612(3) may indicate removal by the user 112 of an item 1202 from a particular location on the fixture 108 and placement of the item 1202 on or at least partially within the tote 116.

The facility 1602 may be configured to receive different kinds of items 1202 from various suppliers and to store them until a customer orders or retrieves one or more of the items 1202. A general flow of items 1202 through the facility 1602 is indicated by the arrows of FIG. 16. Specifically, as illustrated in this example, items 1202 may be received from one or more suppliers, such as manufacturers, distributors, wholesalers, and so forth, at the receiving area 1604. In various implementations, the items 1202 may include merchandise, commodities, perishables, or any suitable type of item 1202, depending on the nature of the enterprise that operates the facility 1602.

Upon being received from a supplier at the receiving area 1604, the items 1202 may be prepared for storage in the storage area 1606. For example, in some implementations, items 1202 may be unpacked or otherwise rearranged. The inventory management system 130 may include one or more software applications executing on a computer system to provide inventory management functions. These inventory management functions may include maintaining information indicative of the type, quantity, condition, cost, location, weight, or any other suitable parameters with respect to the items 1202. The items 1202 may be stocked, managed, or dispensed in terms of countable units, individual units, or multiple units, such as packages, cartons, crates, pallets, or other suitable aggregations. Alternatively, some items 1202, such as bulk products, commodities, and so forth, may be stored in continuous or arbitrarily divisible amounts that may not be inherently organized into countable units. Such items 1202 may be managed in terms of a measurable quantity such as units of length, area, volume, weight, time, duration, or other dimensional properties characterized by units of measurement. Generally speaking, a quantity of an item 1202 may refer to either a countable number of individual or aggregate units of an item 1202 or a measurable amount of an item 1202, as appropriate.

After arriving through the receiving area 1604, items 1202 may be stored within the storage area 1606. In some implementations, like items 1202 may be stored or displayed together in the fixtures 108 such as in bins, on shelves 1204, hanging from pegboards, and so forth. For example, all items 1202 of a given kind are stored in one fixture 108. In other implementations, like items 1202 may be stored in different the fixtures 108. For example, to optimize retrieval of certain items 1202 having frequent turnover within a large physical facility 1602, those items 1202 may be stored in several different fixtures 108 to reduce congestion that might occur at a single fixture 108.

When a customer order specifying one or more items 1202 is received, or as a user 112 progresses through the facility 1602, the corresponding items 1202 may be selected or "picked" from the fixtures 108 containing those items 1202. In various implementations, item picking may range from manual to completely automated picking. For example, in one implementation, a user 112 may have a list of items 1202 they desire and may progress through the facility 1602 picking items 1202 from the fixtures 108 within the storage area 1606 and placing those items 1202 into a tote 116. In other implementations, employees of the facility 1602 may pick items 1202 using written or electronic pick lists derived from customer orders. These picked items 1202 may be placed into the tote 116 as the employee progresses through the facility 1602.

After items 1202 have been picked, the items 1202 may be processed at a transition area 1608. The transition area 1608 may be any designated area within the facility 1602 where items 1202 are transitioned from one location to another or from one entity to another. For example, the transition area 1608 may be a packing station within the facility 1602. When the item 1202 arrives at the transition area 1608, the items 1202 may be transitioned from the storage area 1606 to the packing station. Information about the transition may be maintained by the inventory management system 130.

In another example, if the items 1202 are departing the facility 1602, a list of the items 1202 may be obtained and used by the inventory management system 130 to transition responsibility for, or custody of, the items 1202 from the facility 1602 to another entity. For example, a carrier may accept the items 1202 for transport with that carrier accepting responsibility for the items 1202 indicated in the list. In another example, a user 112 may purchase or rent the items 1202 and remove the items 1202 from the facility 1602. During use of the facility 1602, the user 112 may move about the facility 1602 to perform various tasks, such as picking or placing the items 1202 in the fixtures 108.

The interaction data 142 may provide information about an interaction, such as a pick of an item 1202 from the fixture 108, a place of an item 1202 to the fixture 108, a touch made to an item 1202 at the fixture 108, a gesture associated with an item 1202 at the fixture 108, and so forth. The interaction data 142 may include one or more of the type of interaction, duration of interaction, interaction location identifier indicative of where from the fixture 108 the interaction took place, item identifier, quantity change to the item 1202, user identifier, and so forth. The interaction data 142 may then be used to further update the item data. For example, the quantity of items 1202 on hand at a particular lane on the shelf 1204 may be changed based on an interaction that picks or places one or more items 1202.

The inventory management system 130 may combine or otherwise utilize data from different sensors 1612 of different types. For example, weight data 1530 obtained from weight sensors 1612(1) at the fixture 108 may be used instead of, or in conjunction with, one or more of the capacitance data 1516 to determine the interaction data 142.

Figure 17:
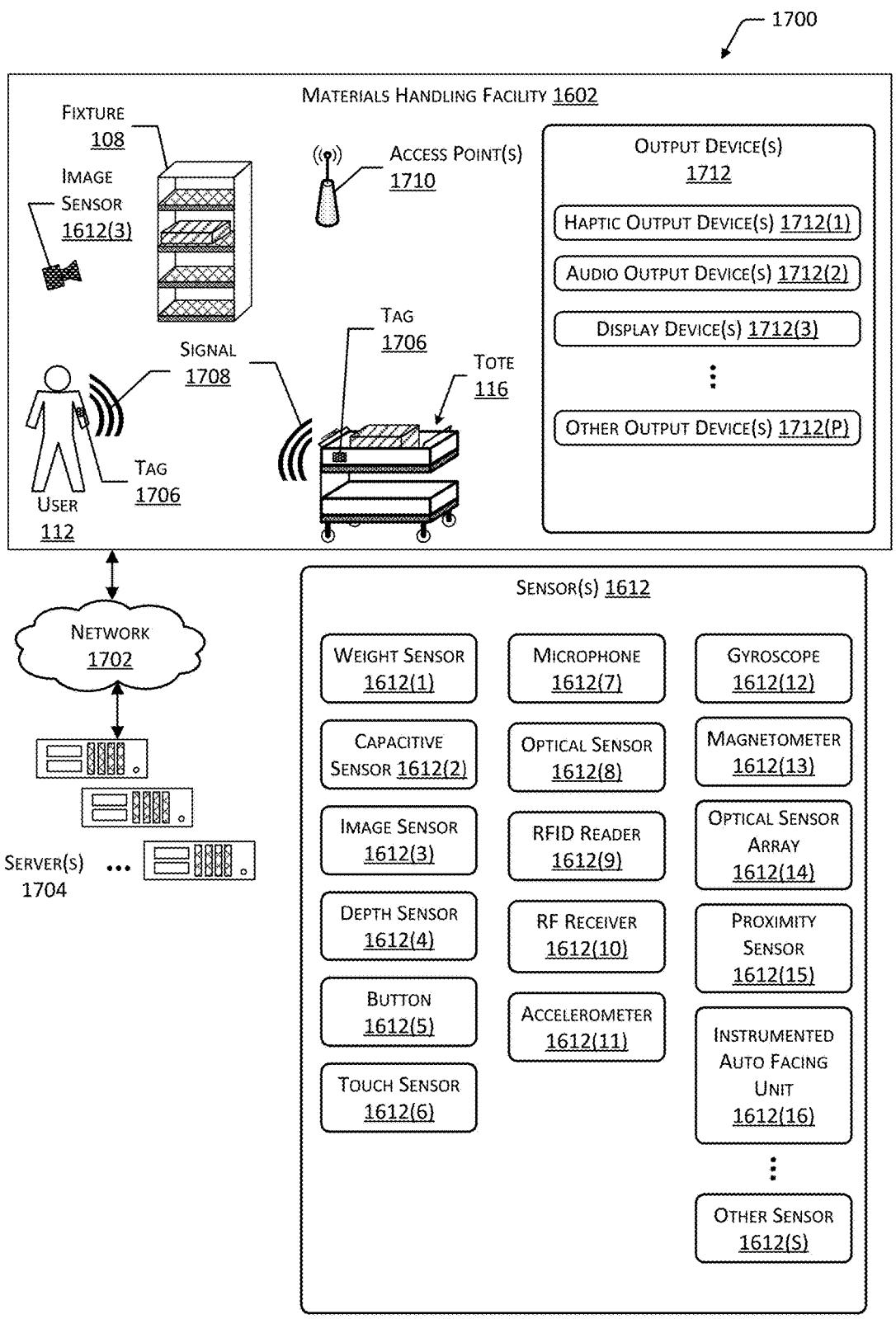
FIG. 17 is a block diagram illustrating additional details of the facility, according to some implementations.

FIG. 17 is a block diagram 1700 illustrating additional details of the facility 1602, according to some implementations. The facility 1602 may be connected to one or more networks 1702, which in turn connect to one or more servers 1704. The network 1702 may include private networks such as an institutional or personal intranet, public networks such as the Internet, or a combination thereof. The network 1702 may utilize wired technologies (e.g., wires, fiber optic cables, and so forth), wireless technologies (e.g., radio frequency, infrared, acoustic, optical, and so forth), or other connection technologies. The network 1702 is representative of any type of communication network, including one or more of data networks or voice networks. The network 1702 may be implemented using wired infrastructure (e.g., copper cable, fiber optic cable, and so forth), a wireless infrastructure (e.g., cellular, microwave, satellite, and so forth), or other connection technologies.

The servers 1704 may be configured to execute one or more modules or software applications associated with the inventory management system 130 or other systems. While the servers 1704 are illustrated as being in a location outside of the facility 1602, in other implementations, at least a portion of the servers 1704 may be located at the facility 1602. The servers 1704 are discussed in more detail below with regard to FIG. 18.

The users 112, the totes 116, or other objects in the facility 1602 may be equipped with one or more tags 1706. The tags 1706 may be configured to emit a signal 1708. In one implementation, the tag 1706 may be a RFID tag 1706 configured to emit a RF signal 1708 upon activation by an external signal. For example, the external signal may comprise a radio frequency signal or a magnetic field configured to energize or activate the RFID tag 1706. In another implementation, the tag 1706 may comprise a transmitter and a power source configured to power the transmitter. For example, the tag 1706 may comprise a Bluetooth Low Energy (BLE) transmitter and battery. In other implementations, the tag 1706 may use other techniques to indicate presence of the tag 1706. For example, an acoustic tag 1706 may be configured to generate an ultrasonic signal 1708, which is detected by corresponding acoustic receivers. In yet another implementation, the tag 1706 may be configured to emit an optical signal 1708.

The inventory management system 130 may be configured to use the tags 1706 for one or more of identification of the object, determining a location of the object, and so forth. For example, the users 112 may wear tags 1706, the totes 116 may have tags 1706 affixed, and so forth, which may be read and, based at least in part on signal strength, used to determine identity and location. In other implementations, such as described above, the users 112 may wear portable transmitters 902, the totes 116 may be equipped with mobile transmitters and receivers 904, and so forth. In some implementations the two may be combined, such as tags 1706 and the use of a portable transmitter 902.

Generally, the inventory management system 130 or other systems associated with the facility 1602 may include any number and combination of input components, output components, and servers 1704.

The one or more sensors 1612 may be arranged at one or more locations within the facility 1602. For example, the sensors 1612 may be mounted on or within a floor 102, wall, at a ceiling, at a fixture 108, on a tote 116, may be carried or worn by a user 112, and so forth.

The sensors 1612 may include one or more weight sensors 1612(1) that are configured to measure the weight of a load, such as the item 1202, the tote 116, or other objects. The weight sensors 1612(1) may be configured to measure the weight of the load at one or more of the fixtures 108, the tote 116, on the floor 102 of the facility 1602, and so forth. For example, the shelf 1204 may include a plurality of lanes or platforms, with one or more weight sensors 1612(1) beneath each one to provide weight sensor data about an individual lane or platform. The weight sensors 1612(1) may include one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms of weight sensors 1612(1) may operate as transducers that generate one or more signals based on an applied force, such as that of the load due to gravity. For example, the weight sensor 1612(1) may comprise a load cell having a strain gauge and a structural member that deforms slightly when weight is applied. By measuring a change in the electrical characteristic of the strain gauge, such as capacitance or resistance, the weight may be determined. In another example, the weight sensor 1612(1) may comprise a force sensing resistor (FSR). The FSR may comprise a resilient material that changes one or more electrical characteristics when compressed. For example, the electrical resistance of a particular portion of the FSR may decrease as the particular portion is compressed. The inventory management system 130 may use the data acquired by the weight sensors 1612(1) to identify an object, determine a change in the quantity of objects, determine a location of an object, maintain shipping records, and so forth.

The sensors 1612 may include capacitive sensors 1612(2). As described above with regard to FIG. 15, the capacitive sensor 1612(2) may comprise one or more conductive elements 1506 and the capacitance measurement/receiver module 1514. In some implementations, the capacitive sensor 1612(2) may include or utilize a switch module 1512. The capacitive sensor 1612(2) may be configured to use a far-field capacitance effect that may comprise measuring the self-capacitance of the conductive elements 1506, rather than a mutual capacitance. In one implementation, a fixed charge may be provided to the conductive element 1506, and the resultant voltage may be measured between the conductive element 1506 and the ground.

In other implementations, the capacitive sensor 1612(2) may be configured to operate in a mutual capacitance mode, surface capacitance mode, and so forth. In mutual capacitance mode, at least two conductive layers are arranged in a stack with a dielectric material between the layers. The dielectric may be a solid, such as a plastic, a gas such as air, a vacuum, and so forth. The mutual capacitance at points between these layers is measured. When another object touches the outermost conductive layer, the mutual capacitance between the two layers changes, allowing for detection. In surface capacitance mode, voltages are applied to different points of a conductive element 1506 to produce an electrostatic field. By measuring the changes in current draw (or another electrical characteristic) from the different points at which voltage is applied, a location of an object may be determined.

The sensors 1612 may include one or more image sensors 1612(3). The one or more image sensors 1612(3) may include imaging sensors configured to acquire images of a scene. The image sensors 1612(3) are configured to detect light in one or more wavelengths including, but not limited to, terahertz, infrared, visible, ultraviolet, and so forth. The image sensors 1612(3) may comprise charge coupled devices (CCD), complementary metal oxide semiconductor (CMOS) devices, microbolometers, and so forth. The inventory management system 130 may use image data acquired by the image sensors 1612(3) during operation of the facility 1602. For example, the inventory management system 130 may identify items 1202, users 112, totes 116, and so forth, based at least in part on their appearance within the image data acquired by the image sensors 1612(3). The image sensors 1612(3) may be mounted in various locations within the facility 1602. For example, image sensors 1612(3) may be mounted overhead, on the fixtures 108, may be worn or carried by users 112, may be affixed to totes 116, and so forth.

One or more depth sensors 1612(4) may also be included in the sensors 1612. The depth sensors 1612(4) are configured to acquire spatial or three-dimensional (3D) data, such as depth information, about objects within a FOV. The depth sensors 1612(4) may include range cameras, lidar systems, sonar systems, radar systems, structured light systems, stereo vision systems, optical interferometry systems, and so forth. The inventory management system 130 may use the 3D data acquired by the depth sensors 1612(4) to identify objects, determine a location of an object in 3D real space, and so forth.

One or more buttons 1612(5) may be configured to accept input from the user 112. The buttons 1612(5) may comprise mechanical, capacitive, optical, or other mechanisms. For example, the buttons 1612(5) may comprise mechanical switches configured to accept an applied force from a touch of the user 112 to generate an input signal. The inventory management system 130 may use data from the buttons 1612(5) to receive information from the user 112. For example, the tote 116 may be configured with a button 1612(5) to accept input from the user 112 and send information indicative of the input to the inventory management system 130.

The sensors 1612 may include one or more touch sensors 1612(6). The touch sensors 1612(6) may use resistive, capacitive, surface capacitance, projected capacitance, mutual capacitance, optical, Interpolating Force-Sensitive Resistance (IFSR), or other mechanisms to determine the position of a touch or near-touch. For example, the IFSR may comprise a material configured to change electrical resistance responsive to an applied force. The location within the material of that change in electrical resistance may indicate the position of the touch. The inventory management system 130 may use data from the touch sensors 1612(6) to receive information from the user 112. For example, the touch sensor 1612(6) may be integrated with the tote 116 to provide a touchscreen with which the user 112 may select from a menu one or more particular items 1202 for picking, enter a manual count of items 1202 at a fixture 108, and so forth.

One or more microphones 1612(7) may be configured to acquire information indicative of sound present in the environment. In some implementations, arrays of microphones 1612(7) may be used. These arrays may implement beamforming techniques to provide for directionality of gain. The inventory management system 130 may use the one or more microphones 1612(7) to acquire information from acoustic tags 1706, accept voice input from the users 112, determine ambient noise level, and so forth.

The sensors 1612 may include one or more optical sensors 1612(8). The optical sensors 1612(8) may be configured to provide data indicative of one or more of color or intensity of light impinging thereupon. For example, the optical sensor 1612(8) may comprise a photodiode and associated circuitry configured to generate a signal or data indicative of an incident flux of photons. As described below, the optical sensor array 1612(14) may comprise a plurality of the optical sensors 1612(8). For example, the optical sensor array 1612(14) may comprise an array of ambient light sensors such as the ISL76683 as provided by Intersil Corporation of Milpitas, Calif., USA, or the MAX44009 as provided by Maxim Integrated of San Jose, Calif., USA. In other implementations, other optical sensors 1612(8) may be used. The optical sensors 1612(8) may be sensitive to one or more of infrared light, visible light, or ultraviolet light. For example, the optical sensors 1612(8) may be sensitive to infrared light, and infrared light sources such as light emitting diodes (LEDs) may provide illumination.

The optical sensors 1612(8) may include photodiodes, photoresistors, photovoltaic cells, quantum dot photoconductors, bolometers, pyroelectric infrared detectors, and so forth. For example, the optical sensor 1612(8) may use germanium photodiodes to detect infrared light.

One or more radio frequency identification (RFID) readers 1612(9), near field communication (NFC) systems, and so forth, may be included as sensors 1612. For example, the RFID readers 1612(9) may be configured to read the RF tags 1706. Information acquired by the RFID reader 1612(9) may be used by the inventory management system 130 to identify an object associated with the RF tag 1706 such as the item 1202, the user 112, the tote 116, and so forth. For example, based on information from the RFID readers 1612(9) detecting the RF tag 1706 at different times and RFID readers 1612(9) having different locations in the facility 1602, a velocity of the RF tag 1706 may be determined.

One or more RF receivers 1612(10) may also be included as sensors 1612. In some implementations, the RF receivers 1612(10) may be part of transceiver assemblies. The RF receivers 1612(10) may be configured to acquire RF signals 1708 associated with Wi-Fi, Bluetooth, ZigBee, 4G, 3G, LTE, or other wireless data transmission technologies. The RF receivers 1612(10) may provide information associated with data transmitted via radio frequencies, signal strength of RF signals 1708, and so forth. For example, information from the RF receivers 1612(10) may be used by the inventory management system 130 to determine a location of an RF source, such as a communication interface onboard the tote 116.

The sensors 1612 may include one or more accelerometers 1612(11), which may be worn or carried by the user 112, mounted to the tote 116, and so forth. The accelerometers 1612(11) may provide information such as the direction and magnitude of an imposed acceleration. Data such as rate of acceleration, determination of changes in direction, speed, and so forth, may be determined using the accelerometers 1612(11).

A gyroscope 1612(12) may provide information indicative of rotation of an object affixed thereto. For example, the tote 116 or other objects may be equipped with a gyroscope 1612(12) to provide data indicative of a change in orientation of the object.

A magnetometer 1612(13) may be used to determine an orientation by measuring ambient magnetic fields, such as the terrestrial magnetic field. The magnetometer 1612(13) may be worn or carried by the user 112, mounted to the tote 116, and so forth. For example, the magnetometer 1612(13) mounted to the tote 116 may act as a compass and provide information indicative of which direction the tote 116 is oriented.

An optical sensor array 1612(14) may comprise one or more optical sensors 1612(8). The optical sensors 1612(8) may be arranged in a regular, repeating, or periodic two-dimensional arrangement such as a grid. The optical sensor array 1612(14) may generate image data. For example, the optical sensor array 1612(14) may be arranged within or below fixture 108 and obtain information about shadows of items 1202, the hand 1302 of the user 112, and so forth.

The sensors 1612 may include proximity sensors 1612 (15) used to determine presence of an object, such as the user 112, the tote 116, and so forth. The proximity sensors 1612(15) may use optical, electrical, ultrasonic, electromagnetic, or other techniques to determine a presence of an object. In some implementations, the proximity sensors 1612(15) may use an optical emitter and an optical detector to determine proximity. For example, an optical emitter may emit light, a portion of which may then be reflected by the object back to the optical detector to provide an indication that the object is proximate to the proximity sensor 1612 (15). In other implementations, the proximity sensors 1612 (15) may comprise a capacitive proximity sensor 1612(15) configured to provide an electrical field and determine a change in electrical capacitance due to presence or absence of an object within the electrical field.

The proximity sensors 1612(15) may be configured to provide sensor data indicative of one or more of a presence or absence of an object, a distance to the object, or characteristics of the object. An optical proximity sensor 1612(15) may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. In another implementation, a structured light pattern may be provided by the optical emitter. A portion of the structured light pattern may then be detected on the object using a sensor 1612 such as an image sensor 1612(3). Based on an apparent distance between the features of the structured light pattern, the distance to the object may be calculated. Other techniques may also be used to determine distance to the object. In another example, the color of the reflected light may be used to characterize the object, such as skin, clothing, tote 116, and so forth.

The sensors 1612 may also include an instrumented auto-facing unit (IAFU) 1612(16). The IAFU 1612(16) may comprise a position sensor configured to provide data indicative of displacement of a pusher. As an item 1202 is removed from the IAFU 1612(16), the pusher moves, such as under the influence of a spring, and pushes the remaining items 1202 in the IAFU 1612(16) to the front of the fixture 108. By using data from the position sensor, and given item data such as a depth of an individual item 1202, a count may be determined, based on a change in position data. For example, if each item 1202 is 1 inch deep, and the position data indicates a change of 17 inches, the quantity held by the IAFU 1612(16) may have changed by 17 items 1202. This count information may be used to confirm or provide a cross check for a count obtained by other means, such as analysis of the weight data 1530, the capacitance data 1516, the image data, and so forth.

The sensors 1612 may include other sensors 1612(S) as well. For example, the other sensors 1612(S) may include light curtains, ultrasonic rangefinders, thermometers, barometric sensors, air pressure sensors, hygrometers, and so forth. For example, the inventory management system 130 may use information acquired from thermometers and hygrometers in the facility 1602 to direct the user 112 to check on delicate items 1202 stored in a particular fixture 108, which is overheating, too dry, too damp, and so forth.

In one implementation, a light curtain may utilize a linear array of light emitters and a corresponding linear array of light detectors. For example, the light emitters may comprise a line of infrared LEDs or vertical cavity surface emitting lasers (VCSELs) that are arranged in front of the fixture 108, while the light detectors comprise a line of photodiodes sensitive to infrared light arranged below the light emitters. The light emitters produce a "lightplane" or sheet of infrared light that is then detected by the light detectors. An object passing through the lightplane may decrease the amount of light falling upon the light detectors. For example, the user's 112 hand 1302 would prevent at least some of the light from light emitters from reaching a corresponding light detector. As a result, a position along the linear array of the object may be determined that is indicative of a touchpoint. This position may be expressed as touchpoint data, with the touchpoint being indicative of the intersection between the hand 1302 of the user 112 and the sheet of infrared light. In some implementations, a pair of light curtains may be arranged at right angles relative to one another to provide two-dimensional touchpoint data indicative of a position of touch in a plane. Input from the light curtain, such as indicating occlusion from a hand 1302 of a user 112 may be used to generate event data.

In some implementations, the image sensor 1612(3) or other sensors 1612(S) may include hardware processors, memory, and other elements configured to perform various functions. For example, the image sensors 1612(3) may be configured to generate image data, send the image data to another device such as the server 1704, and so forth.

The facility 1602 may include one or more access points 1710 configured to establish one or more wireless networks. The access points 1710 may use Wi-Fi, NFC, Bluetooth, or other technologies to establish wireless communications between a device and the network 1702. The wireless networks allow devices to communicate with one or more of the sensors 1612, the inventory management system 130, the optical sensor arrays 1612(14), the tag 1706, a communication device of the tote 116, or other devices.

Output devices 1712 may also be provided in the facility 1602. The output devices 1712 are configured to generate signals, which may be perceived by the user 112 or detected by the sensors 1612. In some implementations, the output devices 1712 may be used to provide illumination of the optical sensor array 1612(14).

Haptic output devices 1712(1) are configured to provide a signal that results in a tactile sensation to the user 112. The haptic output devices 1712(1) may use one or more mechanisms such as electrical stimulation or mechanical displacement to provide the signal. For example, the haptic output devices 1712(1) may be configured to generate a modulated electrical signal, which produces an apparent tactile sensation in one or more fingers of the user 112. In another example, the haptic output devices 1712(1) may comprise piezoelectric or rotary motor devices configured to provide a vibration, which may be felt by the user 112.

One or more audio output devices 1712(2) may be configured to provide acoustic output. The acoustic output includes one or more of infrasonic sound, audible sound, or ultrasonic sound. The audio output devices 1712(2) may use one or more mechanisms to generate the acoustic output. These mechanisms may include, but are not limited to, the following: voice coils, piezoelectric elements, magnetostrictive elements, electrostatic elements, and so forth. For example, a piezoelectric buzzer or a speaker may be used to provide acoustic output.

The display devices 1712(3) may be configured to provide output, which may be seen by the user 112 or detected by a light-sensitive sensor such as an image sensor 1612(3) or an optical sensor 1612(8). In some implementations, the display devices 1712(3) may be configured to produce output in one or more of infrared, visible, or ultraviolet light. The output may be monochrome or in color. The display devices 1712(3) may be one or more of emissive, reflective, microelectromechanical, and so forth. An emissive display device 1712(3), such as using LEDs, is configured to emit light during operation. In comparison, a reflective display device 1712(3), such as using an electrophoretic element, relies on ambient light to present an image. Backlights or front lights may be used to illuminate non-emissive display devices 1712(3) to provide visibility of the output in conditions where the ambient light levels are low.

The display devices 1712(3) may be located at various points within the facility 1602. For example, the addressable displays may be located on the fixtures 108, totes 116, on the floor of the facility 1602, and so forth.

Other output devices 1712(P) may also be present. For example, the other output devices 1712(P) may include scent/odor dispensers, document printers, 3D printers or fabrication equipment, and so forth.

Figure 18:
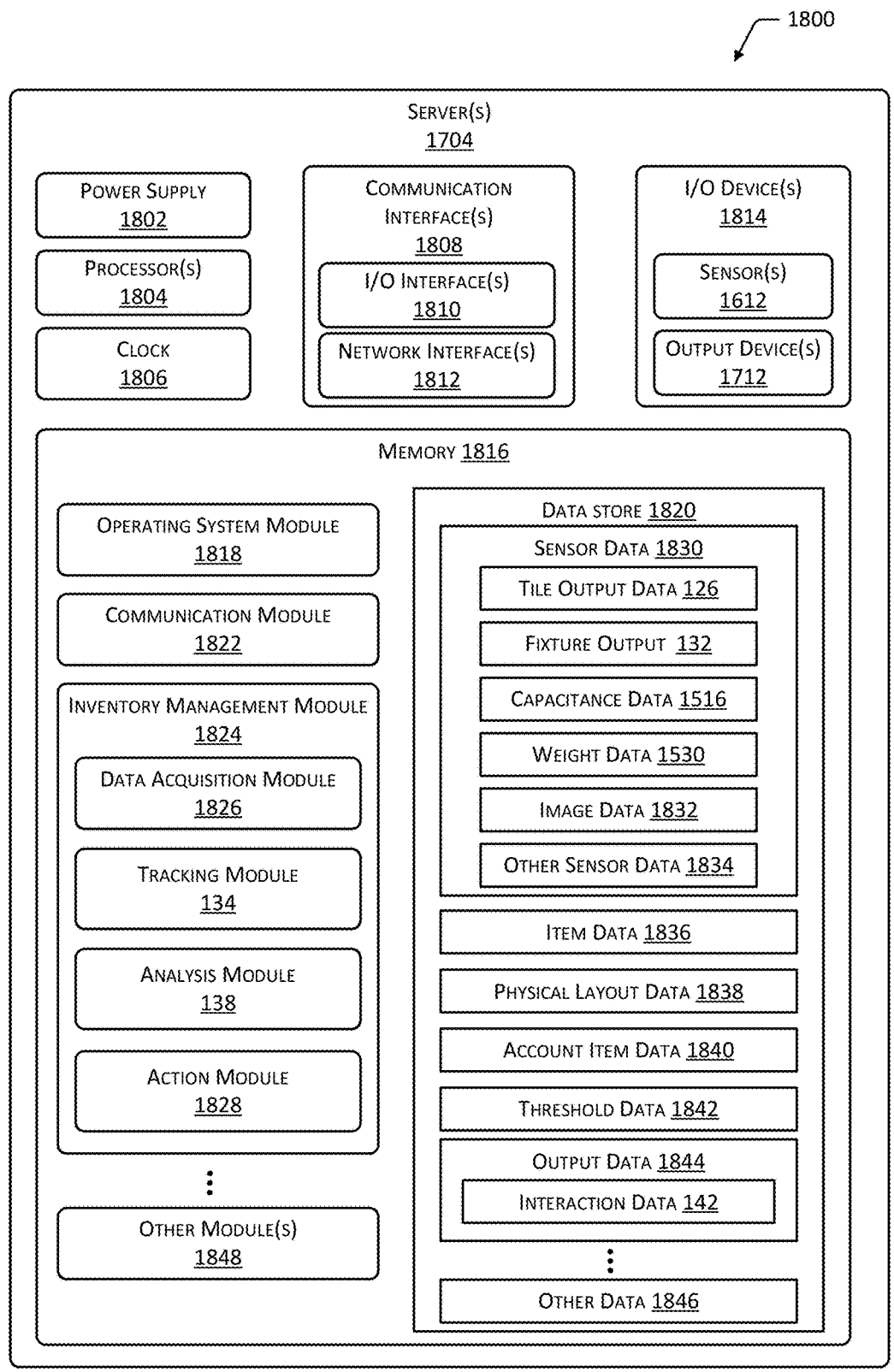
FIG. 18 is a block diagram of a server to support operation of the facility, according to some implementations.

FIG. 18 illustrates a block diagram 1800 of a server 1704 configured to support operation of the facility 1602, according to some implementations. The server 1704 may be physically present at the facility 1602, may be accessible by the network 1702, or a combination of both. The server 1704 does not require end-user knowledge of the physical location and configuration of the system that delivers the services. Common expressions associated with the server 1704 may include "on-demand computing", "software as a service (SaaS)", "platform computing", "network-accessible platform", "cloud services", "data centers", and so forth. Services provided by the server 1704 may be distributed across one or more physical or virtual devices.

One or more power supplies 1802 may be configured to provide electrical power suitable for operating the components in the server 1704. The one or more power supplies 1802 may comprise batteries, capacitors, fuel cells, photovoltaic cells, wireless power receivers, conductive couplings suitable for attachment to an external power source such as provided by an electric utility, and so forth. The server 1704 may include one or more hardware processors 1804 (processors) configured to execute one or more stored instructions. The processors 1804 may comprise one or more cores. One or more clocks 1806 may provide information indicative of date, time, ticks, and so forth. For example, the processor 1804 may use data from the clock 1806 to associate a particular interaction with a particular point in time.

The server 1704 may include one or more communication interfaces 1808 such as input/output (I/O) interfaces 1810, network interfaces 1812, and so forth. The communication interfaces 1808 enable the server 1704, or components thereof, to communicate with other devices or components. The communication interfaces 1808 may include one or more I/O interfaces 1810. The I/O interfaces 1810 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 1810 may couple to one or more I/O devices 1814. The I/O devices 1814 may include input devices such as one or more of a sensor 1612, keyboard, mouse, scanner, and so forth. The I/O devices 1814 may also include output devices 1712 such as one or more of a display device 1712(3), printer, audio speakers, and so forth. In some embodiments, the I/O devices 1814 may be physically incorporated with the server 1704 or may be externally placed.

The network interfaces 1812 may be configured to provide communications between the server 1704 and other devices, such as the SFTs 104, totes 116, routers, access points 1710, and so forth. The network interfaces 1812 may include devices configured to couple to personal area networks (PANs), local area networks (LANs), wireless local area networks (WLANS), wide area networks (WANs), and so forth. For example, the network interfaces 1812 may include devices compatible with Ethernet, Wi-Fi, Bluetooth, ZigBee, and so forth.

The server 1704 may also include one or more busses or other internal communications hardware or software that allow for the transfer of data between the various modules and components of the server 1704.

As shown in FIG. 18, the server 1704 includes one or more memories 1816. The memory 1816 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 1816 provides storage of computer-readable instructions, data structures, program modules, and other data for the operation of the server 1704. A few example functional modules are shown stored in the memory 1816, although the same functionality may alternatively be implemented in hardware, firmware, or as a system on a chip (SoC).

The memory 1816 may include at least one operating system (OS) module 1818. The OS module 1818 is configured to manage hardware resource devices such as the I/O interfaces 1810, the I/O devices 1814, the communication interfaces 1808, and provide various services to applications or modules executing on the processors 1804. The OS module 1818 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; and so forth.

Also stored in the memory 1816 may be a data store 1820 and one or more of the following modules. These modules may be executed as foreground applications, background tasks, daemons, and so forth. The data store 1820 may use a flat file, database, linked list, tree, executable code, script, or other data structure to store information. In some implementations, the data store 1820 or a portion of the data store 1820 may be distributed across one or more other devices including the servers 1704, network attached storage devices, and so forth.

A communication module 1822 may be configured to establish communications with one or more of the totes 116, sensors 1612, display devices 1712(3), other servers 1704, or other devices. The communications may be authenticated, encrypted, and so forth.

The memory 1816 may store an inventory management module 1824. The inventory management module 1824 is configured to provide the inventory functions as described herein with regard to the inventory management system 130. For example, the inventory management module 1824 may track items 1202 between different fixtures 108, to and from the totes 116, and so forth.

The inventory management module 1824 may include one or more of a data acquisition module 1826, the tracking module 134, the analysis module 138, an action module 1828, and so forth. The data acquisition module 1826 may be configured to acquire and access information associated with operation of the facility 1602. For example, the data acquisition module 1826 may be configured to acquire tile output data 126 from the SFTs 104, the fixture output 132, sensor data 1830 such as the weight data 1530, capacitance data 1516, image data 1832, other sensor data 1834, and so forth. The sensor data 1830 may be accessed by the other modules for use.

The data store 1820 may also store item data 1836. The item data 1836 provides information about a particular type of item 1202, including characteristics of that type of item 1202 such as physical dimensions, where that type of item 1202 is located in the facility 1602, characteristics about how the item 1202 appears, capacitance values associated with the type of item 1202, attenuation characteristics of an EMS 106, and so forth. For example, the item data 1836 may indicate that the type of item 1202 is "Bob's Low Fat Baked Beans, 10 oz. can" with a stock keeping unit number of "24076513". The item data 1836 may indicate the types and quantities of items 1202 that are expected to be stored at that particular fixture 108 such as in a particular lane on a shelf 1204, width and depth of that type of item 1202, weight of the item 1202 individually or in aggregate, sample images of the type of item 1202, and so forth.

The item data 1836 may include an item identifier. The item identifier may be used to distinguish one type of item 1202 from another. For example, the item identifier may include a stock keeping unit (SKU) string, Universal Product Code (UPC) number, radio frequency identification (RFID) tag data, and so forth. The items 1202 that are of the same type may be referred to by the same item identifier. For example, cans of beef flavor Brand X dog food may be represented by the item identifier value of "9811901181". In other implementations, non-fungible items 1202 may each be provided with a unique item identifier, allowing each to be distinguished from one another.

The item data 1836 may include one or more of geometry data, item weight data, sample image data, sample capacitance data, or other data. The geometry data may include information indicative of size and shape of the item 1202 in one-, two-, or three-dimensions. For example, the geometry data may include the overall shape of an item 1202, such as a cuboid, sphere, cylinder, and so forth. The geometry data may also include information such as length, width, depth, and so forth, of the item 1202. Dimensional information in the geometry data may be measured in pixels, centimeters, inches, arbitrary units, and so forth. The geometry data may be for a single item 1202, or a package, kit, or other grouping considered to be a single item 1202.

The item weight data comprises information indicative of a weight of a single item 1202, or a package, kit, or other grouping considered to be a single item 1202. The item data 1836 may include other data. For example, the other data may comprise weight distribution of the item 1202, point cloud data for the item 1202, and so forth.

The sample capacitance data may comprise data indicative of a previously measured or calculated change in capacitance of a representative capacitive sensor 1612(2) based on the presence or absence of a sample of the type of item 1202. For example, during processing or intake of the item 1202 at the facility 1602, a sample of the type of item 1202 may be placed on a capacitive sensor 1612(2) to generate the sample capacitance data. Similar data may be obtained for the attenuation or propagation of the EMS 106 across the item 1202.

The sample image data may comprise one or more images of one or more of that type of item 1202. For example, sample image data may be obtained during processing or intake of the item 1202 to be used by the facility 1602.

The item data 1836 may include one or more fixture Identifiers (IDs). The fixture identifier is indicative of a particular area or volume of a fixture 108 such as a shelf 1204 that is designated for stowage of the type of item 1202. For example, a single shelf 1204 may have several lanes, each with a different fixture ID. Each of the different fixture IDs may be associated with a lane having a particular area on the shelf 1204 designated for storage of a particular type of item 1202. A single type of item 1202 may be associated with a particular fixture ID, a plurality of fixture IDs may be associated with the single type of item 1202, more than one type of item 1202 may be associated with the particular fixture ID, and so forth.

The item data 1836 may also include quantity data. The quantity data may comprise a count or value indicative of a number of items 1202. The count may be a measured or an estimated value. The quantity data may be associated with a particular fixture ID, for an entire facility 1602, and so forth. For example, the same type of item 1202 may be stored at different shelves 1204 within the facility 1602. The quantity data may indicate the quantity on hand for each of the different fixtures 108.

The tracking module 134 may access physical layout data 1838 and generate account item data 1840. The tracking module 134 may be configured to determine a location within the facility 1602 of the user 112, a user account associated with the user 112, and so forth. For example, the tracking module 134 may determine that an item 1202 has been removed from a lane and placed into the tote 116 based on the fixture output 132 indicative of the user's 112 designation data 128 having been received at the lane. The tracking module 134 may then determine that the tote 116 is associated with the user 112 or the user account that represents the user 112. Based on this information, the analysis module 138 may generate the interaction data 142.

The analysis module 138 may utilize the tile output data 126, the fixture output 132, weight data 1530, capacitance data 1516, the item data 1836, and other information to generate interaction data 142. The interaction data 142 is indicative of action such as picking or placing an item 1202 for a particular fixture 108, presence of the user 112 at the fixture 108, and so forth.

The analysis module 138, or other modules, may be configured to determine portions of the SFTs 104 which are to be deactivated or from which information is to be disregarded. In one implementation, during setup of the system, the antennas 204 of a SFT 104 that are located underneath a fixture 108 may be deactivated. In another implementation, the analysis module 138 may determine SFTs 104 or portions thereof that report presence of an object that is unchanging over long periods of time, such as hours or days. These objects, such as a fixture 108 above the SFT 104, may then be subsequently disregarded and information about these positions may be removed from further processing. If a change is detected, such as when the fixture 108 above the SFT 104 is moved, information about that change may be used to re-enable consideration of data from that SFT 104 or portion thereof.

The inventory management module 1824 may utilize the physical layout data 1838. The physical layout data 1838 may provide information indicative of location of the SFTs 104, where sensors 1612 and the fixtures 108 are in the facility 1602 with respect to one another, FOV of sensors 1612 relative to the fixture 108, and so forth. For example, the physical layout data 1838 may comprise information representative of a map or floor plan of the facility 1602 with relative positions of the fixtures 108, location of individual SFTs 104 therein, planogram data indicative of how items 1202 are to be arranged at the fixtures 108, and so forth. Continuing the example, the physical layout data 1838 may be based on using the relative arrangement of the SFTs 104 in conjunction with their physical dimensions to specify where the SFTs 104 are placed within the facility 1602.

The physical layout data 1838 may associate a particular fixture ID with other information such as physical location data, sensor position data, sensor direction data, sensor identifiers, and so forth. The physical location data 1838 provides information about where in the facility 1602 objects are, such as the fixture 108, the sensors 1612, and so forth. In some implementations, the physical location data may be relative to another object. For example, the physical location data may indicate that a particular weight sensor 1612(1), capacitive sensor 1612(2), or image sensor 1612(3) is associated with the shelf 1204 or portion thereof.

The inventory management module 1824 may utilize the physical layout data 1838 and other information during operation. For example, the tracking module 134 may utilize physical layout data 1838 to determine what capacitance data 1516 acquired from particular capacitive sensors 1612 (2) corresponds to a particular shelf 1204, lane, or other fixture 108.

The tracking module 134 may access information from sensors 1612 within the facility 1602, such as those at the shelf 1204 or other fixture 108, onboard the tote 116 or carried by or worn by the user 112. For example, the tracking module 134 may receive the fixture output 132 and use the designation data 128 to associate a particular user 112 with a pick or place of an item 1202 at the associated fixture 108.

The account item data 1840 may also be included in the data store 1820 and comprises information indicative of one or more items 1202 that are within the custody of a particular user 112, within a particular tote 116, and so forth. For example, the account item data 1840 may comprise a list of the contents of the tote 116. Continuing the example, the list may be further associated with the user account representative of the user 112. In another example, the account item data 1840 may comprise a list of items 1202 that the user 112 is carrying. The tracking module 134 may use the account item data 1840 to determine subsets of possible items 1202 with which the user 112 may have interacted.

The inventory management module 1824, and modules associated therewith, may access sensor data 1830, threshold data 1842, and so forth. The threshold data 1842 may comprise one or more thresholds, ranges, percentages, and so forth, that may be used by the various modules in operation.

The inventory management module 1824 may generate output data 1844. For example, the output data 1844 may include the interaction data 142, inventory levels for individual types of items 1202, overall inventory, and so forth.

The action module 1828 may be configured to initiate or coordinate one or more actions responsive to output data 1844. For example, the action module 1828 may access output data 1844 that indicates a particular fixture 108 is empty and in need of restocking. An action such as a dispatch of a work order or transmitting instructions to a robot may be performed to facilitate restocking of the fixture 108.

Processing sensor data 1830, such as the image data 1832, may be performed by a module implementing, at least in part, one or more of the following tools or techniques. In one implementation, processing of the image data 1832 may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia, with information available at www.opencv.org. In another implementation, functions available in the OKAO machine vision library as promulgated by Omron Corporation of Kyoto, Japan, may be used to process the sensor data 1830. In still another implementation, functions such as those in the Machine Vision Toolbox for Matlab (MVTB) available using MATLAB as developed by Math Works, Inc. of Natick, Mass., USA, may be utilized.

Techniques such as artificial neural networks (ANNs), active appearance models (AAMs), active shape models (ASMs), principal component analysis (PCA), cascade classifiers, and so forth, may also be used to process the sensor data 1830 or other data. For example, the ANN may be a trained using a supervised learning algorithm such that object identifiers are associated with images of particular objects within training images provided to the ANN. Once trained, the ANN may be provided with the sensor data 1830 and the item data 1836 to allow for a determination of similarity between two or more images.

The sensor data 1830 obtained from different sensors 1612 may be used to compare or validate output data 1844. For example, the image data 1832 may indicate the presence of a person based on a coat or jacket that is arranged across the back of a chair. However, the tile output data 126 provides information that no user is currently present at that location in the facility. This difference may be used to generate an alarm, notify an associate in the facility, and so forth.

Other data 1846 may be stored in the data store 1820 as well as other modules 1848 in the memory 1816. For example, the other modules 1848 may include a billing module while the other data 1846 may include billing data.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
   a server comprising:
   a hardware processor to execute computer-executable instructions to:
   receive first tile output data from a first smart floor tile, the first tile output data indicative of a first smart floor tile identifier of the first smart floor tile and designation data;
   receive second tile output data from a second smart floor tile, the second tile output data indicative of a second smart floor tile identifier of the second smart floor tile and the designation data; and
   determine the designation data from the first smart floor tile and the second smart floor tile are the same.

2. A system comprising:
   a server comprising:
   a hardware processor to execute computer-executable instructions to:
   receive first tile output data from a first smart floor tile, the first tile output data indicative of a first smart floor tile identifier of the first smart floor tile and designation data;
   receive second tile output data from a second smart floor tile, the second tile output data indicative of a second smart floor tile identifier of the second smart floor tile and the designation data; and
   determine group data indicative of an association between a first user coupled to the first smart floor tile and a second user coupled to the second smart floor tile, based on the designation data from the first smart floor tile and the second smart floor tile being the same.

3. A system comprising:
   a first smart floor tile comprising:
   first electronics to:
   electromagnetically couple to a first foot of a first user that is on the first smart floor tile;
   transmit, using the first electronics, a signal modulated to convey designation data; and
   send, using a network, first tile output data indicative of a first smart floor tile identifier of the first smart floor tile and the designation data to a server;
   a second smart floor tile comprising:
   second electronics to:
   electromagnetically couple to a second foot of a second user that is on the second smart floor tile, wherein the first user is in physical contact with the second user;

receive, using the second electronics, the signal;
determine the designation data from the signal; and
send, using the network, second tile output data indicative of a second smart floor tile identifier of the second smart floor tile and the designation data to the server; and the server comprising:
  a hardware processor to execute computer-executable instructions to:
    receive the first tile output data and the second tile output data; and
    determine group data indicative of an association between the first user and the second user based on the designation data sent by the first smart floor tile being the same as the designation data received by the second smart floor tile.

4. The system of claim 1, wherein:
the second tile output data indicates a duration of time the signal was received; and
the determination of the group data is further based on the duration of time the signal was received being greater than a contact time threshold.

5. The system of claim 1, wherein:
the second tile output data indicates a received signal strength of the signal that is received; and
the determination of the group data is further based on the received signal strength of the signal being greater than a received signal strength threshold.

6. A system comprising:
a first smart floor tile comprising:
  at least a first antenna electromagnetically coupled to a body of a first user;
  a first transmitter;
  a first communication interface;
  a first memory, storing first computer-executable instructions; and
  a first hardware processor to execute the first computer-executable instructions to:
    transmit, using the first transmitter, a signal modulated to convey designation data; and
    send, using the first communication interface, first tile output data comprising a first smart floor tile identifier of the first smart floor tile and the designation data; and
a second smart floor tile comprising:
  at least a second antenna configured to couple to a body of a second user, wherein the first user and the second user are electromagnetically coupled;
  a second receiver;
  a second communication interface;
  a second memory, storing second computer-executable instructions; and
  a second hardware processor to execute the second computer-executable instructions to:
    receive, using the second receiver, the signal modulated to convey the designation data; and
    send, using the second communication interface, second tile output data comprising a second smart floor tile identifier of the second smart floor tile and the designation data.

7. The system of claim 6, further comprising:
a server comprising:
  a third communication interface;
  a third memory, storing third computer-executable instructions; and
  a third hardware processor to execute the third computer-executable instructions to:
    receive the first tile output data and the second tile output data; and
    based on the designation data received from both the first smart floor tile and the second smart floor tile being the same, determine group data indicative of the first user and the second user being in a same group.

8. The system of claim 7, the third hardware processor to further execute the third computer-executable instructions to:
access a first user identifier indicative of the first user;
access a second user identifier indicative of the second user; and
wherein the group data comprises associating the designation data for both the first user identifier and the second user identifier.

9. The system of claim 7, the third hardware processor to further execute the third computer-executable instructions to:
access fixture output from one or more sensors of a fixture;
determine, based at least in part on the first tile output data and the second tile output data, that one or more of the first user or the second user is physically proximate to the fixture;
generate interaction data indicative of one or more of a pick or place of an item from the fixture;
determine a billing account associated with the group data; and
generate billing data associated with the billing account based at least in part on the interaction data.

10. The system of claim 7, wherein:
the second tile output data indicates a duration of time the signal was received; and
the determination of the group data is further based on the duration of time the signal was received being greater than a contact time threshold.

11. The system of claim 7, wherein:
the second tile output data indicates a received signal strength of the signal that is received; and
the determination of the group data is further based on the received signal strength of the signal being greater than a received signal strength threshold.

12. The system of claim 6, wherein the first user and the second user establish electromagnetic coupling by physical contact with one another.

13. The system of claim 6, wherein the first user and the second user establish electromagnetic coupling by physical contact with an electrical conductor.

14. The system of claim 6, the second smart floor tile further comprising:
a second transmitter; and
the second hardware processor to further execute the second computer-executable instructions to:
  transmit, using the second transmitter, a second signal modulated to convey the designation data.

15. The system of claim 6, the first hardware processor to further execute the first computer-executable instructions to:
generate the designation data, wherein the designation data comprises an at least 9 bit value that is unique with respect to the system.

16. The system of claim 6, the first hardware processor to further execute the first computer-executable instructions to:
determine a presence of at least a portion of the body of the first user proximate to the at least the first antenna;
generate the designation data; and wherein the transmission of the signal is responsive to the presence of the at least the portion of the body of the first user.

* * * * *